United States Patent [19]

Simcoe et al.

[11] Patent Number: 5,018,142
[45] Date of Patent: May 21, 1991

[54] TECHNIQUE FOR ORGANIZING AND CODING SERIAL BINARY DATA FROM A PLURALITY OF DATA LINES FOR TRANSMISSION OVER A SINGLE TRANSMISSION LINE

[75] Inventors: Robert J. Simcoe, Westborough; Gregory M. Waters, Boston, both of Mass.

[73] Assignee: Digital Equipment Corporation, Maynard, Mass.

[21] Appl. No.: 471,209

[22] Filed: Jan. 26, 1990

Related U.S. Application Data

[63] Continuation of Ser. No. 164,392, Mar. 4, 1988, abandoned.

[51] Int. Cl.[5] .......................... H04J 3/00; H04J 14/08
[52] U.S. Cl. ....................................... 370/112; 370/4;
370/82; 370/84; 370/99; 455/608
[58] Field of Search ...................... 370/112, 82, 83, 84,
370/77, 79, 56, 99, 4; 455/608; 375/19;
328/104, 154; 371/55, 56, 70; 341/58, 73, 93,
95; 400/124

[56] References Cited

U.S. PATENT DOCUMENTS

| | | | |
|---|---|---|---|
| 3,995,120 | 11/1976 | Pachynski, Jr. | 370/112 |
| 4,310,922 | 1/1982 | Lichtenberger et al. | 370/112 |
| 4,326,813 | 4/1982 | Lomicka, Jr. et al. | 400/124 |
| 4,328,577 | 5/1982 | Abbott et al. | 370/82 |
| 4,675,861 | 6/1987 | Uttermark | 370/112 |
| 4,744,082 | 5/1988 | Fujimura et al. | 370/112 |
| 4,759,018 | 7/1988 | Buchner | 370/112 |

FOREIGN PATENT DOCUMENTS 2166327  4/1986  United Kingdom ............... 370/99

Primary Examiner—Douglas W. Olms
Assistant Examiner—Alpus H. Hsu
Attorney, Agent, or Firm—Cesari and McKenna

[57] ABSTRACT

A digital communications system includes a transmitting section that receives electrical signals in parallel and transmits them serially by means of an optic fiber (10) to a receiving section (11). A sampler/filter (20) samples the incoming electrical signals at a rate several times that of the maximum data rate expected of those signals and employs majority-vote circuits (116) to change the value of any samples that are not part of a plurality of sequential samples of the same value. The achieve as balanced a signal as possible, a complementing unit (36) complements alternate groups of bits, and a coding unit (40) imposes a 4-to-5 code in which the code-word imbalances for complementary data words are opposite in the majority of cases. A serializing unit (44) serializes the resulting codewords, which an electrical-to-optical converter (8) transmits over the optic fiber (10) to the receiving section (11), which performs operations the reverse of those performed by the transmitting section (3) so as to forward parallel electrical signals.

59 Claims, 10 Drawing Sheets

TECHNIQUE FOR ORGANIZING AND CODING SERIAL BINARY DATA FROM A PLURALITY OF DATA LINES FOR TRANSMISSION OVER A SINGLE TRANSMISSION LINE

BACKGROUND OF THE INVENTION

This is a continuation of Robert J. Simcoe and Gregory M. Waters U.S. patent application Ser. No. 164,392 filed on Mar. 4, 1988, now abandoned, for a Technique for Organizing and Coding Serial Binary Data from a Plurality of Data Lines for Transmission over a Single Transmission Line, now abandoned.

The invention relates generally to the field of systems for transmitting digital data and, in particular, provides an improved organization and coding technique for reliably transmitting data independent of the characteristics of the data.

Computer systems in which a plurality of computer units are linked by data communications pathways are increasingly in demand. Such computer systems often call for data communications pathways, connecting a dozen or more separate computer units, which can extend throughout the interior or a large office building or factory, perhaps for distances of up to a kilometer or more between computer units in the system.

In such systems it is frequently economical to concentrate data which originates on more than one data input line into a single data communications line for transmission to one or more computer units at a remote location. The cost of a single data communications line covering a relatively long distance is generally lower, and the performance of that single line can be much better, than the cost incurred and the performance achieved by extending over the same distance as many different transmission lines as there are data input lines. Combining data from several such data input lines into one data communications line is often called "concentrating" such data.

Although the data to be sent to and received from such a concentrated data communications line normally is transmitted electrically (over a wire, for example), it may be advantageous instead to transmit the concentrated data over an optical transmission medium. An optical channel has a number of inherent advantages for use as such a data communications pathway. An optical channel, unlike an electrically conductive channel, is not affected by differences in electrical potential between its ends. Differences in electrical potential arise frequently from differences in potential with respect to ground, or from other sources such as electromagnetic interference. Moreover, an optical channel, again unlike an electrically conductive channel, does not emit electromagnetic signals which may expose to eavesdroppers the information involved.

A fiber optic channel is a particularly reliable and economical form of an optical transmission channel. Accordingly, concentrators for converting binary data for transmission over a fiber optic channel have been developed, most notably in the field of telephone communications.

Existing concentrators include some, based on sampling techniques, which operate reliably regardless of the characteristics of the data which they transmit, and others for which the concentrator or computer unit may have to be reconfigured or redesigned for correct operation in transmitting data having a different format from the format for which the concentrator system was designed. Concentrators based on sampling techniques are advantageous because they do not limit the characteristics of the data which the units can exchange. Moreover, such concentrators operate quickly. When they are used, the time required to concentrate data from a plurality of serial data input channels, to transmit the concentrated data over the communications line, and to receive and deconcentrate the data for coupling onto the serial data output channels is not materially greater than the time required to transmit the serial data over a direct communications line without using a concentrator. For these reasons, it is normally not necessary to redesign a computer system when a concentrator based on sampling techniques is used to link units in the system.

Existing concentrators based on sampling techniques strike an unsatisfactory balance among transmission speed, error correction capability, and cost. Such concentrators use relatively expensive data storage devices at the transmitting end and/or the receiving end of the transmission channel. Such concentrators often lack error correction facilities, or they may use less than optimal error correction schemes involving error correction codes, or in some cases retransmission of suspect data, to correct errors in transmission. Such concentrators tend to have a data transmission rate that is slower than otherwise possible and tend to be relatively expensive to implement.

SUMMARY OF THE INVENTION

The invention provides a new and improved system for transmitting digital data, and, in particular, for organizing and coding serial binary data from a plurality of data lines for transmission over a single transmission line, for example, over a fiber optic link. The invention organizes smoothed samples of binary data from a plurality of high-speed data lines, as well as low speed data and control information, into an ordered succession of bits called a "frame" for coding. The invention uses a digital smoothing system to smooth samples of the high-speed data. By smoothing the stream of sample bits from each high-speed data input line, the coding system allows the unit which receives the signals from the fiber optic link to recognize and to correct single-code-bit errors which occurred in the fiber optic link. Moreover, a sampling system normally requires double buffering. By using a digital bit smoothing algorithm (in one specific embodiment, a majority-of-three bit algorithm, which requires three buffers), two of the buffers needed to implement the smoothing algorithm can also be used as the double buffers needed for the sampling system, thus reducing the total number of required buffers. By distributing low speed data and control information in several compact groups within the frame, the invention allows the smoothed samples of the high-speed data to be gathered and transmitted in an uninterrupted flow. The code used in one embodiment of the invention complements the bits of every alternate "nibble" of four bits in the frame and then encodes each four-bit "nibble" into a five-bit code word. In decoding the code any single-code-bit error which occurs on the fiber optic link may result in a single-sample-bit error on up to four lines receiving raw sample bits. However, such single-sample-bit errors on each line for receiving raw sample bits can then be removed by applying a digital smoothing process to the raw sample bit stream on each line for receiving raw sample bits. The five-bit code words each have no more than three bits which are one or zero. Moreover, for as many code words as possible, the five-bit code word which corresponds to the complement of each four-bit "nibble" has the same number of one (or zero) bits as the code word which corresponds to that uncomplemented four-bit "nibble" has zero (or one) bits. The bits of the code words are then transmitted serially over the fiber optic link.

The invention makes it possible to build a simple, economical, and fast concentrator based on sampling which will operate reliably regardless of the format of the data it is to transmit and which is highly resistant to the types of errors which are likely to occur in a fiber optic transmission system. The invention greatly reduces any need to apply a block error-correction code to the received samples of the high-speed data bits or to use retransmission techniques. Moreover, the combination of the frame organization and coding system of the invention also facilitates the application of simple but effective error detection and error signalling techniques by the receiver unit.

BRIEF DESCRIPTION OF THE DRAWINGS

The invention is pointed out with particularity in the appended claims. The above and further advantages of the invention may be better understood by referring to the following description taken in conjunction with the accompanying drawings, in which:

DETAILED DESCRIPTION OF ILLUSTRATIVE EMBODIMENTS.

Figure 1:
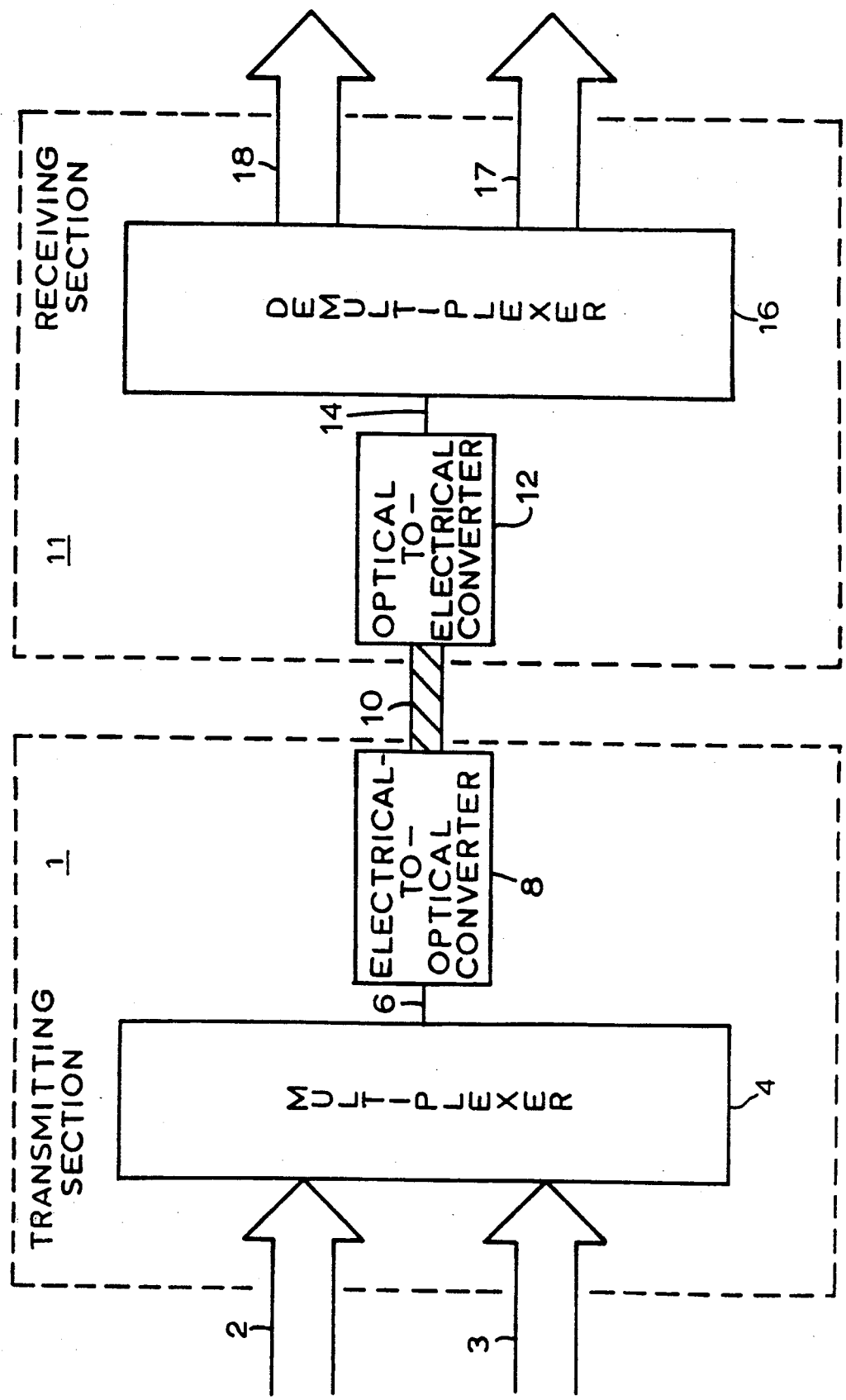
FIG. 1 is a simplified schematic block diagram of part of an optical fiber communications system in which the present invention is used.

FIG. 1 depicts a high-speed data communications system including a transmitting section 1 connected to one end of a fiber optic link 10. The other end of the fiber optic link 10 is connected to a receiving section 11, which may be a considerable distance away from the transmitting section 1.

The transmitting section 1 receives high-speed digital data over a plurality of high-speed data input lines 2 from other units (not shown). It also receives low-speed digital data and control information over a plurality of input lines 3 from other units (not shown). The input lines 2 and 3 lead to a multiplexing unit 4, which converts the data present on the input lines 2 and 3 into a serial binary code and feeds the bits of that code over line 6 to an electrical-to-optical converter 8. The electrical-to-optical converter 8 in turn converts that serial electrical bit stream to a serial stream of optical bits and transmits those optical bits over the fiber optic link 10.

In the receiving section 11 an optical-to-electrical converter 12 converts the optical bits it receives from the fiber optic link 10 into a stream of serial electrical bits and feeds those bits over line 14 to a demultiplexing unit 16. The demultiplexing unit 16 decodes this bit stream and then places the decoded bits corresponding to each high-speed data input line 2 on a corresponding high-speed data output line among the first plurality of high-speed data output lines 18. The demultiplexing unit 16 also places the bits corresponding to the low speed data or other information from each other input line 3 on a corresponding line among the second plurality of other output lines 17. The lines 17 and 18 lead from the receiving section 11 to other units (not shown).

In a transmission system incorporating the invention the high-speed data input lines 2 do not have to carry data having the same speed. Further, at any particular time one or more of the high-speed data input lines 2 may be unused or idle. The highest level transition rate of the data on any of the high-speed data input lines 2 is a known rate designated as B.

The other input lines 3 are reserved for data or control information which has a highest level transition rate that is very substantially lower than the highest level transition rate B on any of the high-speed data input lines 2. In addition, at any given time one or more of the other input lines 3 may be unused or idle.

THE FRAME

Figure 2:
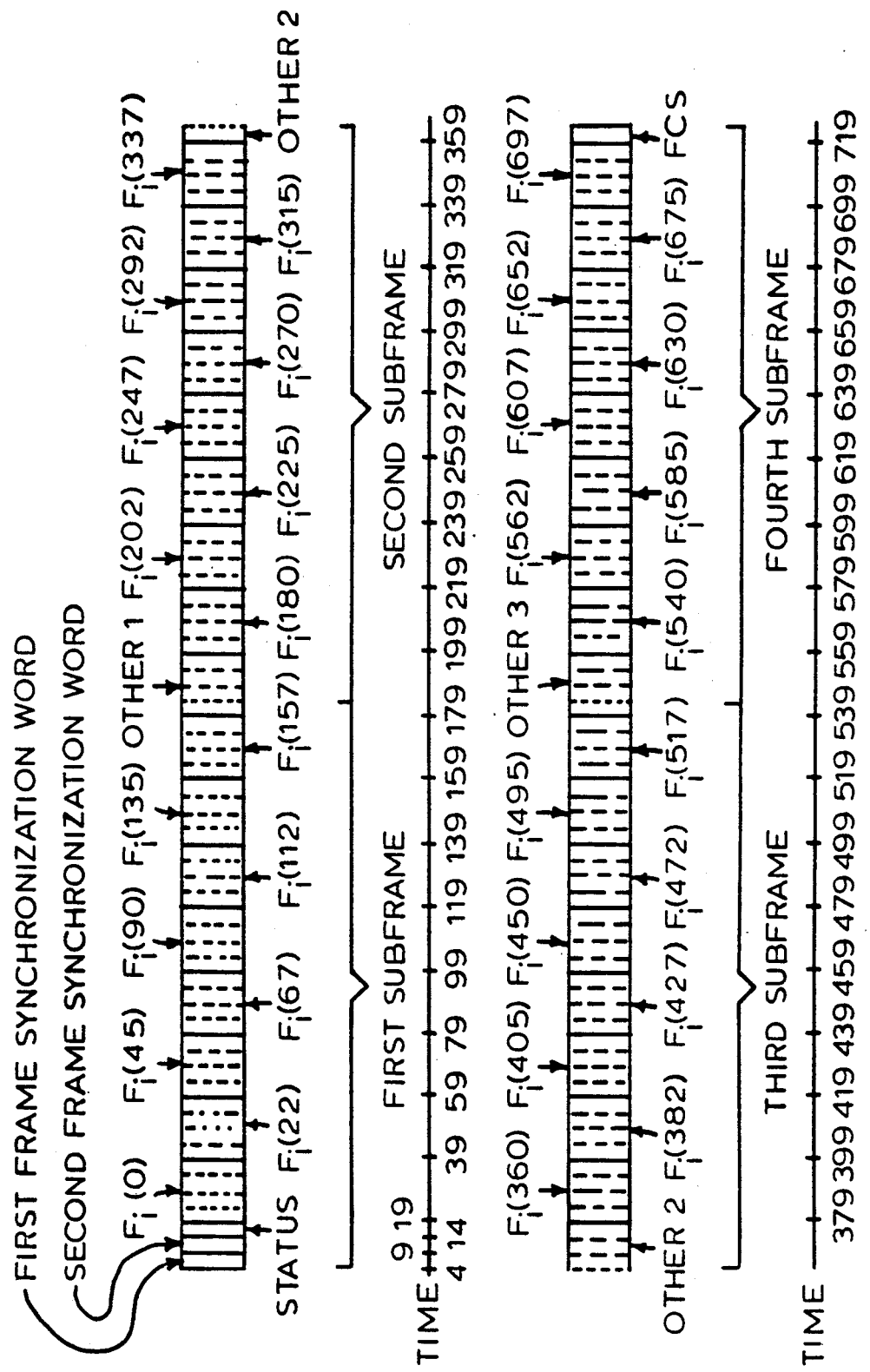
FIG. 2 illustrates the organization of the frame which carries data samples and other information in the illustrated embodiment.

The transmitting section 1 organizes data into a frame depicted in FIG. 2. The transmitting section actually produces two different frames, each of which has the structure shown in FIG. 2:

(1) a frame before coding, based on 4-bit "nibbles" or words, which contains the equivalent of 576 bits, and (2) a frame after coding, based on 5-bit words, which results from encoding each 4-bit word in the frame based on 4-bit words into a corresponding 5-bit code word, and which contains 720 bits. As shown in FIG. 2, the frame is divided into four subframes.

The Frame Based on 4-Bit Words. In the illustrated embodiment the frame based on 4-bit words is a succession of 4-bit words. FIG. 2 shows this succession of 4-bit words, each of which is indicated by a vertical slice through the frame chart. Thus, each box labelled $F_i(t)$, Other 1, Other 2, or Other 3 contains a succession of four 4-bit words. (The box labelled Other 2 continues from the first row to the second row.) The boxes labelled Status and FCS each contain a single 4-bit word. The boxes labelled First Frame Synchronization Word and Second Frame Synchronization Word each represent a time interval equivalent to the time used to transmit a 4-bit word. Each word is selected by time-division multiplexing. The line labelled "Time" in FIG. 2 indicates the time at which each 4-bit word is selected. The time line in FIG. 2 is measured in pulses of a periodic signal BIT CLOCK, which is described below in connection with FIGS. 3 through 6.

As described below, the numbers 0, 22, 45, ..., 697, associated with the boxes labelled $F_i(t)$, represent the times, also measured in pulses of BIT CLOCK, at which the bits in each such box were produced as the bits of a vector of filtered samples of the data in the high-speed data input lines 2. The boxes labelled Status, Other 1, Other 2, and Other 3 contain bits taken from the other input lines 3. This other information in each frame can, in general, be any bits it is convenient to send. The information in these boxes in the illustrated embodiment is also described below. The box labelled FCS contains a 4-bit frame check sequence calculated over the bits of all the 4-bit words in the frame from and including the bits labelled STATUS through and including the bits labelled $F_i(697)$. The frame check sequence is also described in greater detail below.

By dispersing collections of sixteen bits of information other than filtered data sample bits through the frame between groups of eight vectors of sixteen filtered data sample bits, the invention makes it possible to produce the filtered data sample bits in an uninterrupted flow while also selecting and transmitting the collections of sixteen bits of other information in time slots between the groups of filtered data sample bits. Those time slots are created by operating the transmitting section 1 at a slightly higher rate than the rate at which the filtered data sample vectors are produced. Moreover, this frame organization greatly reduces the need for data storage devices in either the multiplexing unit 4 or the demultiplexing unit 16 of FIG. 1.

The Frame Based on Five-Bit Words. The frame based on 5-bit words is generated by encoding each 4-bit word in the frame based on 4-bit words into a corresponding 5-bit code word according to the coding system of the invention.

A first and a second 5-bit frame synchronization word are generated in the time corresponding to the first two slices in the frame chart in FIG. 2.

The Three-Frame Superframe. The transmitting section 1 transmits frames in a larger succession of three frames. Each group of three successive frames is called a "superframe." The first of every three frames in a superframe has a frame definition bit (a Define Superframe bit) set to one as described below; in the second and third frames of each superframe this bit is cleared to zero. Other than this frame definition bit, the frames within each superframe have the same structure.

THE MULTIPLEXING UNIT

Figure 3:
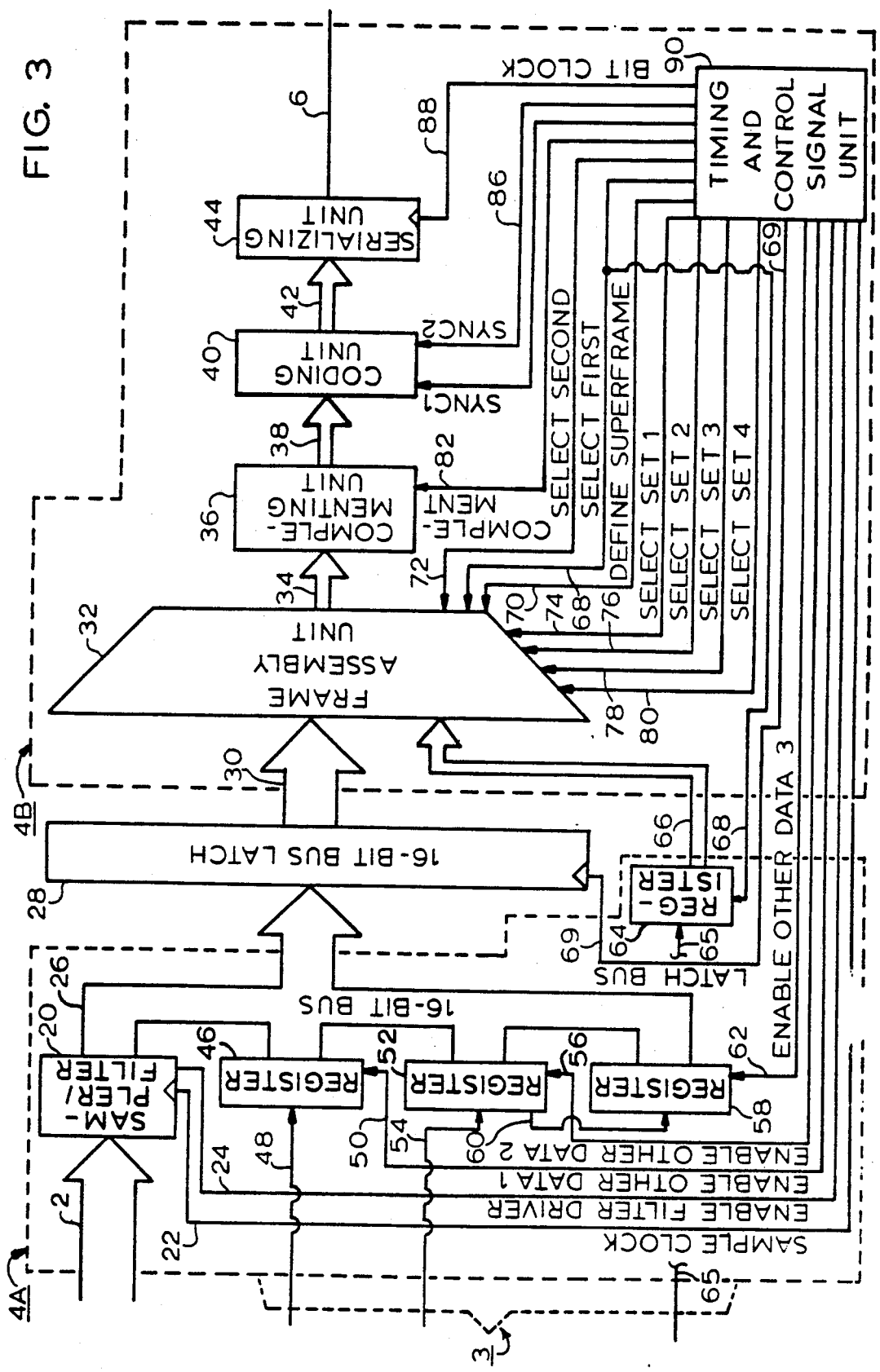
FIG. 3 is a schematic block diagram of the multiplexing unit in the transmission portion of an optical fiber communications system in which the present invention is used.

FIG. 3 depicts a detailed block diagram of the multiplexing unit 4. The multiplexing unit 4 has a data assembly section 4A and a frame assembly section 4B, interconnected through a 16-bit bus latch 28, which controls almost all data movement from the data assembly section 4A to the frame assembly section 4B.

Figure 7:
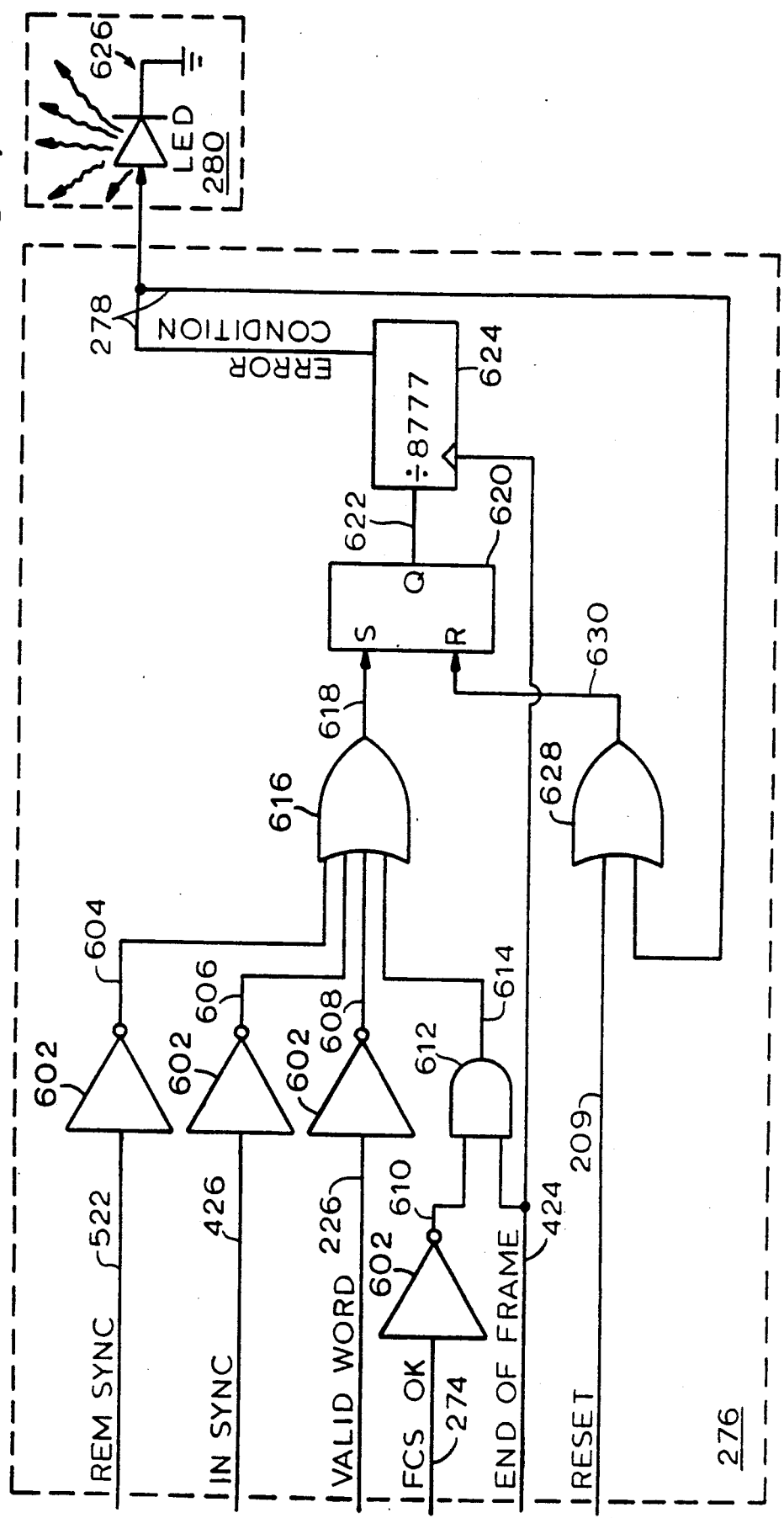
FIG. 7 is a schematic diagram of an illustrative error detecting unit and error signalling unit in the demultiplexing unit depicted in FIGS. 6A and 6b.

In the data assembly section 4A sixteen high-speed data input lines 2 are connected to a sampling and filtering unit 20, an illustrative example of which is depicted in FIG. 7 and described in greater detail below.

Input lines 48, 54, and 65 shown in FIG. 3 comprise the other input lines 3 shown in FIG. 1. The input line 48 carries low speed data or other information to a first 16-bit storage register 46. The input line 54 carries control information to a second 16-bit storage register 52.

In one embodiment the input line 60 receives overflow bits from the storage register 52, and the timing and signal control unit 90 issues signals (not shown) to other units (not shown) to regulate the flow of bits in over line 54. The input line 65 carries certain link control and status information to a 4-bit storage register 64.

The timing and control signal unit 90 issues over its various output lines the timing and control signals which cause the multiplexing unit 4 to assemble frames as depicted in FIG. 2. These signals are asserted at particular pulses of the periodic signal BIT CLOCK, which the timing and signal control unit 90 generates. Before describing the sequence of these signals, it is useful to review the elements set forth in FIG. 3.

The sampling and filtering unit 20 samples the binary data signals on each high-speed data input line 2 and places a stream of filtered data sample bits on a line of 16-bit bus 26. The sampling rate exceeds the maximum level transition rate B on any of the high-speed data input lines 2 and in one embodiment is about 7.3 times B to permit the level transitions in the high-speed data in the serial data input lines 2 to be sampled with acceptable time resolution. This sampling produces an adequate number of samples even when the level transition rate on one or more of the high-speed data input lines 2 is less than B. The average time interval T between successive samplings of the high-speed data input lines 2 is the inverse of the average sampling rate. As described below in connection with FIG. 7, the sampling and filtering unit 20 also filters the stream of raw sample bits to remove certain transient errors before placing those filtered sample bits on 16-bit bus 26.

As shown in FIG. 3, whenever the signal LATCH BUS, supplied over line 69, is asserted, 16-bit- bus latch 28 transfers the data then present on 16-bit bus 26 to a 16-bit bus 30 and holds that data on 16-bit bus 30. As part of forming the frame based on 4-bit words described above in connection with FIG. 2, a frame assembly unit 32 multiplexes the bits present on 16-bit bus 30 into a succession of 4-bit words and places those 4-bit words on 4-bit bus 34. Essentially, the sixteen lines comprising bus 30 are divided into four sets of four bits each. In response to the assertion of the signal SELECT SET 1, supplied over line 74, frame assembly unit 32 selects the bits present on a first preselected set of four of the lines which make up bus 30 and places those bits on a 4-bit bus 34. In response to the assertion of the signal SELECT SET 2, supplied over line 76, frame assembly unit 32 selects the bits present on a second preselected set of four of the lines which make up bus 30 and places those bits on bus 34. In response to the assertion of the signal SELECT SET 3, supplied over line 78, frame assembly unit 32 selects the bits present on a third preselected set of four of the lines which make up bus 30 and places those bits on bus 34. Finally, in response to the assertion of the signal SELECT SET 4, supplied over line 80, frame assembly unit 32 selects the bits present on a fourth preselected set of four of the lines which make up bus 30 and places those bits on bus 34. The first, second, third, and fourth sets of four lines together contain all sixteen of the lines bus 30.

The frame assembly unit 32 also couples signals from latch 64, on bus 66, onto bus 34 to form the bits in the box labelled Status in FIG. 2. In response to the assertion of the signal SELECT FIRST, supplied to frame assembly unit 32 over line 68, frame assembly unit 32 selects the (in one embodiment) three bits then present on 4-bit bus 66, sets another bit as a Define Superframe bit, and places those four bits on 4-bit bus 34. (For simplicity these four bits are designated as the four bits from 4-bit- bus 66 ) As illustrated in FIG. 3, this first set of four bits includes three bits which 4-bit storage register 64, also in response to the assertion of the signal SELECT FIRST, is driving onto 4-bit bus 66.

In the illustrated embodiment the four bits labelled status include the Define Superframe bit, a Do loopback bit, a Low Power bit, and a Rem sync bit, which are described in greater detail below. In response to the signal DEFINE SUPERFRAME, when asserted by timing and signal control unit 90 over line 70, the frame assembly unit 32 sets the Define Superframe bit to one, to indicate that the frame in which that bit is set to one is the first frame of three frames in a superframe. When the signal DEFINE SUPERFRAME is not asserted, frame assembly unit 32 sets the Define Superframe bit to zero. The timing and signal control unit 90 asserts the signal DEFINE SUPERFRAME at the appropriate time once every three frames.

In response to the assertion of the signal SELECT SECOND, supplied over line 72 by timing and signal control unit 90, frame assembly unit 32 places on 4-bit bus 34 the four bits of the frame check sequence described above, which the frame assembly unit has calculated (by means of logic not shown) over all bits placed on bus 34 during each frame.

4-bit bus 34 leads to a complementing unit 36. In response to the assertion of the signal COMPLEMENT, supplied over line 82, complementing unit 36 complements the bits present on 4-bit bus 34 and places those complemented bits on 4-bit bus 38. That is, whenever the signal COMPLEMENT is asserted, complementing unit 36 changes any zero bit present on a line in 4-bit bus 34 to a one bit present on the corresponding line in 4-bit bus 38, and changes any one bit present on a line in 4-bit bus 34 to a zero bit present on the corresponding line in 4-bit bus 38. As an example, complementing unit 38 complements the bits of the four-bit word 1001 present on the four lines of 4-bit bus 34 to the bits 0110, and places those bits 0110 on the corresponding lines of 4-bit bus 38. If the signal COMPLEMENT is not asserted, complementing unit 36 permits the bits present on 4-bit bus 34 to flow through to 4-bit bus 38 without changing any of the bits.

4-bit bus 38 leads to a coding unit 40. If neither the signal SYNC1 nor the signal SYNC2 is asserted, the coding unit 40 immediately places on 5-bit bus 42 the 5-bit code word corresponding to whatever 4-bit word is present on 4-bit bus 38. If the signal SYNC1, supplied over line 84, is asserted, the coding unit 40 immediately places the 5-bit first frame synchronization word on 5-bit bus 42. If the signal SYNC2, supplied through line 86, is asserted, the coding unit 40 immediately places the -5-bit second frame synchronization word on 5-bit bus 42. As an example, the coding unit may contain a lookup table which stores the 5-bit code word corresponding to each 4-bit data word and which also stores the first and second frame synchronization words.

5-bit bus 42 leads to a serializing unit 44, which may be a parallel-to-serial shift register. Serializing unit 44 places on line 6, in serial order, the five bits fed on 5-bit bus 42. The output of these bits is clocked by the signal BIT CLOCK, supplied over line 88. As indicated above, line 6 leads to the electrical-to-optical converter 8.

THE CODING SYSTEM

The 4-bit to 5-bit code of the illustrative embodiment—implemented in the coding unit 40—permits certain desirable choices of code words (described below) while adding relatively few additional bits which must be transmitted. In the illustrated embodiment the number of bits to be transmitted increases by only approximately 25 percent.

The coding system is applied after each alternate 4-bit word in the frame based on 4-bit words is complemented in the complementing unit 36.

The invention calls for choosing the code uniquely relating each of the sixteen 4-bit data words to one of sixteen of the thirty-two possible 5-bit code words to meet the following requirements.

(1) The code words are chosen so that, in each 5-bit code word, the number of zero bits does not differ from the number of one bits by more than one.

(2) Two other 5-bit words are selected to be used as the frame synchronization words. These two frame synchronization words are chosen from the remaining sixteen 5-bit words to have the characteristic that the bits of the first and second frame synchronization words do not correspond to any possible sequence of bits in any three or fewer 5-bit words chosen as code words.

(3) The code is chosen so that, for as many of the 5-bit code words as possible, each code word for a data word has the same number of one bits as the code word which corresponds to the complement of that data word has zero bits; that is, imbalances of the code words for complementary data words are opposite.

In the illustrated embodiment, the five-bit code words corresponding to the four-bit data words are chosen as follows:

| Five-bit Code Word | Four-bit Word |
| --- | --- |
| 01010 | 0000 |
| 10001 | 0001 |
| 10010 | 0010 |
| 11000 | 0011 |
| 01100 | 0100 |
| 10101 | 0101 |
| 00110 | 0110 |
| 01001 | 0111 |
| 01101 | 1000 |
| 10011 | 1001 |
| 01011 | 1010 |
| 11001 | 1011 |
| 00111 | 1100 |
| 10110 | 1101 |
| 01110 | 1110 |
| 11010 | 1111. |

In the illustrated embodiment the five-bit words 10100 and 00101 are chosen as the first and the second frame synchronization words to satisfy criterion 2. The ten-bit sequence 1010000101 does not appear in any combination of two or three of the five-bit words chosen as code words. Nor does the ten-bit sequence appear misaligned in any sequence of code words or synchronization words.

For all but two of the four-bit data words the five-bit code words meet criterion (3) above. The two exceptions are 1010 and 0101, for which each five-bit code word has three one bits. This exception is necessary because the complement of the code word for data word 1010 is reserved for use as a synchronization word.

The two remaining 5-bit words which meet criterion (1)—00011—and 11100—are not used, because they have more than two same-valued bits on the left-hand side of the code word. This ensures that, in the 5-bit words chosen as code words, the longest possible run of zero or one bits does not exceed five bits. This in turn assures that there will be at least one bit transition every five bits in the stream of code bits, which assists the demultiplexing unit 16 in recovering a clock signal from the stream of received code bits. Moreover, these two words also contain only one bit transition and it is preferable to select code words having a larger number of bit transitions if possible.

The coding technique of the invention has several advantages. First, criterion 1 provides a nearly even balance between zero and one bits. In the illustrated embodiment, each 5-bit code word has only three same-valued bits, which assures that the overall fraction of zero or one bits in the stream of code bits does not exceed 60 percent.

Criterion 3, together with the alternate complementation performed before encoding, tends to bring the overall balance between zero and one bits even closer to 50 per cent. This is particularly noticeable in the common case where one or more of the sixteen high-speed data input lines 2 carry either zero or one bits for an extended time. Moreover, criterion 3 and the alternating complementation tend to make the concentrator insensitive to whether any idle high-speed data input lines carry zero or one bits.

This close balance between zero and one bits permits the use of less-expensive fiber optic components in electrical-to-optical converter 8 and optical-to-electrical converter 12. Fiber optic components which can operate with a low error rate when transmitting predominantly one or zero bits are more expensive than fiber optic components which require a more nearly equal balance of one and zero bits to operate with a low error rate.

Second, this coding technique produces a bit stream from which the demultiplexing unit 16 can readily derive a clock signal synchronized with the incoming bits. The criteria set forth above produce a relatively large number and density of bit transitions (that is, a zero bit followed by a one bit or vice versa) in the stream of 5-bit words produced by the coding unit 40 and thus lead to a relatively high number of bit transitions in the serial stream of bits produced by serializer 44. Criterion 1 causes each 5-bit code word to have a relatively high number of bit transitions. For example, in the preferred embodiment the code word ( 01010) for data word 0000 has four bit transitions; and only two 5-bit code words (00111 and 11000) have only one bit transition. Criterion (3), together with the alternating complementation performed before encoding, reinforces the number of bit transitions in the common case when all sixteen high-speed data input lines 2 are transmitting only one or zero bits for an extended period of time. Thus, a long row of zero or one bits in all of the high-speed data input lines 2 in the illustrated embodiment will lead to an output after complementation having the form 0000,1111,0000,1111 or 1111,0000,1111,0000, respectively. Those outputs code to 01010,11010,01010,11010 and 11010,01010,11010,01010, respectively; and it can be seen that an additional bit transition occurs whenever 01010 is immediately followed by 11010.

Circuits are well known which will maintain the demultiplexing unit 16 in clock synchronization with the multiplexing unit 4 on the basis of the frequency of bit transitions which the coding technique of the invention produces. Accordingly, the coding technique of the invention makes it unnecessary to transmit a clock signal, as such, from the multiplexing unit 8 to the demultiplexing unit 16. The bandwidth which might otherwise be required for transmitting such a clock signal can accordingly be used to transmit data.

This advantage of the coding system of the invention is particularly pronounced when the invention is compared with with other concentrators which use Manchester codes. Manchester codes transmit a clock signal along with the data, thereby using up a large part of the bandwidth of the transmission line in transmitting the clock signal. By avoiding the need to transmit a clock signal, the coding system of the invention makes more efficient use of the available bandwidth.

THE TIMING AND CONTROL SIGNALS

The order and time at which the various timing and control signals are asserted is important to the operation of the system depicted in FIG. 3 in organizing data into a frame. These clock and timing signals can be divided into four groups.

First, the signal which controls sampling the high-speed data from the high-speed data input lines 2 is the signal SAMPLE CLOCK. In the illustrated embodiment the signal SAMPLE CLOCK has an average rate equal to the rate of BIT CLOCK divided by 22.5. This average rate is achieved by asserting the SAMPLE CLOCK signal on the 22nd and 45th pulses of of every 45 pulses of the signal BIT CLOCK, and so forth repetitively. This schedule for asserting the signal SAMPLE CLOCK is apparent from Table I, which shows the signal SAMPLE CLOCK asserting at pulses 0, 22, 45, 67, 90, 112, 135, and 157 of BIT CLOCK. The same schedule is also apparent in Tables II and III.

Second, the signals that control which part of the data assembly section 4A places bits on the 16-bit bus 26 are the signals ENABLE FILTER DRIVER, ENABLE OTHER DATA 1, ENABLE OTHER DATA 2, and ENABLE OTHER DATA 3.

The signal ENABLE FILTER DRIVER is asserted once for every assertion of SAMPLE CLOCK. However, between the eighth of every eight assertions of the signal ENABLE FILTER DRIVER and the following assertion of SAMPLE CLOCK, another signal or set of signals is asserted. Three of these signals are the signals which cause either the first other storage register 46, the second other storage register 52, or the third other storage register 58 to drive 16-bit bus 26—that is, the signals ENABLE OTHER DATA 1, ENABLE OTHER DATA 2, and ENABLE OTHER DATA 3, respectively. ENABLE OTHER DATA 1 is asserted after the eighth assertion of SAMPLE CLOCK in the first of every four groups of eight assertions of the signal SAMPLE CLOCK. ENABLE OTHER DATA 2 is asserted after the eighth assertion of SAMPLE CLOCK in a second of every four groups of eight assertions of the signal SAMPLE CLOCK. ENABLE OTHER DATA 3 is asserted on the eighth of a third of every four groups of eight assertions of the signal SAMPLE CLOCK.

Third, the signals (other than signals which regulate inserting frame definition elements) which control the frame assembly portion 4B are the signals BIT CLOCK, COMPLEMENT, SELECT SET 1, SELECT SET 2, SELECT SET 3, SELECT SET 4, and LATCH BUS. To describe these it is convenient to define an explanatory signal FIFTH which is asserted on the fifth of every five pulses of the signal BIT CLOCK. The explanatory signal FIFTH is not shown explicitly in FIG. 2 or in Tables I, II, or III, although many signals produced by timing and control signal unit 90 change in sychronism to pulses of the signal FIFTH. The signal FIFTH will be used as a convenient way to explain the timing and control signals.

The COMPLEMENT signal is asserted every other assertion of the explanatory signal FIFTH.

The signals SELECT SET 1, SELECT SET 2, SELECT SET 3, and SELECT SET 4 can be understood as being derived from the explanatory signal FIFTH. The signal SELECT SET 1 is asserted on the first of every group of four assertions of the explanatory signal FIFTH. The signal SELECT SET 2 is asserted on the second of every group of four assertions of the explanatory signal FIFTH. The signal SELECT SET 3 is asserted on the third of every group of four assertions of the explanatory signal FIFTH. The signal SELECT SET 4 is asserted on the fourth of every group of four assertions of the explanatory signal FIFTH.

It will be apparent that the complete sequence of signals SELECT SET 1, SELECT SET 2, SELECT SET 3, and SELECT SET 4 (together with the signals, described below, which control inserting the frame recognition elements) is asserted once every 20 pulses of BIT CLOCK. Since this sequence of signals controls the flow of data onto 4-bit bus 34, it will also be apparent that 4-bit bus 34 transfers data at a higher rate than data is sampled and filtered by the sampling and filtering unit 20. This higher rate is the ratio—equal to 9/8—of the rate of that sequence of signals to the rate of the signal SAMPLE CLOCK. In the illustrated embodiment frame assembly section 4B is capable of transmitting nine sets of sixteen bits of information in the same period of time that data assembly section produces eight sets of sixteen bit filtered samples of the high-speed data input lines 2. It is this higher data rate in components of section 4B which opens in the frame the time slots Other 1, Other 2, and Other 3 for transmitting the sixteen bits stored in each of the storage registers 46, 52, and 58 and the time slots for transmitting the frame recognition elements and the bits stored in the storage register 64.

The signal LATCH BUS is asserted once every group of four assertions of the explanatory signal FIFTH. As illustrated in Tables, I, II, and III it is convenient to consider the signal LATCH BUS as being asserted simultaneously with the signal SELECT SET 1.

Fourth, the signals which control inserting frame recognition elements are the signals SYNC1, SYNC2, SELECT FIRST, SELECT SECOND, and DEFINE SUPERFRAME. These signals are asserted at particular times near the beginning and near the end of each frame.

Tables I, II, and III set forth simplified charts for the assertion of the timing and control signals used in the illustrated embodiment of the invention. Each of these tables is simplified by the omission of certain signals. Most assertions of the signal BIT CLOCK, which is the basic reference signal of column 1, headed "Pulse of BIT CLOCK," in each table, are omitted; only the more significant pulses of BIT CLOCK are listed. The assertions of the signal COMPLEMENT, which are understood to occur every tenth assertion of the signal BIT CLOCK, are omitted. The explanatory signal FIFTH is not listed. The signal DEFINE SUPERFRAME, which is asserted in the first of every three frames in a superframe, is omitted.

The first pulse of the signal BIT CLOCK in each frame is numbered zero, and the last such pulse is numbered 719.

TABLE I

| | BEGINNING OF FRAME AND ASSEMBLY OF FIRST SUBFRAME | |
| --- | --- | --- |
| Pulse of Bit Clock | Signal Action | Circuit Action |
| 0 | SAMPLE CLOCK asserted; ENABLE FILTER DRIVER asserted | Filter drivers 124 drive 16-bit bus 26 with first filtered data sample vector $F_f(0)$ |
| 6 | SYNC1 asserted | Coding unit 40 places first frame synchronization word on 5-bit bus 42 |
| | SYNC2 asserted | Coding unit 40 places second frame synchronization word on 5-bit bus 42 |
| 16 | SELECT FIRST asserted | 4-bit storage register 64 drives 4-bit bus 66; frame assembly unit 32 places first set of four bits of other information on 4-bit bus 34 |
| 19 | LATCH BUS asserted | 16-bit bus latch 28 transfers filtered data sample vector $F_f(0)$ from 16-bit bus 26 to frame assembly unit bus 30 |
| 21 | SELECT SET 1 asserted | Frame assembly unit 32 selects first preselected set of four bits from $F_f(0)$ and places that set on 4-bit bus 34 |
| 22 | SAMPLE CLOCK asserted; ENABLE FILTER DRIVER asserted | Filter drivers 124 drive 16-bit bus 26 with second filtered data sample vector $F_f(22)$ |

TABLE I-continued
BEGINNING OF FRAME AND ASSEMBLY OF FIRST SUBFRAME

| Pulse of Bit Clock | Signal Action | Circuit Action |
|---|---|---|
| 26 | SELECT SET 2 asserted | Frame assembly unit 32 selects second preselected set of four bits from $F_f(0)$ and places that set on 4-bit bus 34 |
| 31 | SELECT SET 3 asserted | Frame assembly unit 32 selects third preselected set of four bits from $F_f(0)$ and places that set on 4-bit bus 34 |
| 36 | SELECT SET 4 asserted | Frame assembly unit 32 selects fourth preselected set of four bits from $F_f(0)$ and places that set on 4-bit bus 34 |
| 39 | LATCH BUS asserted | 16 bit bus latch 28 transfers filtered data sample vector $F_f(22)$ from 16-bit bus 26 to frame assembly unit bus 30 |
| 41 | SELECT SET 1 asserted | Frame assembly unit 32 selects first preselected set of four bits from $F_f(22)$ and places that set on 4-bit bus 34 |
| 45 | SAMPLE CLOCK asserted; ENABLE FILTER DRIVER asserted | Filter drivers 124 drive 16-bit bus 26 with third filtered data sample vector $F_f(45)$ |
| 46 | SELECT SET 2 asserted | Frame assembly unit 32 selects second preselected set of four bits from $F_f(22)$ and places that set on 4-bit bus 34 |
| 51 | SELECT SET 3 asserted | Frame assembly unit 32 selects third preselected set of four bits from $F_f(22)$ and places that set on 4-bit bus 34 |
| 56 | SELECT SET 4 asserted | Frame assembly unit 32 selects fourth preselected set of four bits from $F_f(22)$ and places that set on 4-bit bus 34 |
| 59 | LATCH BUS asserted | 16 bit bus latch 28 transfers filtered data sample vector $F_f(45)$ from 16-bit bus 26 to frame assembly unit bus 30 |
| 61 | SELECT SET 1 asserted | Frame assembly unit 32 selects first preselected set of four bits from $F_f(45)$ and places that set on 4-bit bus 34 |
| 66 | SELECT SET 2 asserted | Frame assembly unit 32 selects second preselected set of four bits from $F_f(45)$ and places that set on 4-bit bus 34 |
| 67 | SAMPLE CLOCK asserted; ENABLE FILTER DRIVER asserted | Filter drivers 124 drive 16-bit bus 26 with fourth filtered data sample vector $F_f(67)$ |
| 71 | SELECT SET 3 asserted | Frame assembly unit 32 selects third preselected set of four bits from $F_f(45)$ and places that set on 4-bit bus 34 |
| 76 | SELECT SET 4 asserted | Frame assembly unit 32 selects fourth preselected set of four bits from $F_f(45)$ and places that set on 4-bit bus 34 |
| 79 | LATCH BUS asserted | 16 bit bus latch 28 transfers filtered data sample vector $F_f(67)$ from 16-bit bus 26 to frame assembly unit bus 30 |
| 81 | SELECT SET 1 asserted | Frame assembly unit 32 |

TABLE I-continued
BEGINNING OF FRAME AND ASSEMBLY OF FIRST SUBFRAME

| Pulse of Bit Clock | Signal Action | Circuit Action |
|---|---|---|
| | | selects first preselected set of four bits from $F_f(67)$ and places that set on 4-bit bus 34 |
| 86 | SELECT SET 2 asserted | Frame assembly unit 32 selects second preselected set of four bits from $F_f(67)$ and places that set on 4-bit bus 34 |
| 90 | SAMPLE CLOCK asserted; ENABLE FILTER DRIVER asserted | Filter drivers 124 drive 16-bit bus 26 with fifth filtered data sample vector $F_f(90)$ |
| 91 | SELECT SET 3 asserted | Frame assembly unit 32 selects third preselected set of four bits from $F_f(67)$ and places that set on 4-bit bus 34 |
| 96 | SELECT SET 4 asserted | Frame assembly unit 32 selects fourth preselected set of four bits from $F_f(67)$ and places that set on 4-bit bus 34 |
| 99 | LATCH BUS asserted | 16 bit bus latch 28 transfers filtered data sample vector $F_f(90)$ from 16-bit bus 26 to frame assembly unit bus 30 |
| 101 | SELECT SET 1 asserted | Frame assembly unit 32 selects first preselected set of four bits from $F_f(90)$ and places that set on 4-bit bus 34 |
| 106 | SELECT SET 2 asserted | Frame assembly unit 32 selects second preselected set of four bits from $F_f(90)$ and places that set on 4-bit bus 34 |
| 111 | SELECT SET 3 asserted | Frame assembly unit 32 selects third preselected set of four bits from $F_f(90)$ and places that set on 4-bit bus 34 |
| 112 | SAMPLE CLOCK asserted; ENABLE FILTER DRIVER asserted | Filter drivers 124 drive 16-bit bus 26 with sixth filtered data sample vector $F_f(112)$ |
| 116 | SELECT SET 4 asserted | Frame assembly unit 32 selects fourth preselected set of four bits from $F_f(90)$ and places that set on 4-bit bus 34 |
| 119 | LATCH BUS asserted | 16 bit bus latch 28 transfers filtered data sample vector $F_f(112)$ from 16-bit bus 26 to frame assembly unit bus 30 |
| 121 | SELECT SET 1 asserted | Frame assembly unit 32 selects first preselected set of four bits from $F_f(112)$ and places that set on 4-bit bus 34 |
| 126 | SELECT SET 2 asserted | Frame assembly unit 32 selects second preselected set of four bits from $F_f(112)$ and places that set on 4-bit bus 34 |
| 131 | SELECT SET 3 asserted | Frame assembly unit 32 selects third preselected set of four bits from $F_f(112)$ and places that set on 4-bit bus 34 |
| 135 | SAMPLE CLOCK asserted; ENABLE FILTER DRIVER asserted | Filter drivers 124 drive 16-bit bus 26 with seventh filtered data sample vector $F_f(135)$ |
| 136 | SELECT SET 4 asserted | Frame assembly unit 32 selects fourth preselected set of four bits from |

TABLE I-continued
BEGINNING OF FRAME AND ASSEMBLY OF FIRST SUBFRAME

| Pulse of Bit Clock | Signal Action | Circuit Action |
|---|---|---|
| | | $F_f(112)$ and places that set on 4-bit bus 34 |
| 139 | LATCH BUS asserted | 16 bit bus latch 28 transfers filtered data sample vector $F_f(135)$ from 16-bit bus 26 to frame assembly unit bus 30 |
| 141 | SELECT SET 1 asserted | Frame assembly unit 32 selects first preselected set of four bits from $F_f(135)$ and places that set on 4-bit bus 34 |
| 146 | SELECT SET 2 asserted | Frame assembly unit 32 selects second preselected set of four bits from $F_f(135)$ and places that set on 4-bit bus 34 |
| 151 | SELECT SET 3 asserted | Frame assembly unit 32 selects third preselected set of four bits from $F_f(135)$ and places that set on 4-bit bus 34 |
| 156 | SELECT SET 4 asserted | Frame assembly unit 32 selects fourth preselected set of four bits from $F_f(135)$ and places that set on 4-bit bus 34 |
| 157 | SAMPLE CLOCK asserted; ENABLE FILTER DRIVER asserted | Filter drivers 124 drive 16-bit bus 26 with eighth filtered data sample vector $F_f(157)$ |
| 159 | LATCH BUS asserted | 16 bit bus latch 28 transfers filtered data sample vector $F_f(157)$ from 16-bit bus 26 to frame assembly unit bus 30 |
| 161 | SELECT SET 1 asserted; ENABLE FILTER DRIVER deasserted; ENABLE OTHER DATA 1 asserted | Frame assembly unit 32 selects first preselected set of four bits from $F_f(157)$ and places that set on 4-bit bus 34; first other data storage register 46 drives 16-bit bus 26 |
| 166 | SELECT SET 2 asserted | Frame assembly unit 32 selects second preselected set of four bits from $F_f(157)$ and places that set on 4-bit bus 34 |
| 171 | SELECT SET 3 asserted | Frame assembly unit 32 selects third preselected set of four bits from $F_f(157)$ and places that set on 4-bit bus 34 |
| 176 | SELECT SET 4 asserted | Frame assembly unit 32 selects fourth preselected set of four bits from $F_f(157)$ and places that set on 4-bit bus 34 |
| 179 | ENABLE OTHER DATA 1 remains asserted; LATCH BUS asserted | 16-bit bus latch 28 transfers first sixteen bits of other data from 16-bit bus 26 to frame assembly unit bus 30 |

TABLE II
BEGINNING OF FRAME AND ASSEMBLY OF FIRST SUBFRAME ASSEMBLY OF THE SECOND (R=2) AND THIRD (R=3) SUBFRAME

| Pulse of Bit Clock | Signal Action | Circuit Action |
|---|---|---|
| 180(R-1) + 0 | SAMPLE CLOCK asserted; ENABLE FILTER DRIVER asserted | Filter drivers 124 drive 16-bit bus 26 with first filtered data sample vector $F_f(180(R-1) + 0)$ of the Rth subframe |
| 180(R-1) | SELECT SET 1 | Frame assembly unit 32 |

TABLE II-continued

BEGINNING OF FRAME AND ASSEMBLY OF FIRST SUBFRAME ASSEMBLY OF THE SECOND (R=2) AND THIRD (R=3) SUBFRAME

| Pulse of Bit Clock | Siqnal Action | Circuit Action |
|---|---|---|
| +1 | asserted; ENABLE OTHER DATA (R-1) deasserted; ENABLE FILTER DRIVER reasserted | selects first preselected set of four bits from first sixteen bits of other data and places that set on 4-bit bus 34; (R-1)th other data storage register no longer drives 16-bit bus 26; filter drivers 124 drive 16-bit bus 26 with first filtered data sample vector $F_i(180(R-1) + 0)$ of the Rth subframe |
| 180(R-1) + 6 | SELECT SET 2 asserted | Frame assembly unit 32 selects second preselected set of four bits of (R-1)th sixteen bits of other data and places those bits on 4-bit bus 34 |
| 180(R-1) + 11 | SELECT SET 3 asserted | Frame assembly unit 32 selects third preselected set of four bits of (R-1)th sixteen bits of other data and places those bits on 4-bit bus 34 |
| 180(R-1) + 16 | SELECT SET 4 asserted | Frame assembly unit 32 selects fourth preselected set of four bits of (R-1)th sixteen bits of other data and places those bits on 4-bit bus 34 |
| 180(R-1) + 19 | LATCH BUS asserted | 16-bit bus latch 28 transfers first filtered data sample vector $F_i(180(R-1) + 0)$ of the Rth subframe from 16-bit bus 26 to frame assembly unit bus 30 |
| 180(R-1) + 21 | SELECT SET 1 asserted | Frame assembly unit 32 selects first preselected set of four bits from $F_i(180(R-1) + 0)$ and places those bits on 4-bit bus 34 |
| 180(R-1) + 22 | SAMPLE CLOCK asserted; ENABLE FILTER DRIVER asserted | Filter drivers 124 drive 16-bit bus 26 with second filtered data sample vector $F_i(180(R-1) + 22)$ of the Rth subframe |
| 180(R-1) + 26 | SELECT SET 2 asserted | Frame assembly unit 32 selects second preselected set of four bits from $F_i(180(R-1) + 0)$ and places that set on 4-bit bus 34 |
| 180(R-1) + 31 | SELECT SET 3 asserted | Frame assembly unit 32 selects third preselected set of four bits from $F_i(180(R-1) + 0)$ and places that set on 4-bit bus 34 |
| 180(R-1) + 36 | SELECT SET 4 asserted | Frame assembly unit 32 selects fourth preselected set of four bits from $F_i(180(R-1) + 0)$ and places that set on 4-bit bus 34 |
| 180(R-1) + 39 | LATCH BUS asserted | 16-bit bus latch 28 transfers second filtered data sample vector $F_i(180(R-1) + 22)$ of the Rth subframe from 16-bit bus 26 to frame assembly unit bus 30 |
| 180(R-1) + 41 | SELECT SET 1 asserted | Frame assembly unit 32 selects first preselected set of four bits from $F_i(180(R-1) + 22)$ and places that set on 4-bit bus 34 |
| 180(R-1) + 45 | SAMPLE CLOCK asserted; ENABLE | Filter drivers 124 drive 16-bit bus 26 with |

TABLE II-continued
BEGINNING OF FRAME AND ASSEMBLY OF FIRST SUBFRAME ASSEMBLY OF THE SECOND (R=2) AND THIRD (R=3) SUBFRAME

| Pulse of Bit Clock | Signal Action | Circuit Action |
|---|---|---|
| | FILTER DRIVER asserted | third filtered data sample vector $F_i(180(R-1) + 45)$ of the Rth subframe |
| 180(R-1) + 46 | SELECT SET 2 asserted | Frame assembly unit 32 selects second preselected set of four bits from $F_i(180(R-1) + 22)$ and places that set on 4-bit bus 34 |
| 180(R-1) + 51 | SELECT SET 3 asserted | Frame assembly unit 32 selects third preselected set of four bits from $F_i(180(R-1) + 22)$ and places that set on 4-bit bus 34 |
| 180(R-1) + 56 | SELECT SET 4 asserted | Frame assembly unit 32 selects fourth preselected set of four bits from $F_i(180(R-1) + 22)$ and places that set on 4-bit bus 34 |
| 180(R-1) + 59 | LATCH BUS asserted | 16-bit bus latch 28 transfers third filtered data sample vector $F_i(180(R-1) + 45)$ of the Rth subframe from 16-bit bus 26 to frame assembly unit bus 30 |
| 180(R-1) + 61 | SELECT SET 1 asserted | Frame assembly unit 32 selects first preselected set of four bits from $F_i(180(R-1) + 45)$ and places that set on 4-bit bus 34 |
| 180(R-1) + 66 | SELECT SET 2 asserted | Frame assembly unit 32 selects second preselected set of four bits from $F_i(180(R-1) + 45)$ and places that set on 4-bit bus 34 |
| 180(R-1) + 67 | SAMPLE CLOCK asserted; ENABLE FILTER DRIVER asserted | Filter drivers 124 drive 16-bit bus 26 with fourth filtered data sample vector $F_i(180(R-1) + 67)$ of the Rth subframe |
| 180(R-1) + 71 | SELECT SET 3 asserted | Frame assembly unit 32 selects third preselected set of four bits from $F_i(180(R-1) + 45)$ and places that set on 4-bit bus 34 |
| 180(R-1) + 76 | SELECT SET 4 asserted | Frame assembly unit 32 selects fourth preselected set of four bits from $F_i(180(R-1) + 45)$ and places that set on 4-bit bus 34 |
| 180(R-1) + 79 | LATCH BUS asserted | 16-bit bus latch 28 transfers fourth filtered data sample vector $F_i(180(R-1) + 67)$ of the Rth subframe from 16-bit bus 26 to frame assembly unit bus 30 |
| 180(R-1) + 81 | SELECT SET 1 asserted | Frame assembly unit 32 selects first preselected set of four bits from $F_i(180(R-1) + 67)$ and places that set on 4-bit bus 34 |
| 180(R-1) + 86 | SELECT SET 2 asserted | Frame assembly unit 32 selects second preselected set of four bits from $F_i(180(R-1) + 67)$ and places that set on 4-bit bus 34 |
| 180(R-1) + 90 | SAMPLE CLOCK asserted; ENABLE FILTER DRIVER asserted | Filter drivers 124 drive 16-bit bus 26 with fifth filtered data sample vector $F_i(180(R-1) + 90)$ of the Rth subframe |
| 180(R-1) + 91 | SELECT SET 3 asserted | Frame assembly unit 32 selects third preselected set of four bits from $F_i(180(R-1) + 67)$ and places |

TABLE II-continued

BEGINNING OF FRAME AND ASSEMBLY OF FIRST SUBFRAME ASSEMBLY OF THE SECOND (R=2) AND THIRD (R=3) SUBFRAME

| Pulse of Bit Clock | Signal Action | Circuit Action |
|---|---|---|
| | | that set on 4-bit bus 34 |
| 180(R-1) + 96 | SELECT SET 4 asserted | Frame assembly unit 32 selects fourth preselected set of four bits from $F_r(180(R-1) + 67)$ and places that set on 4-bit bus 34 |
| 180(R-1) + 99 | LATCH BUS asserted | 16-bit bus latch 28 transfers fifth filtered data sample vector $F_r(180(R-1) + 90)$ of the Rth subframe from 16-bit bus 26 to frame assembly unit bus 30 |
| 180(R-1) + 101 | SELECT SET 1 asserted | Frame assembly unit 32 selects first preselected set of four bits from $F_r(180(R-1) + 90)$ and places that set on 4-bit bus 34 |
| 180(R-1) + 106 | SELECT SET 2 asserted | Frame assembly unit 32 selects second preselected set of four bits from $F_r(180(R-1) + 90)$ and places that set on 4-bit bus 34 |
| 180(R-1) + 111 | SELECT SET 3 asserted | Frame assembly unit 32 selects third preselected set of four bits from $F_r(180(R-1) + 90)$ and places that set on 4-bit bus 34 |
| 180(R-1) + 112 | SAMPLE CLOCK asserted; ENABLE FILTER DRIVER asserted | Filter drivers 124 drive 16-bit bus 26 with sixth filtered data sample vector $F_r(180(R-1) + 112)$ of the Rth subframe |
| 180(R-1) + 116 | SELECT SET 4 asserted | Frame assembly unit 32 selects fourth preselected set of four bits from $F_r(180(R-1) + 90)$ and places that set on 4-bit bus 34 |
| 180(R-1) + 119 | LATCH BUS asserted | 16-bit bus latch 28 transfers sixth filtered data sample vector $F_r(180(R-1) + 112)$ of the Rth subframe from 16-bit bus 26 to frame assembly unit bus 30 |
| 180(R-1) + 121 | SELECT SET 1 asserted | Frame assembly unit 32 selects first preselected set of four bits from $F_r(180(R-1) + 112)$ and places that set on 4-bit bus 34 |
| 180(R-1) + 126 | SELECT SET 2 asserted | Frame assembly unit 32 selects second preselected set of four bits from $F_r(180(R-1) + 112)$ and places that set on 4-bit bus 34 |
| 180(R-1) + 131 | SELECT SET 3 asserted | Frame assembly unit 32 selects third preselected set of four bits from $F_r(180(R-1) + 112)$ and places that set on 4-bit bus 34 |
| 180(R-1) + 135 | SAMPLE CLOCK asserted; ENABLE FILTER DRIVER asserted | Filter drivers 124 drive 16-bit bus 26 with seventh filtered data sample vector $F_r(180(R-1) + 135)$ of the Rth subframe |
| 180(R-1) + 136 | SELECT SET 4 asserted | Frame assembly unit 32 selects fourth preselected set of four bits from $F_r(180(R-1) + 112)$ and places that set on 4-bit bus 34 |
| 180(R-1) + 139 | LATCH BUS asserted | 16-bit bus latch 28 transfers seventh filtered data sample vector |

TABLE II-continued
BEGINNING OF FRAME AND ASSEMBLY OF FIRST SUBFRAME ASSEMBLY OF THE SECOND (R=2) AND THIRD (R=3) SUBFRAME

| Pulse of Bit Clock | Signal Action | Circuit Action |
|---|---|---|
| | | $F_f(180(R-1) + 135)$ of the Rth subframe from 16-bit bus 26 to frame assembly unit bus 30 |
| 180(R-1) + 141 | SELECT SET 1 asserted | Frame assembly unit 32 selects first preselected set of four bits from $F_f(180(R-1) + 135)$ and places that set on 4-bit bus 34 |
| 180(R-1) + 146 | SELECT SET 2 asserted | Frame assembly unit 32 selects second preselected set of four bits from $F_f(180(R-1) + 135)$ and places that set on 4-bit bus 34 |
| 180(R-1) + 151 | SELECT SET 3 asserted | Frame assembly unit 32 selects third preselected set of four bits from $F_f(180(R-1) + 135)$ and places that set on 4-bit bus 34 |
| 180(R-1) + 156 | SELECT SET 4 asserted | Frame assembly unit 32 selects fourth preselected set of four bits from $F_f(180(R-1) + 135)$ and places that set on 4-bit bus 34 |
| 180(R-1) + 157 | SAMPLE CLOCK asserted; ENABLE FILTER DRIVER asserted | Filter drivers 124 drive 16-bit bus 26 with eighth filtered data sample vector $F_f(180(R-1) + 157)$ of the Rth subframe |
| 180(R-1) + 159 | LATCH BUS asserted | 16-bit bus latch 28 transfers eighth filtered data sample vector $F_f(180(R-1) + 157)$ of the Rth subframe from 16-bit bus 26 to frame assembly unit bus 30 |
| 180(R-1) + 161 | SELECT SET 1 asserted; ENABLE FILTER DRIVER deasserted; ENABLE OTHER DATA R asserted | Frame assembly unit 32 selects first preselected set of four bits from $F_f(180(R-1) + 157)$ and places that set on 4-bit bus 34; Rth 16-bit other data storage register places Rth sixteen bits of other information on 16-bit bus 26 |
| 180(R-1) + 166 | SELECT SET 2 asserted | Frame assembly unit 32 selects second preselected set of four bits from $F_f(180(R-1) + 157)$ and places that set on 4-bit bus 34 |
| 180(R-1) + 171 | SELECT SET 3 asserted | Frame assembly unit 32 selects third preselected set of four bits from $F_f(180(R-1) + 157)$ and places that set on 4-bit bus 34 |
| 180(R-1) + 176 | SELECT SET 4 asserted | Frame assembly unit 32 selects fourth preselected set of four bits from $F_f(180(R-1) + 157)$ and places that set on 4-bit bus 34 |
| 180(R-1) + 179 | ENABLE OTHER DATA R remains asserted; LATCH BUS asserted | 16-bit bus latch 28 transfers Rth sixteen bits of other information of the Rth subframe from 16-bit bus 26 to frame assembly unit bus 30 |

TABLE III

ASSEMBLY OF THE FOURTH AND FINAL SUBFRAME AND BEGINNING OF NEXT FRAME

| Pulse of Bit Clock | Signal Action | Circuit Action |
|---|---|---|
| 540 + 0 | SAMPLE CLOCK asserted; ENABLE FILTER DRIVER asserted | Filter drivers 124 drive 16-bit bus 26 with first filtered data sample vector $F_f(540 + 0)$ of the fourth subframe |
| 540 + 1 | SELECT SET 1 asserted; ENABLE OTHER DATA 3 deasserted; ENABLE FILTER DRIVER reasserted | Frame assembly unit 32 selects first preselected set of four bits of third sixteen bits of other information and places that set on 4-bit bus 34; Rth other data storage register no longer drives 16-bit bus 26; filter drivers 124 drive 16-bit bus 26 with filtered data sample vector $F_f(540 + 0)$ |
| 540 + 6 | SELECT SET 2 asserted | Frame assembly unit 32 selects second preselected set of four bits of third vector of other information and places those bits on 4-bit bus 34 |
| 540 + 11 | SELECT SET 3 asserted | Frame assembly unit 32 selects third preselected set of four bits of third vector of other information and places those bits on 4-bit bus 34 |
| 540 + 16 | SELECT SET 4 asserted | Frame assembly unit 32 selects fourth preselected set of four bits of third vector of other information and places those bits on 4-bit bus 34 |
| 540 + 19 | LATCH BUS asserted | 16-bit bus latch 28 transfers first filtered data sample vector $F_f(540 + 0)$ of the fourth subframe from 16-bit bus 26 to frame assembly unit bus 30 |
| 540 + 21 | SELECT SET 1 asserted | Frame assembly unit 32 selects first preselected set of four bits from $F_f(540 + 0)$ and places that set on 4-bit bus 34 |
| 540 + 22 | SAMPLE CLOCK asserted; ENABLE FILTER DRIVER asserted | Filter drivers 124 drive 16-bit bus 26 with second filtered data sample vector $F_f(540 + 22)$ of the fourth subframe |
| 540 + 26 | SELECT SET 2 asserted | Frame assembly unit 32 selects second preselected set of four bits from $F_f(540 + 0)$ and places that set on 4-bit bus 34 |
| 540 + 31 | SELECT SET 3 asserted | Frame assembly unit 32 selects third preselected set of four bits from $F_f(540 + 0)$ and places that set on 4-bit bus 34 |
| 540 + 36 | SELECT SET 4 asserted | Frame assembly unit 32 selects fourth preselected set of four bits from $F_f(540 + 0)$ and places that set on 4-bit bus 34 |
| 540 + 39 | LATCH BUS asserted | 16-bit bus latch 28 transfers second filtered data sample vector $F_f(540 + 22)$ of the fourth subframe from 16-bit bus 26 to frame assembly unit bus 30 |
| 540 + 41 | SELECT SET 1 asserted | Frame assembly unit 32 selects first preselected set of four bits from $F_f(540 + 22)$ and places that set on 4-bit bus 34 |
| 540 + 45 | SAMPLE CLOCK asserted; ENABLE FILTER DRIVER asserted | Filter drivers 124 drive 16-bit bus 26 with third filtered data sample vector $F_f(540 + 45)$ of the fourth subframe |
| 540 + 46 | SELECT SET 2 asserted | Frame assembly unit 32 selects second preselected set of four bits from $F_f(540 + 22)$ and places that set on 4-bit bus 34 |
| 540 + 51 | SELECT SET 3 asserted | Frame assembly unit 32 selects third preselected set of four bits from $F_f(540 + 22)$ and places that set on 4-bit bus 34 |
| 540 + 56 | SELECT SET 4 asserted | Frame assembly unit 32 selects fourth preselected set of four bits from $F_f(540 + 22)$ and places that set on 4-bit bus 34 |
| 540 + 59 | LATCH BUS asserted | 16-bit bus latch 28 transfers third filtered data sample vector $F_f(540 + 45)$ of the fourth subframe from 16-bit bus 26 to frame assembly unit bus 30 |
| 540 + 61 | SELECT SET 1 asserted | Frame assembly unit 32 selects first preselected set of four bits from $F_f(540 + 45)$ and places that set 4-bit bus 34 |
| 540 + 66 | SELECT SET 2 asserted | Frame assembly unit 32 selects second preselected set of four bits from $F_f(540 + 45)$ and places that set on 4-bit bus 34 |
| 540 + 67 | SAMPLE CLOCK asserted; ENABLE FILTER DRIVER asserted | Filter drivers 124 drive 16-bit bus 26 with fourth filtered data sample vector $F_f(540 + 67)$ of the fourth subframe |
| 540 + 71 | SELECT SET 3 asserted | Frame assembly unit 32 selects third preselected set of four bits from $F_f(540 + 45)$ and places that set on 4-bit bus 34 |
| 540 + 76 | SELECT SET 4 asserted | Frame assembly unit 32 selects fourth preselected set of four bits from $F_f(540 + 45)$ and places that set on 4-bit bus 34 |
| 540 + 79 | LATCH BUS asserted | 16-bit bus latch 28 transfers fourth filtered data sample vector $F_f(540 + 67)$ of the fourth subframe from 16-bit bus 26 to frame assembly unit bus 30 |
| 540 + 81 | SELECT SET 1 asserted | Frame assembly unit 32 selects first preselected set of four bits from $F_f(540 + 67)$ and places that set on 4-bit bus 34 |
| 540 + 86 | SELECT SET 2 asserted | Frame assembly unit 32 selects second preselected set of four bits from $F_f(540 + 67)$ and places that set on 4-bit bus 34 |
| 540 + 90 | SAMPLE CLOCK asserted; ENABLE FILTER DRIVER asserted | Filter drivers 124 drive 16-bit bus 26 with fifth filtered data sample vector $F_f(540 + 90)$ of the fourth subframe |
| 540 + 91 | SELECT SET 3 asserted | Frame assembly unit 32 selects third preselected set of four bits from $F_f(540 +$ |

TABLE III-continued

ASSEMBLY OF THE FOURTH AND FINAL SUBFRAME AND BEGINNING OF NEXT FRAME

| Pulse of Bit Clock | Signal Action | Circuit Action |
|---|---|---|
| 540 + 96 | SELECT SET 4 asserted | 67) and places that set on 4-bit bus 34 Frame assembly unit 32 selects fourth preselected set of four bits from F(540 + 67) and places that set on 4-bit bus 34 |
| 540 + 99 | LATCH BUS asserted | 16-bit bus latch 28 transfers fifth filtered data sample vector F(540 + 90) of the fourth subframe from 16-bit bus 26 to frame assembly unit bus 30 |
| 540 + 101 | SELECT SET 1 asserted | Frame assembly unit 32 selects first preselected set of four bits from F(540 + 90) and places that set on 4-bit bus 34 |
| 540 + 106 | SELECT SET 2 asserted | Frame assembly unit 32 selects second preselected set of four bits from F(540 + 90) and places that set on 4-bit bus 34 |
| 540 + 111 | SELECT SET 3 asserted | Frame assembly unit 32 selects third preselected set of four bits from F(540 + 90) and places that set on 4-bit bus 34 |
| 540 + 112 | SAMPLE CLOCK asserted; ENABLE FILTER DRIVER asserted | Filter drivers 124 drive 16-bit bus 26 with sixth filtered data sample vector F(540 + 112) of the fourth subframe |
| 540 + 116 | SELECT SET 4 asserted | Frame assembly unit 32 selects fourth preselected set of four bits from F(540 + 90) and places that set on 4-bit bus 34 |
| 540 + 119 | LATCH BUS asserted | 16-bit bus latch 28 transfers sixth filtered data sample vector F(540 + 112) of the fourth subframe from 16-bit bus 26 to frame assembly unit bus 30 |
| 540 + 121 | SELECT SET 1 asserted | Frame assembly unit 32 selects first preselected set of four bits from F(540 + 112) and places that set on 4-bit bus 34 |
| 540 + 126 | SELECT SET 2 asserted | Frame assembly unit 32 selects second preselected set of four bits from F(540 + 112) and places that set on 4-bit bus 34 |
| 540 + 131 | SELECT SET 3 asserted | Frame assembly unit 32 selects third preselected set of four bits from F(540 + 112) and places that set on 4-bit bus 34 |
| 540 + 135 | SAMPLE CLOCK asserted; ENABLE FILTER DRIVER asserted | Filter drivers 124 drive 16-bit bus 26 with seventh filtered data sample vector F(540 + 135) of the fourth subframe |
| 540 + 136 | SELECT SET 4 asserted | Frame assembly unit 32 selects fourth preselected set of four bits from F(540 + 112) and places that set on 4-bit bus 34 |
| 540 + 139 | LATCH BUS asserted | 16-bit bus latch 28 transfers seventh filtered data sample vector F(540 + 135) of the fourth subframe from 16-bit bus 26 to frame assembly unit bus 30 |
| 540 + 141 | SELECT SET 1 asserted | Frame assembly unit 32 selects first preselected set of four bits from F(540 + 135) and places that set on 4-bit bus 34 |
| 540 + 146 | SELECT SET 2 asserted | Frame assembly unit 32 selects second preselected set of four bits from F(540 + 135) and places that set on 4-bit bus 34 |
| 540 + 151 | SELECT SET 3 asserted | Frame assembly unit 32 selects third preselected set of four bits from F(540 + 135) and places that set on 4-bit bus 34 |
| 540 + 156 | SELECT SET 4 asserted | Frame assembly unit 32 selects fourth preselected set of four bits from F(540 + 135) and places that set on 4-bit bus 34 |
| 540 + 157 | SAMPLE CLOCK asserted; ENABLE FILTER DRIVER asserted | Filter drivers 124 drive 16-bit bus 26 with eighth filtered data sample vector F(540 + 157) of the fourth subframe |
| 540 + 159 | LATCH BUS asserted | 16-bit bus latch 28 transfers eighth filtered data sample vector F(540 + 157) of the fourth subframe from 16-bit bus 26 to frame assembly unit bus 30 |
| 540 + 161 | SELECT SET 1 asserted | Frame assembly unit 32 selects first preselected set of four bits from F(540 + 157) and places that set on 4-bit bus 34 |
| 540 + 166 | SELECT SET 2 asserted | Frame assembly unit 32 selects second preselected set of four bits from F(540 + 157) and places that set on 4-bit bus 34 |
| 540 + 171 | SELECT SET 3 asserted | Frame assembly unit 32 selects third preselected set of four bits from F(540 + 157) and places that set on 4-bit bus 34 |
| 540 + 176 | SELECT SET 4 asserted | Frame assembly unit 32 selects fourth preselected set of four bits from F(540 + 157) and places that set on 4-bit bus 34 |
| 540 + 179 | LATCH BUS asserted | |
| (Beginning of Next Frame.) | | |
| 720 | SAMPLE CLOCK asserted; ENABLE FILTER DRIVER asserted | Filter drivers 124 drive 16-bit bus 26 with first filtered data sample vector of the next frame F(720) |
| 720 + 1 | SELECT SECOND asserted | Frame assembly unit 32 places second set of four bits of other information (the frame check sequence) on 4-bit bus 34 |
| 720 + 6 | SYNC1 asserted | Coding unit 40 places first frame synchronization word on 5-bit bus 42 |
| 720 + 11 | SYNC2 asserted | Coding unit 40 places second frame synchronization word on 5-bit bus 42 |

Table I illustrates the beginning of the frame and the assembly of the first subframe containing eight filtered data sample vector. On pulse 0 the signals SAMPLE CLOCK and ENABLE FILTER DRIVER are asserted, as indicated in column 2, labelled "Signal Action." These signals have the effect, described in column 3, labelled "Circuit Action," of driving 16-bit bus 26 with the 16 bits of the filtered data sample vector labelled $F_f(0)$ for convenience. The "0" indicates that this vector was produced by the sampling and filtering unit 20 at pulse O of BIT CLOCK. Because 16-bit bus latch 28 has not yet latched, the bits of the 16-bit filtered data sample vector $F_f(0)$ on 16-bit bus 26 do not yet flow into the frame assembly section 4B.

At pulse 6, the signal SYNC1 is asserted and has the effect indicated in column 3. The five bits of the first 5-bit frame synchronization word are driven immediately over 5-bit bus 42 and latched into the serializing unit 44 during pulse 9. The serializing unit 44 transmits the first bit of that first five-bit frame synchronization word over line 6 during pulse 10. The serializing unit 44 drives the remaining four bits of this first frame synchronization word over line 6 on the next four pulses of the signal BIT CLOCK, which are not listed in Table I. The timing and signal control unit 90 supplies appropriate signals (not shown) to the serializing unit 44 to clock properly the operations of the serializing unit 44.

At pulse 11, the signal SYNC2 is asserted and has the effect indicated in column 3. The five bits of the second 5-bit frame synchronization word are transmitted in the same way as were the bits of the first frame synchronization word but five pulses of BIT CLOCK later.

At pulse 16, the signal SELECT FIRST is asserted and has the effect indicated in column 3. Storage register 64 drives the first set of four bits of other information it holds onto 4-bit bus 66, and frame assembly unit 32 immediately appropriately sets the Define Superframe bit and drives the remaining bits on 4-bit bus 66 onto 4-bit bus 34. The timing and control signal unit 90 asserts the signal COMPLEMENT at pulse 16, and complementing unit 36 immediately complements the bits on 4-bit bus 34 and places the complemented bits on 4-bit bus 38. Coding unit 40 receives the four bits present on 4-bit bus 38 and immediately drives the 5-bit code word corresponding to those four bits onto 5-bit bus 42. The 5-bit code word thus placed on 5-bit bus 42 is latched into serializing unit 44 during pulse 19. Serializing unit 44 transmits the first bit of that five-bit code word over line 6 during pulse 20. Serializing unit 44 drives the remaining four bits of this code word over line 6 in the next four pulses of the signal BIT CLOCK, which are not listed in Table I.

At pulse 19 the frame assembly section 4B begins to receive data from the data assembly section 4A. As indicated in column 2 of Table I, at pulse 19 the signal LATCH BUS is asserted, causing 16-bit bus latch 28 to latch and thereby to transfer to bus 30 the bits which are, at pulse 19, on bus 26. As already indicated in the discussion of the events at pulse 0, and as indicated in column 3 of Table I, at pulse 0 bus 26 was driven with the filtered data sample vector $F_f(0)$, which continues to be held on bus 26 through at least pulse 19 (but not at pulse 22, as described below).

At pulse 21 the bits of $F_f(0)$ also begin to flow through frame assembly section 4B. The assertion of the signal SELECT SET 1 causes frame assembly unit 32 to place the first preselected set of four bits from $F_f(0)$, which are present on bus 30, on bus 34. Because the signal COMPLEMENT is not asserted at pulse 21, complementing unit 36 does not complement the four bits on bus 34 but rather immediately places the uncomplemented bits on 4-bit bus 38. The bits on bus 38 are then coded, and the bits of the code word 4-bit bus 38 are then coded, and the bits of the code word are latched into the serializing unit 44 during pulse 24. The first bit of that code word appears on line 6 at pulse 25.

At pulse 26 the second set of four bits of $F_f(0)$ begins to flow through frame assembly section 4B. The assertion of the signal SELECT SET 2 causes frame assembly unit 32 to place the second preselected set of four bits from $F_f(0)$, which are still being held by 16-bit bus latch 28 on bus 30, on bus 34. The signal COMPLEMENT is asserted again at pulse 26, and the four bits placed on bus 34 at pulse 26 are complemented by complementing unit 36 and placed on bus 38. The bits on bus 38 are then coded, and the bits of the code word are transmitted, as described above.

At pulses 31 and 36 the third preselected set and the fourth preselected set, respectively, of four bits from $F_f(0)$ are placed on bus 34 and flow through the remainder of the frame assembly section 4B as described above. The third preselected set of four bits is not complemented, and the fourth preselected set of four bits is complemented.

At pulse 22 another filtered data sample vector $F_f(22)$ is driven from sampling and filtering unit 20 onto 16-bit bus 26. Because 16-bit bus latch 28 isolates (or "buffers") the data assembly section 4A from the frame assembly section 4B, the bits of $F_f(22)$ do not yet flow into the frame assembly section 4B. However, $F_f(22)$ remains on 16-bit bus 26 ready to be transferred into frame assembly section 4B on the next latching of 16-bit bus latch 28, which occurs at pulse 39.

The events which occur in frame assembly section 4B after $F_f(22)$ is latched onto bus 30 at pulse 39 repeat the events, described above, which occurred after $F_f(0)$ was latched into frame assembly section 4B at pulse 19. These events are summarized in Table I.

From the description of the timing and control signals given above, and from Table, it is apparent that, in the first subframe, the sampling and filtering unit 20 drives six additional new filtered data sample vectors $F_f(45)$, $F_f(67)$. $F_f(90)$, $F_f(112)$, $F_f(135)$, and $F_f(157)$ onto bus 26 at pulses 45, 67, 90, 112, 135, and 157, respectively. It is also apparent that bus latch 30 transfers these six additional new filtered data sample vectors into the frame assembly section 4B at pulses 59, 79, 99, 119, 139, and 159, respectively. It is also apparent that the sixteen bits of each of these new filtered data sample vectors flow through frame assembly section 4B in the same way as described above in connection with $F_f(0)$ and $F_f(22)$.

At pulse 179 an important difference occurs, which reflects the opening of the time slot between the group of eight filtered data sample vectors in the first subframe and the group of eight filtered data sample vectors in the second subframe. The eighth filtered data sample vector $F_f(157)$ of the first set of eight filtered data sample vectors has already been latched into frame assembly section B at pulse 159. At pulse 161 the signal ENABLE FILTER DRIVER is deasserted, and the signal ENABLE OTHER DATA 1 is asserted and remains asserted until pulse 181. As discussed above, this signal ENABLE OTHER DATA 1 causes the first other data storage register 46 to drive 16-bit bus 26, thus placing the first set of sixteen bits of other data which had been held in that storage register onto bus 26. Thus, during the time between pulse 161 and pulse 181 the first set of sixteen bits of other data is on 16-bit bus 26. At pulse 179, the signal LATCH BUS is asserted, which transfers that first set of sixteen bits of other data to bus 30. At pulse 181, the signal SELECT SET 1 is asserted, which begins the cycle (continued with SELECT SET 2, SELECT SET 3, and SELECT SET 4) which proceeds, as described above, to feed the bits of the first set of sixteen bits of other data four bits at a time onto bus 34 and feeds the corresponding code bits onto line 6. Those events are described in the beginning of Table II, which follows the movement of the rest of the first set of sixteen bits of other data in the second subframe.

At pulse 180 of BIT CLOCK, which begins the second subframe, SAMPLE CLOCK is again asserted, placing a new filtered data sample vector $F_f(180)$ at the output of sampling and filtering unit 20. The signal ENABLE FILTER DRIVER is reasserted at pulse 181, driving that vector onto bus 26. The first set of sixteen bits of other data thus moves into frame assembly section 4B during the gap between the deassertion of the signal ENABLE FILTER DRIVER at pulse 161 (at which time the signal ENABLE OTHER DATA 1 is also asserted) and the reassertion of the ENABLE signal at pulse 181 (at which time the signal ENABLE OTHER DATA 1) is deasserted). The 16-bit bus latch 28 stores that first set of sixteen bits of other data between the assertion of the signal LATCH BUS at pulse 179 and the next assertion of LATCH BUS at pulse 180+19.

The second and third subframes are identical in structure. Table II described both the second and the third subframe by using the running variable R, which takes the value 2 for the second subframe and 3 for the third subframe. When R is 2, Table II identifies the pulses of BIT CLOCK at which events in transmitting the second subframe occur. When R is 3, Table II identifies the pulses of BIT CLOCK a which events in transmitting the third subframe occur.

It will be apparent that the events described in Table II largely repeat the events described in Table I in connection with the first subframe. The only exception is that the first and second frame synchronization words, and the first set of four bits of other information, which the frame assembly section 4B inserts at pulses 6, 11, and 16 in the first subframe, are not present in the second or third subframes. Their places are taken by the second, third, and fourth sets of four bits from either the first set of sixteen bits of other data (in the case of the second subframe) or the second set of sixteen bits of other data (in the case of the third subframe).

The fourth and final subframe is largely the same in structure as the second and third subframes. The events of the fourth subframe are described Table III. From Table III it is apparent that the fourth subframe begins with events which transmit the second, third, and fourth sets of four bits from the third set of sixteen bits of other data. Up to pulse 719 the events of the fourth subframe largely repeat the events of the second and third subframes.

At pulse 721 the fourth subframe departs from the pattern set by the second and third subframes. At pulse 721 the last of the frame recognition elements (the frame check sequence) is inserted. This event occurs through the assertion of the signal SELECT SECOND. As a result, in the illustrated embodiment the 4-bit frame check sequence, calculated in frame assembly unit 32 over all preceding bits in the frame except for the two frame synchronization words, is inserted on bus 34 and flows through the remainder of frame assembly section 4B just as any other 4-bit word.

The next frame begins as did the preceding frame. As indicated in Table III, the signals SYNC1, SYNC2, and SELECT FIRST are asserted at pulses 720+006, 720+011, and 720+016, respectively. By comparing Table III at these pulses with Table I at pulses 6, 11, and 16, the relationship between the end of one frame and the beginning of the following frame is apparent.

The flow of bits through the multiplexing unit 4 is thus maintained in a steady stream in real time without the need to store any significant fraction of the data from the high-speed data input lines 2 (there is a very limited storage in real time in sampling and filtering unit 20 and in 16-bit bus latch 28) or to interrupt transmission of data from the high-speed data input lines 2 to transmit either previously stored data or the low-speed data and control information or the frame recognition bits. In the time interval in which the sampling and filtering unit 20 takes thirty-two samples of each of the data input lines 2, the frame assembly unit 32 transmits a complete frame based on 4-bit words of 576 bits; the coding unit 40 transforms that frame based on 4-bit words into a complete frame based on 5-bit words having 720 bits; and serializing unit 44 converts the entire frame based on 5-bit words into serial bits output on line 6 to electrical-to-optical converter 8. The multiplexing unit 4 is thus able to transmit all the bits in the frame while the data is being sampled from the high-speed data input lines 2.

The Frame Check Sequence. As discussed above, the frame assembly unit calculates a frame check sequence for each frame over all the bits placed on bus 34 during the frame (except for the frame check sequence). The frame check sequence should have three characteristics. First, the frame check sequence should be efficient at detecting the types of code-bit errors which are the most common types of errors on the transmission system chosen. In a fiber optic transmission system, the most common types of errors are single-code-bit errors and burst errors. Second, the frame check sequence should be orthogonal to the coding system of the invention. There are a number of polynomials which can be chosen to generate such a frame check sequence; the illustrated embodiment uses the polynomial $x^4+x^3+1$. Third, the ending state of the frame check sequence should not be all zeroes or all ones, because such an ending state could also be produced by certain types of error conditions. In the illustrated embodiment 0101 is chosen as the ending state of the frame check sequence, although other ending states could also be chosen. This ending state dictates the choice of the beginning state of the frame check sequence; in the illustrated embodiment, the beginning state is 1111 at the time designated as the start of the frame.

Figure 4:
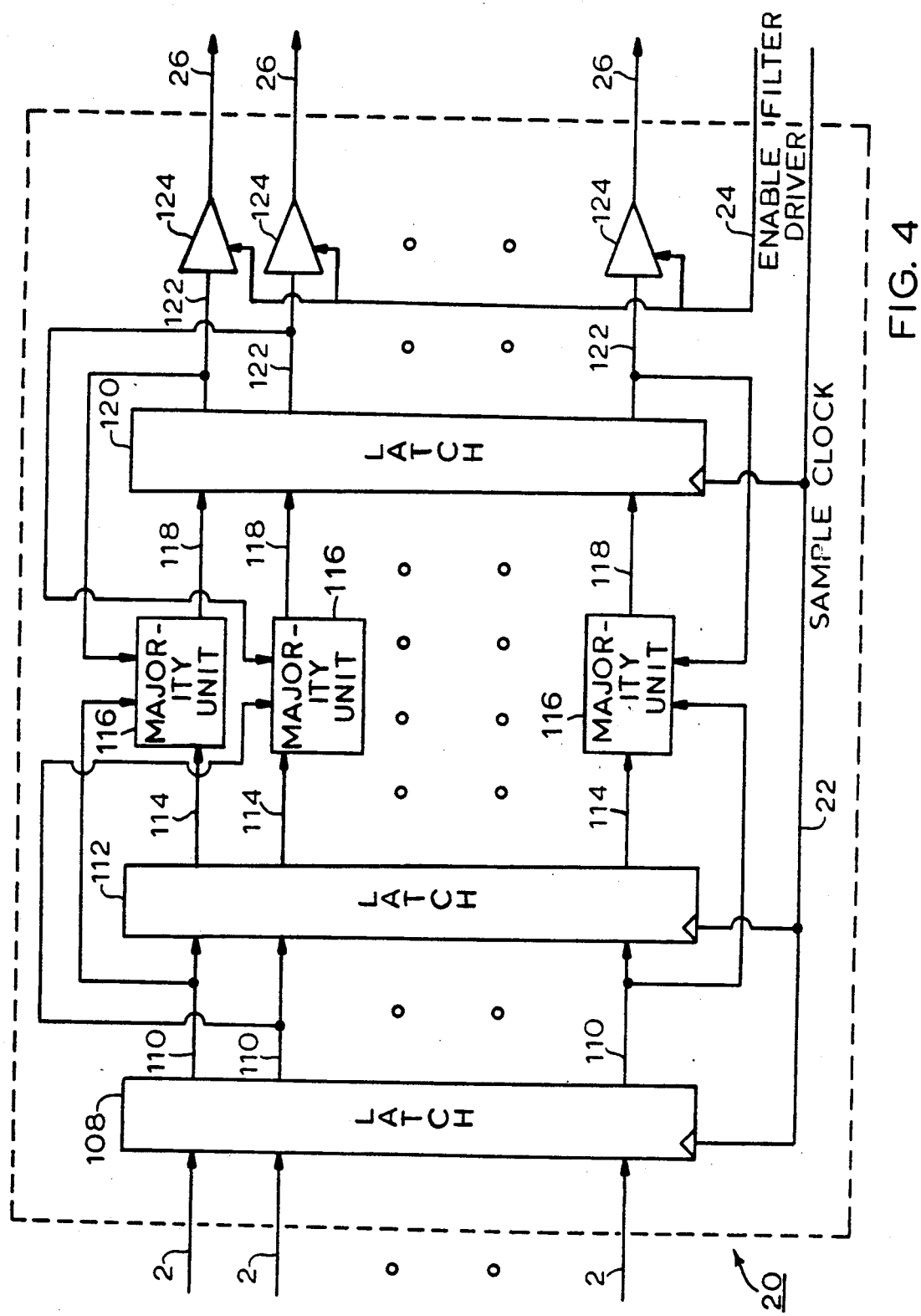
FIG. 4 is a schematic block diagram of the sampling and filtering unit contained in the multiplexing unit.

The Sampling and Filtering Unit 20. Those skilled in the art will recognize that there are many ways to design circuits which will perform the sampling and filtering steps carried out in the sampling and filtering unit 20. FIG. 4 depicts one illustrative circuit.

The sampling steps are performed by the latching of 16-bit latch 108. At each assertion of the signal SAMPLE CLOCK, supplied to 16-bit latch 108 over a line 22, 16-bit latch 108 latches, thus transferring whatever bits were present on each of the high-speed data input lines 2 at that time to one of the sixteen lines 110.

Figure 5:
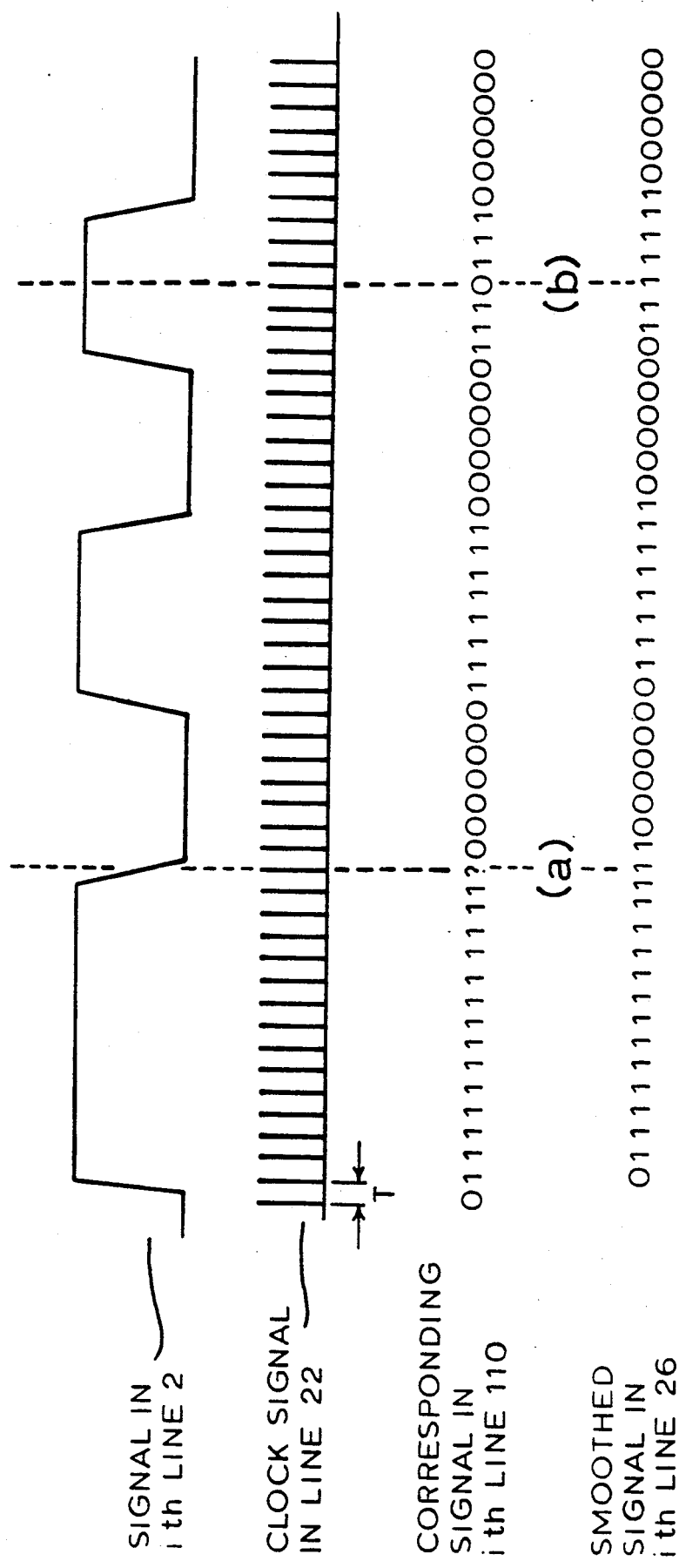
FIG. 5 illustrates two common types of errors which may arise in sampling a stream of serial binary data and the way in which those errors are smoothed by the smoothing algorithm used in the illustrated embodiment.

There may be errors in sampling the data in the high-speed data input lines 2. Common types of sampling errors are (a) sampling during a level transition on a data input line 2, and (b) erroneously sending a single sample as an incorrect bit. The first type of error, which can occur when the sample is taken during transitions between bit levels, is illustrated in FIG. 5 at the sample marked "a". In such a case the sampling unit may assign either a zero or a one value to the sample. The second type of error is illustrated in FIG. 5 at the sample marked "b".

Because the sampling rate—that is, the average rate of the signal SAMPLE CLOCK—exceeds the maximum level transition rate B by a factor of at least seven in one specific embodiment, the sample bits from any high-speed data input line 2 should change at most once every seven samples. Accordingly, for any stream of sample bits on any one line of the sixteen lines 110, any bit which is different from both the preceding bit and the following bit is invalid. Examples of such an error are the bit successions 0,0,0,0,1,0,0 and 0,0,0,1,0,0,0, in each of which the bit 1 is invalid.

The illustrated embodiment of the invention employs a smoothing algorithm to filter such sampling errors. As shown in FIG. 4, each line 110 leads to an input to each of two other components. First, each line 110 leads to an input to another 16-bit latch 112 which, like 16-bit latch 108, latches whenever the signal SAMPLE CLOCK, also supplied to 16-bit latch 112 over line 22, is asserted. Second, each line 110 also leads to one input of a majority algorithm unit 116. Each output line 114 of 16-bit latch 112 also leads to another input to a corresponding majority algorithm unit 116.

The output of each majority algorithm unit 116 feeds over a line 118 to an input to another 16-bit latch 120. Latch 120, like latches 108 and 112, latches whenever the signal SAMPLE CLOCK, also supplied over line 22, is asserted. Each of the sixteen output lines 122 of latch 120 leads to one input of each of two other units. First, each output line 122 of latch 120 leads back to one input to a majority algorithm unit 116. Second, each output line 122 leads to an input to a driver 124 which, in response to assertion of the signal ENABLE FILTER DRIVER over line 24, drives the bits then present on each line 122 onto a corresponding line of 16-bit bus 26.

Each majority algorithm unit 116 places on its output line 118 a signal which has the same value as the bit on the majority of its three input lines 110, 114, and 122. For example, if the signal on the input line 110 of a majority algorithm unit has a value of one, the signal on the input line 114 of that unit has a value of zero, and the signal on the input line 122 of that unit has a value of one, then the associated majority algorithm unit 116 places on its output line 118 a one bit. Each majority algorithm unit 116 asserts its output immediately in response to its inputs.

The output of the latch 120 onto the sixteen lines 122 can be considered as a filtered data sample vector $F_i(t)$, where i (which is an integer from 1 to 16, inclusive) indicates which line carries a signal having the value of the ith bit of the vector and t indicates the time at which the bits are placed on the lines 122.

FIG. 5 also illustrates the effect of using this algorithm to filter the data samples. The smoothing algorithm converts the undetermined value in the sample stream at time (a) into a one bit, and converts the erroneous zero bit sample at time (b) into a one bit. Although the algorithm may slightly delay the recognition of level transitions—whether or not an erroneous sample bit is present—such a slight phase delay should not have a significant effect on the proper reception of data by the demultiplexing unit 16 or units connected to it.

THE DEMULTIPLEXING UNIT 16

Figure 6A:
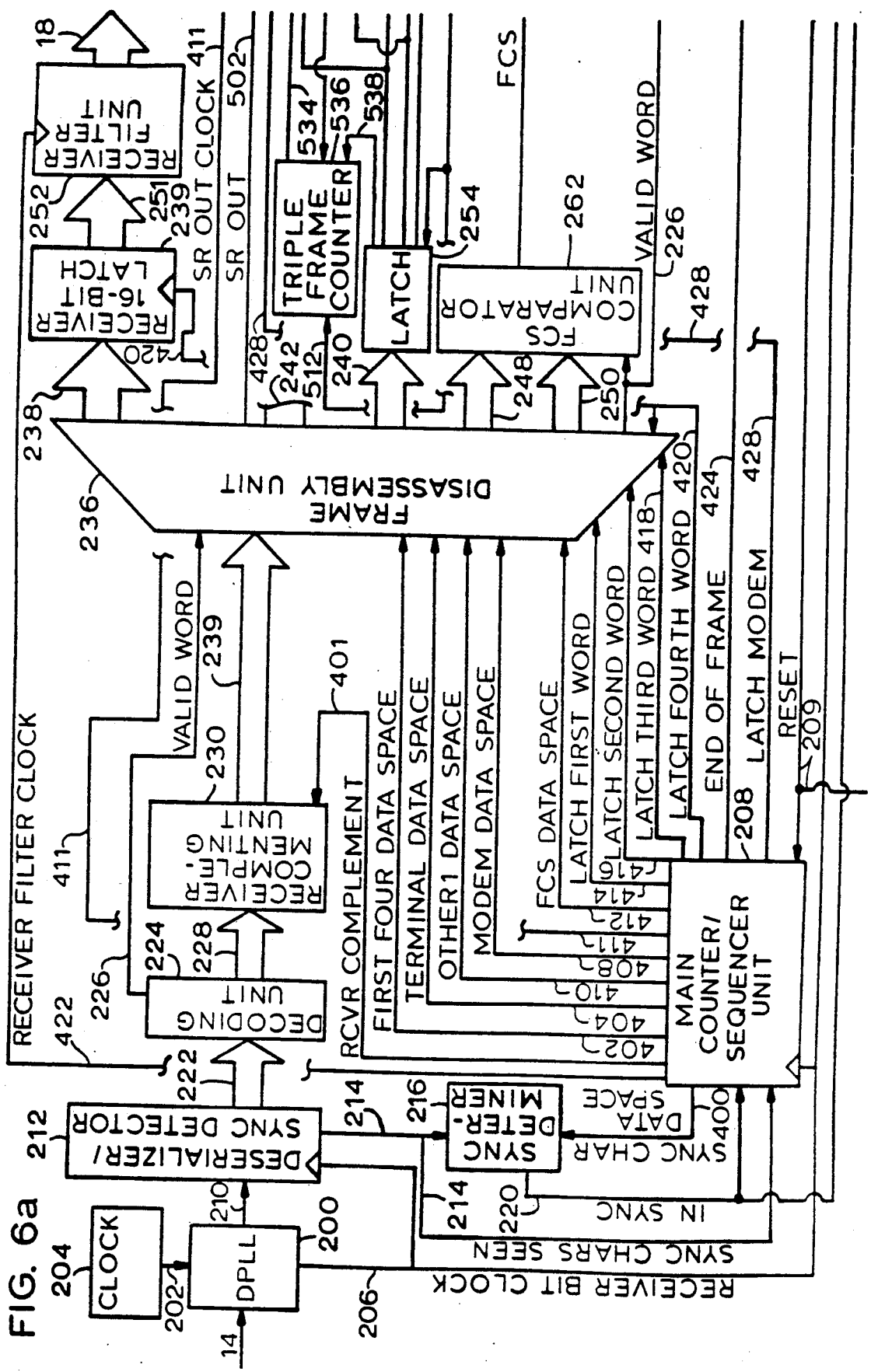
FIGS. 6A and 6b together comprise a schematic block diagram of the demultiplexing unit in the reception portion of an optical demultiplexing unit in the reception portion of an optical fiber communications system which uses the illustrated embodiment of the invention.
Figure 6B:
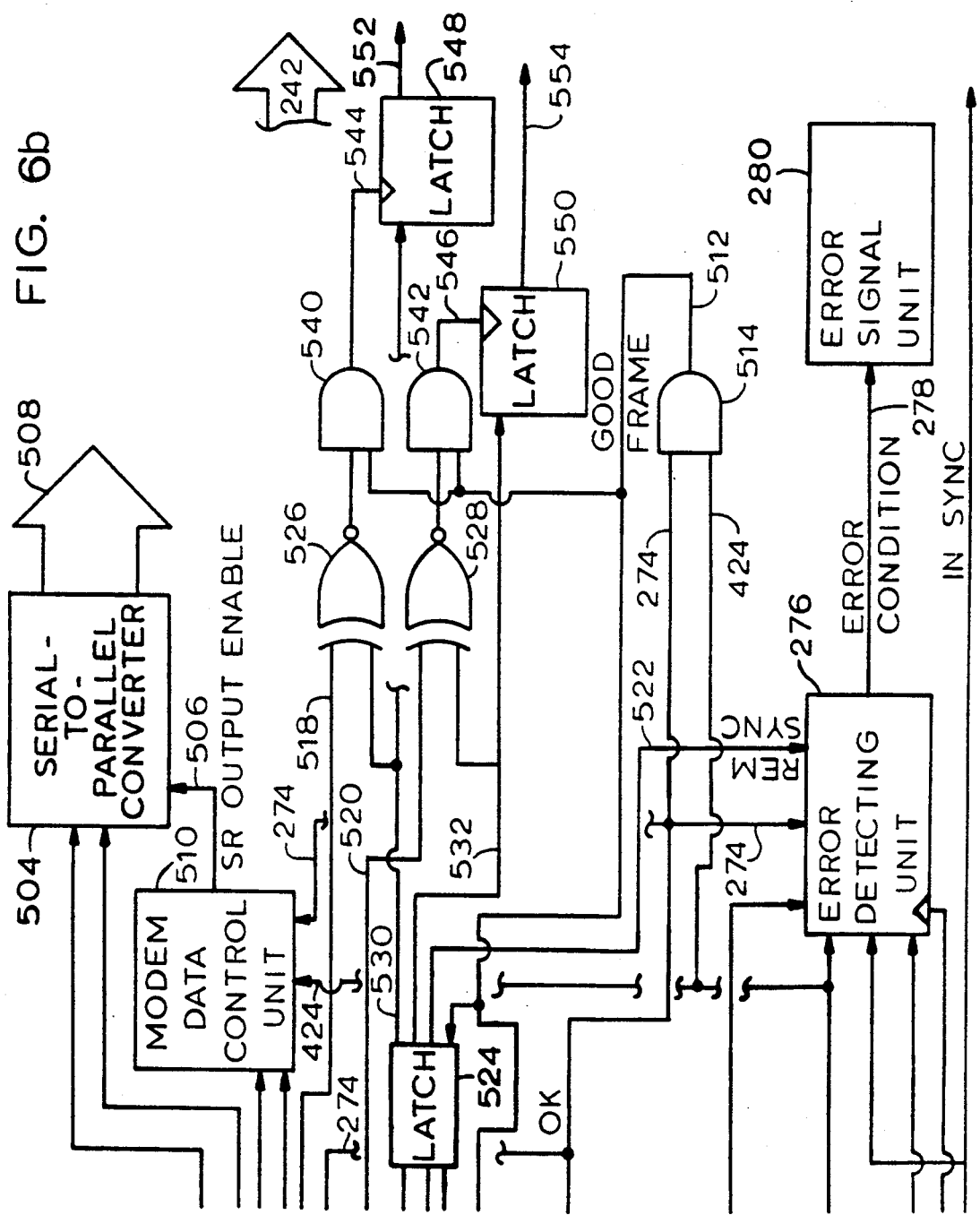

The demultiplexing unit 16 is shown in greater detail in FIGS. 6A and 6b. Line 14 leads to a digital phase-locked loop 200, which compares the stream of bits in line 14 with a clock signal received over line 202 from a clock 204. In the illustrated embodiment the clock signal from the clock 204 has a frequency intended to be approximately seven times the frequency of the signal BIT CLOCK in the multiplexing unit 4.

The digital phase-locked loop 200 derives from the stream of incoming bits in line 14 a clock signal—RECEIVER BIT CLOCK—synchronized with the incoming bits, at the rate of the signal BIT CLOCK in the multiplexing unit 4. The digital phase-locked loop 200 feeds the RECEIVER BIT CLOCK signal through line 206 to a main counter/sequencer unit 208 and to an error detecting unit 276. The digital phase-locked loop 200 also feeds to line 210 a serial bit stream, in synchronization and in phase with the RECEIVER BIT CLOCK signal, containing the same bits as in the serial bit stream in line 14.

Line 210 leads to a deserializer and sync code detecting unit 212. This unit monitors the serial bit stream in line 210 to detect the sequence of bits forming the first and second frame synchronization words (in one specific embodiment, that sequence is 1010000101). When this unit detects that bit sequence, it asserts the signal SYNC CHARS SEEN over line 214 to a sync determining unit 216 and a main counter/sequencer unit 208.

The main counter/sequencer unit 208 uses the assertions of the signal RECEIVER BIT CLOCK as the basis for asserting the timing and control signals which regulate the operation of the demultiplexing unit 16. The main count ®r/sequencer unit 208 uses the signals IN SYNC, received over line 220 from the sync determining unit 216, and SYNC CHARS SEEN, received over line 214 from the deserializer and sync code detecting unit 212, to reset its internal counters (not shown) so that they cause the timing and control signals to be asserted at the proper times to decode and demultiplex the incoming bit stream for transmission over output lines 17 and 18. The sync determining unit 216, the operation of which is described in greater detail below, determines when to assert the signal IN SYNC The main counter/sequencer 208 uses the signals SYNC CHARS SEEN and IN SYNC as follows. First, the assertion of the signal SYNC CHARS SEEN, coming at a point when the signal IN SYNC is not asserted, resets circuitry (not shown) internal to main counter/sequencer unit 208 to assert the timing and control signals at certain following pulses of RECEIVER BIT CLOCK. As described in greater detail below, particularly in connection with Tables IV, V, and VI, the timing and control signals are produced at particular times in a 720-pulse sequence of RECEIVER BIT CLOCK. The assertion of the signal SYNC CHARS SEEN (when IN SYNC is deasserted) resets that pulse sequence, which runs from pulse zero to pulse 719 of RECEIVER BIT CLOCK. When the signal IN SYNC shifts from a non-asserted state to an asserted state, the main counter/sequencer unit 208 produces the timing and control signals in a pattern which continues to repeat until both the signal IN SYNC is deasserted and the signal SYNC CHARS SEEN then is asserted over line 214. Second, if the signal IN SYNC is then deasserted (which indicates that the demultiplexing unit is not in synchronization with the incoming bit stream), the deserializer and sync code detecting unit 212 must assert the signal SYNC CHARS SEEN to reset the internal circuitry of the main counter/sequencer unit 208 to realign the sequence of timing and control signals to the incoming data stream. The main counter/sequencer unit 208 can also be reset through assertion of the signal RESET over line 209 by a unit (not shown) such as a manually actuated switch. Such resetting is not relevant to the operation of the invention as described here. The RESET signal is used only to bring the behavior of the embodiment of the invention into agreement with this operational description. For this purpose the embodiment applies the RESET signal once when operating power is first applied to the embodiment.

The sync determining unit 216 determines whether the main counter/sequencer unit 208 is properly synchronized with the stream of bits received by the deserializer and sync code detecting unit 212 over line 210. It does this by comparing the assertion of the signal SYNC CHARS SEEN with a signal produced by the main counter/sequencer unit 208. Main counter/sequencer unit 208 asserts the signal SYNC CHAR DATA SPACE over line 400 at the time that deserializer and sync code detecting unit 212 should receive the last bit of the two frame synchronization words over line 210, if the internal counters (not shown) of the main counter/sequencer unit 208 are properly aligned with the incoming bit stream. (In the illustrated embodiment, this occurs at pulse 719 of every 0- through 719-pulse cycle of RECEIVER BIT CLOCK.)

The sync determining unit 216 compares the times at which the signals SYNC CHARS SEEN and SYNC CHAR DATA SPACE are asserted. If, for each of three successive assertions of the signal SYNC CHARS SEEN, the signal SYNC CHAR DATA SPACE is asserted simultaneously with SYNC CHARS SEEN, the sync determining unit 216 asserts the signal IN SYNC over line 220 to the main counter/sequencer unit 208. This condition for asserting the Signal IN SYNC indicates that for two complete successive frames the main counter/sequencer unit has properly synchronized its timing and control signals with the beginning and end of each frame. This in turn occurs when a first, second, and third pair of frame synchronization words have been received, with the first and second pair, and the second and third pair, separated by the number of pulses of RECEIVER BIT CLOCK corresponding to the proper reception of the remainder of a frame following the first and second pairs of frame synchronization words. The assertion of the signal IN SYNC indicates to an error detecting unit 278, described in greater detail below in connection with FIG. 7, that the main counter/sequencer unit 208 is in proper synchronization with the incoming bit stream.

The signal IN SYNC continues to be asserted until the main counter/sequencer unit 208 has twice successively asserted the signal SYNC CHAR DATA SFACE and, for each of those two assertions, the signal SYNC CHARS SEEN is not simultaneously asserted. When this occurs, the signal IN SYNC is deasserted (if it was previously asserted) or remains not asserted (if it was previously not asserted) and is not asserted again until the condition for asserting that signal is satisfied. This condition for deasserting the signal IN SYNC occurs when two successive pairs of frame synchronization words have not been detected at the time when the main counter/sequencer 208 indicates that they should be detected. Such an occurrence could indicate that the main counter/sequencer unit 208 is not aligned with an entire frame of incoming data or that some other problem exists in the bit stream in line 210. By waiting for two successive assertions of SYNC CHAR DATA SPACE to deassert IN SYNC, rather than deasserting IN SYNC on the first such occurrence, transient errors limited to a part of a single frame (particularly transient errors which affect a single pair of frame synchronization words) do not cause the deassertion of IN SYNC, but lack of synchronization of main counter/sequencer unit 208 to the incoming data, extending beyond a single frame, does cause the deassertion of IN SYNC.

The deserializer and sync code detecting unit 212 also deserializes the bits received over line 210 and puts those bits (except for the bits of either frame synchronization word) out in parallel, with one bit on each line of 5-bit channel 222. The signal RECEIVER BIT CLOCK feeds to the deserializing unit 212 over line 206 and clocks the receipt of bits by the deserializing unit 212, which may, for example, contain a standard 5-bit serial-in parallel-out shift register. After every 5th pulse of RECEIVER BIT CLOCK, deserializing unit 212 places on 5-bit channel 222 a 5-bit word having as bits the 5 bits which deserializing unit 218 received over line 210 in the preceding five pulses of RECEIVER BIT CLOCK.

Channel 222 leads to a decoding unit 224, which performs the inverse of the coding operation performed in the coding unit 40 in the multiplexing unit 4. When a 5-bit word appears on channel 222, the decoding unit 224 determines whether the 5-bit word is a valid code word. If the 5-bit word on channel 222 is a valid code word, the decoding unit 224 immediately places on 4-bit channel 228 the 4-bit word to which that valid code word corresponds. In addition, if the 5-bit word is a valid code word, the decoding unit 224 immediately asserts the signal VALID WORD over line 226. Line 226 leads to the frame disassembly unit 236 and also to an FCS (frame check sequence) comparator unit 262 and an error detecting unit 276. If the 5-bit word is not a valid code word, the decoding unit 224 does not assert the signal VALID WORD and does not place any 4-bit word on channel 234.

Channel 228 leads to a receiver complementing unit 230, which carries out the same operation as the complementing unit 36 in the multiplexing unit 4. The main counter/sequencer unit 208 asserts the signal RCVR COMPLEMENT over line 401 on the fifth pulse of RCVR BIT CLOCK after the signal IN SYNC or RESET and on each tenth pulse of RECEIVER BIT CLOCK thereafter. (In one specific embodiment the signal RECEIVER COMPLEMENT is asserted in each frame on the following pulses of RECEIVER BIT CLOCK after the assertion of the signal IN SYNC: 5, 15, 25, 35, . . . 695, 705.) In response to the assertion of the signal RCVR COMPLEMENT, the receiver complementing unit 230 complements the bits of the 4-bit word present on 4-bit channel 228 and places those four complemented bits immediately on 4-bit bus 234. If the signal RCVR COMPLEMENT is not asserted, the receiver alternate complementing unit 230 immediately passes the bits on 4-bit channel 228 through to 4-bit bus 234 without any change. Receiver complementing unit 230 can be made in the same way as the complementing unit 36 in the multiplexing unit 4.

Bus 234 leads to a frame disassembly unit 236, in which bits from bus 234 are latched to the outputs of the frame disassembly unit 236 by appropriate 4-bit latches (not shown) within the frame disassembly unit 236 in response to control signals asserted by the main counter/sequencer unit 208, if the signal VALID WORD is asserted over line 226 simultaneously with the assertion of those control signals. If the signal VALID WORD is not asserted simultaneously with the assertion of those control signals, each 4-bit latch (not shown) continues to assert the 4-bit word it previously placed on its output.

The 4-bit latches (not shown) in the frame disassembly unit 236 generally reverse the steps which the frame assembly unit 32 performed between-16-bit- bus 26 and 4-bit bus 34 in the multiplexing unit 4. That is the 4-bit latches (not shown) in the frame disassembly unit 236 produce from a succession of 4-bit words on bus 234 a succession of 16-bit words on 16-bit bus 238. The bits on bus 234 are latched onto a first preselected set of four lines of 16-bit data bus 238 in response to the assertion of the signal LATCH FIRST WORD over line 414 while the signal TERMINAL DATA SPACE is asserted over line 404. The bits on bus 234 are latched onto a second preselected set of four lines of 16-bit data bus 238 in response to the assertion of the signal LATCH SECOND WORD over line 416 while the signal TERMINAL DATA SPACE is asserted over line 404. The bits on bus 234 are latched onto a third preselected set of four lines of 16-bit data bus 238 in response to the assertion of the signal LATCH THIRD WORD over line 418 while the signal TERMINAL DATA SPACE is asserted over line 404. The bits on bus 232 are latched onto a fourth preselected set of four lines of 16-bit data bus 238 in response to the assertion of the signal LATCH FOURTH WORD over line 420 while the signal TERMINAL DATA SPACE is asserted over line 404. The first, second, third, and fourth preselected sets of four lines of 16-bit bus 238 together contain all sixteen lines of that bus.

16-bit data bus 238 leads to a receiver 16-bit latch 239, which latches whenever the signal LATCH FOURTH WORD, also supplied to receiver 16-bit latch 239 over line 420, is asserted. Receiver latch 239 latches the bits on bus 238 onto bus 251. Receiver latch 239 is so constructed that that four bits latched by the fourth four-bit latch (not shown) in the frame disassembly unit 236 on the assertion of LATCH FOURTH word also are latched by receiver latch 239 onto four lines of 16-bit bus 251. Bus 251 in turn leads to a receiver filter unit 252.

Figure 8:
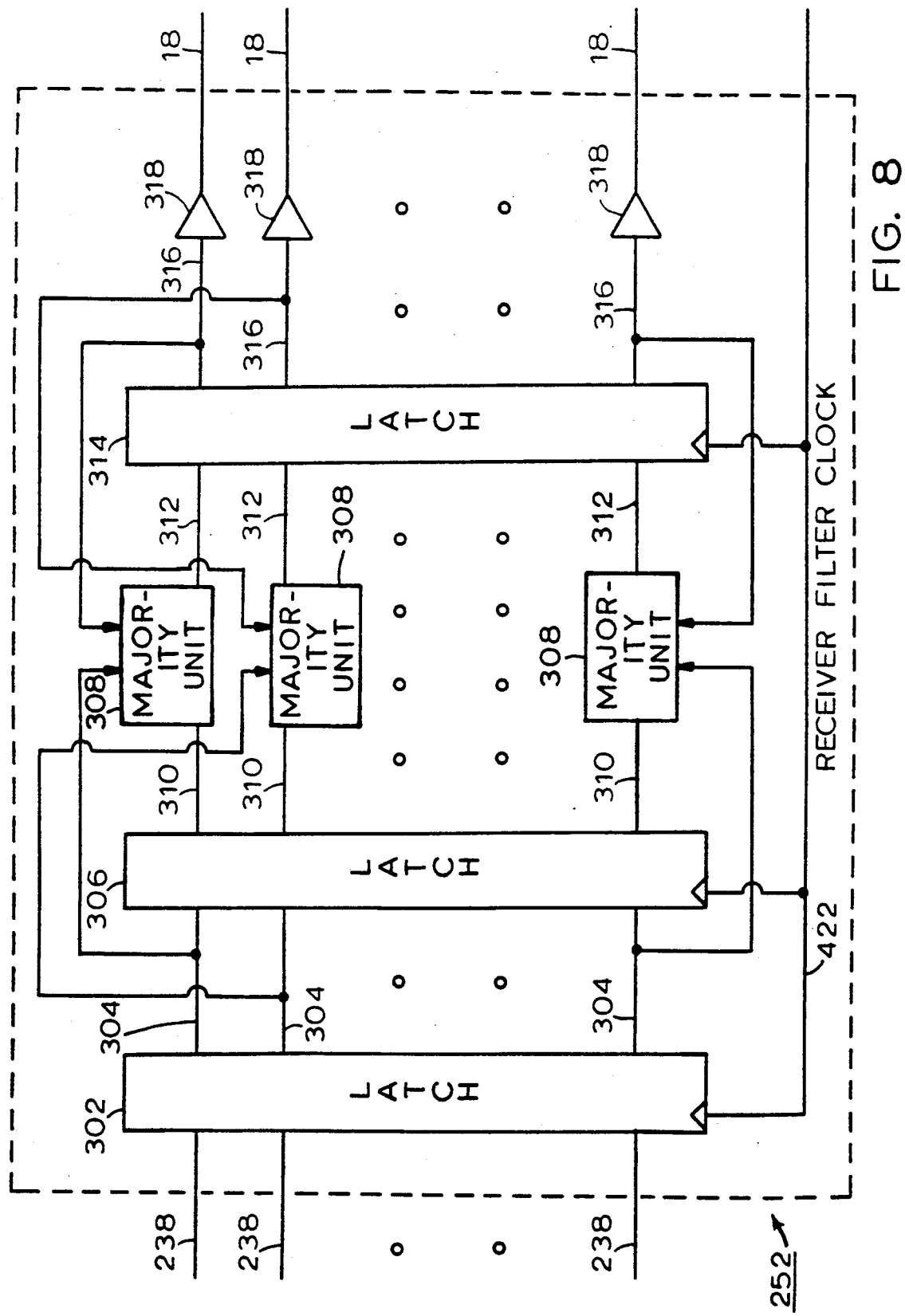
FIG. 8 is a schematic block diagram of an illustrative filtering unit in the demultiplexing unit depicted in FIGS. 6A and 6b.

The receiver filter unit 252 latches bits from 16-bit bus 251, and filters them, in response to the assertion of the signal RECEIVER FILTER CLOCK over line 422. The receiver filter unit 252 implements a smoothing algorithm, which, in the illustrated embodiment, is the same algorithm as that implemented in the sampling and filtering unit 20 in multiplexing unit 4. An illustrative receiver filter unit 252 is depicted in FIG. 8, which is described in greater detail below.

The frame disassembly unit 236 also reverses the steps which the frame assembly unit 32 took with respect to the first four bits of information from bus 66 in the multiplexing unit 4. Thus, the four bits on 4-bit bus 234 are latched onto the four lines of 4-bit link control and status bus 240 in response to the simultaneous assertion of the signal FIRST FOUR DATA SPACE over line 402 and LATCH FOURTH WORD over line 420.

The bits on 4-bit- bus 234 are latched onto the first preselected set of four lines of 16-bit bus 242 in response to the assertion of the signal LATCH FIRST WORD over line 414 while the signal OTHER 1 DATA SPACE is asserted over line 406; the bits on bus 234 are latched onto the second preselected set of four lines of bus 242 in response to the assertion of the signal LATCH SECOND WORD over line 416 while the signal OTHER 1 DATA SPACE is asserted over line 406; the bits on bus 234 are latched onto the third preselected set of four lines of bus 242 in response to the assertion of the signal LATCH THIRD WORD over line 418 while the signal OTHER 1 DATA SPACE is asserted over line 406; and the bits on bus 234 are latched onto the fourth preselected set of four lines of bus 242 in response to the assertion of the signal LATCH FOURTH WORD over line 420 while the signal OTHER 1 DATA SPACE is asserted over line 406. The first, second, third, and fourth Preselected sets of four lines of 16-bit bus 242 together contain all the lines of that bus.

The four bits on 4-bit bus 234 are latched onto the four lines of 4-bit FCS bus 258 in response to the assertion of the signal FCS DATA SPACE over line 412.

The frame disassembly unit 236 also calculates a receiver frame check sequence based on all bits present on 4-bit bus 234 during a frame, but not including any bits in the location corresponding to the two frame synchronization words or the bits received in the location corresponding to the 4-bit frame check sequence calculated in the multiplexing unit 4 and transmitted as the second set of four bits of other information. The frame disassembly unit 36 calculates the receiver frame check sequence in the same way as multiplexing unit 4 calculates its frame check sequence. The frame disassembly unit 236 places this 4-bit receiver frame check sequence on 4-bit bus 250 when the main counter/sequencer unit 208 asserts the signal FCS DATA SPACE Bearing in mind the characteristics of the components shown in FIGS. 6A and 6b the way in which the frame disassembly unit 236 operates can be understood from Tables IV, V, and VI. Each of those tables is a timing chart setting forth the pulses of the RECEIVER BIT CLOCK signal at which many of the signals in the demultiplexing unit 16 are asserted during the reception of a bit stream from line 14. Those tables show the sequence of timing and control signals after the deserializer and sync code detecting unit 212 has detected the bits of the two frame synchronization words and after the sync determining unit 216 has asserted the signal IN SYNC over line 220. in accordance with the same signal-timing convention employed in tables I, II, and III, the first pulse of RECEIVER BIT CLOCK after the assertion of IN SYNC in Tables IV, V, and VI is numbered zero instead of one.

TABLE IV

RECEPTION OF THE FIRST SUBFRAME

| Pulse of RECEIVER BIT CLOCK after IN SYNC | Signal Action | Circuit Action |
|---|---|---|
| 0 | FIRST FOUR DATA SPACE asserted and remains asserted through pulse 4 | |
| 4 | LATCH FOURTH WORD pulsed | Frame disassembly unit 236 latches four bits from four-bit bus 234 onto four-bit bus 240 |

TABLE IV-continued
RECEPTION OF THE FIRST SUBFRAME

| Pulse of RECEIVER BIT CLOCK after IN SYNC | Signal Action | Circuit Action |
|---|---|---|
| 5 | TERMINAL DATA SPACE asserted and remains asserted through pulse 164 | |
| 9 | LATCH FIRST WORD pulsed | Frame disassembly unit 236 latches four bits from four-bit bus 234 onto first preselected set of four lines of sixteen-bit bus 238 |
| 14 | LATCH SECOND WORD pulsed | Frame disassembly unit 236 latches four bits from four-bit bus 234 onto second preselected set of four lines of sixteen-bit bus 238 |
| 19 | LATCH THIRD WORD pulsed | Frame disassembly unit 236 latches four bits from four-bit bus 234 onto third preselected set of four lines of sixteen-bit bus 238 |
| 24 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 25 | RECEIVER FILTER CLOCK pulsed | Receiver filter unit 252 latches sixteen bits from sixteen-bit bus 251 |
| 29 | LATCH FIRST WORD pulsed | Frame disassembly unit 236 latches four bits from four-bit bus 234 onto second preselected set of four lines of sixteen-bit bus 238 |
| 34 | LATCH SECOND WORD pulsed | Frame disassembly unit 236 latches four bits from four-bit bus 234 onto second preselected set of four lines of sixteen-bit bus 238 |
| 39 | LATCH THIRD WORD pulsed | Frame disassembly unit 236 latches four bits from four-bit bus 234 onto third preselected set of four lines of sixteen-bit bus 238 |
| 44 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 48 | RECEIVER FILTER CLOCK pulsed | Receiver filter unit 252 latches sixteen bits from sixteen-bit bus 251 |
| 49 | LATCH FIRST WORD pulsed | Frame disassembly unit 236 latches four bits from four-bit bus 234 onto first preselected set of four lines of sixteen-bit bus 238 |
| 54 | LATCH SECOND WORD pulsed | Frame disassembly unit 236 latches four bits from four-bit bus 234 onto second preselected set of four lines of sixteen-bit bus 238 |
| 59 | LATCH THIRD WORD pulsed | Frame disassembly unit 236 latches four bits from four-bit bus 234 onto third preselected set of four lines of sixteen-bit bus 238 |
| 64 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 69 | LATCH FIRST WORD pulsed | Frame disassembly unit 236 latches four bits from four-bit bus 234 onto first preselected set of four lines of sixteen-bit bus 238 |
| 70 | RECEIVER FILTER CLOCK pulsed | Receiver filter unit 252 latches sixteen bits from sixteen-bit bus 251 |
| 74 | LATCH SECOND WORD pulsed | Frame disassembly unit 236 latches four bits from second preselected set of four-bit bus 234 onto four lines of sixteen-bit bus 238 |
| 79 | LATCH THIRD WORD pulsed | Frame disassembly unit 236 latches four bits from four-bit bus 234 onto third preselected set of four lines of sixteen-bit bus 238 |
| 84 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 89 | LATCH FIRST WORD pulsed | Frame disassembly unit 236 latches four bits from four-bit bus 234 onto first preselected set of four lines of sixteen-bit bus 238 |
| 93 | RECEIVER FILTER CLOCK pulsed | Receiver filter unit 252 latches sixteen bits from sixteen-bit bus 251 |
| 94 | LATCH SECOND WORD pulsed | Frame disassembly unit 236 latches four bits from four-bit bus 234 onto second preselected set of four lines of sixteen-bit bus 238 |
| 99 | LATCH THIRD WORD pulsed | Frame disassembly unit 236 latches four bits from four-bit bus 234 onto third preselected set of four lines of sixteen-bit bus 238 |
| 104 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 109 | LATCH FIRST WORD pulsed | Frame disassembly unit 236 latches four bits from four-bit bus 234 onto first preselected set of four lines of sixteen-bit bus 238 |
| 114 | LATCH SECOND WORD pulsed | Frame disassembly unit 236 latches four bits from four-bit bus 234 onto second preselected set of four lines of sixteen-bit bus 238 |
| 115 | RECEIVER FILTER CLOCK pulsed | Receiver filter unit 252 latches sixteen bits from sixteen-bit bus 251 |

TABLE IV-continued
RECEPTION OF THE FIRST SUBFRAME

| Pulse of RECEIVER BIT CLOCK after IN SYNC | Signal Action | Circuit Action |
|---|---|---|
| 119 | LATCH THIRD WORD pulsed | Frame disassembly unit 236 latches four bits from four-bit bus 234 onto third preselected set of four lines of sixteen-bit bus 238 |
| 124 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 129 | LATCH FIRST WORD pulsed | Frame disassembly unit 236 latches four bits from four-bit bus 234 onto first preselected set of four lines of sixteen-bit bus 238 |
| 134 | LATCH SECOND WORD pulsed | Frame disassembly unit 236 latches four bits from four-bit bus 234 onto second preselected set of four lines of sixteen-bit bus 238 |
| 138 | RECEIVER FILTER CLOCK pulsed | Receiver filter unit 252 latches sixteen bits from sixteen-bit bus 251 |
| 139 | LATCH THIRD WORD pulsed | Frame disassembly unit 236 latches four bits from four-bit bus 234 onto third preselected set of four lines of sixteen-bit bus 238 |
| 144 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 149 | LATCH FIRST WORD pulsed | Frame disassembly unit 236 latches four bits from four-bit bus 234 onto first preselected set of four lines of sixteen-bit bus 238 |
| 154 | LATCH SECOND WORD pulsed | Frame disassembly unit 236 latches four bits from four-bit bus 234 onto second preselected set of four lines of sixteen-bit bus 238 |
| 159 | LATCH THIRD WORD pulsed | Frame disassembly unit 236 latches four bits from four-bit bus 234 onto third preselected set of four lines of sixteen-bit bus 238 |
| 160 | RECEIVER FILTER CLOCK pulsed | Receiver filter unit 252 latches sixteen bits from sixteen-bit bus 251 |
| 164 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 165 | OTHER 1 DATA SPACE asserted and remains asserted through pulse 184 | |
| 169 | LATCH FIRST WORD pulsed | Frame disassembly unit 236 latches four bits from four-bit bus 234 onto first preselected set of four lines of sixteen-bit bus 242 |
| 174 | LATCH SECOND WORD pulsed | Frame disassembly unit 236 latches four bits from four-bit bus 234 onto second preselected set of four lines of sixteen-bit bus 242 |
| 179 | LATCH THIRD WORD pulsed | Frame disassembly unit 236 latches four bits from four-bit bus 234 onto third preselected set of four lines of sixteen-bit bus 242 |
| 183 | RECEIVER FILTER CLOCK pulsed | Receiver filter unit 252 latches sixteen bits from sixteen-bit bus 251 |
| 184 | LATCH FOURTH WORD pulsed | Frame disassembly unit 236 latches four bits from four-bit bus 234 onto fourth preselected set of four lines of sixteen-bit bus 238 |

TABLE V
RECEPTION OF THE SECOND (R = 2) and THIRD (R = 3) SUBFRAMES

| Pulse of RECEIVER BIT CLOCK After IN SYNC | Signal Action | Circuit Action |
|---|---|---|
| 180(R-1) + 5 | TERMINAL DATA SPACE asserted and remains asserted through pulse 180(R-1) + 164 | |
| 180(R-1) + 9 | LATCH FIRST WORD pulsed | Frame disassembly unit 236 latches four bits from four-bit bus 234 onto first preselected set of four lines of sixteen-bit bus 238 |
| 180(R-1) + 14 | LATCH SECOND WORD pulsed | Frame disassembly unit 236 latches four bits from four-bit bus 234 onto second preselected set of four lines of sixteen-bit bus 238 |
| 180(R-1) + | LATCH THIRD WORD | Frame disassembly unit |

TABLE V-continued

RECEPTION OF THE SECOND (R = 2) and THIRD (R = 3) SUBFRAMES

| Pulse of RECEIVER BIT CLOCK After IN SYNC | Signal Action | Circuit Action |
|---|---|---|
| 19 | pulsed | 236 latches four bits from four-bit bus 234 onto third preselected set of four lines of sixteen-bit bus 238 |
| 180(R-1) + 24 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 180(R-1) + 25 | RECEIVER FILTER CLOCK pulsed | Receiver filter unit 252 latches sixteen bits from sixteen-bit bus 251 |
| 180(R-1) + 29 | LATCH FIRST WORD pulsed | Frame disassembly unit 236 latches four bits from four-bit bus 234 onto first preselected set of four lines of sixteen-bit bus 238 |
| 180(R-1) + 34 | LATCH SECOND WORD pulsed | Frame disassembly unit 236 latches four bits from four-bit bus 234 onto second preselected set of four lines of sixteen-bit bus 238 |
| 180(R-1) + 39 | LATCH THIRD WORD pulsed | Frame disassembly unit 236 latches four bits from four-bit bus 234 onto third preselected set of four lines of sixteen-bit bus 238 |
| 180(R-1) + 44 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 180(R-1) + 48 | RECEIVER FILTER CLOCK pulsed | Receiver filter unit 252 latches sixteen bits from sixteen-bit bus 251 |
| 180(R-1) + 49 | LATCH FIRST WORD pulsed | Frame disassembly unit 236 latches four bits from four-bit bus 234 onto first preselected set of four lines of sixteen-bit bus 238 |
| 180(R-1) + 54 | LATCH SECOND WORD pulsed | Frame disassembly unit 236 latches four bits from four-bit bus 234 onto second preselected set of four lines of sixteen-bit bus 238 |
| 180(R-1) + 59 | LATCH THIRD WORD pulsed | Frame disassembly unit 236 latches four bits from four-bit bus 234 onto third preselected set of four lines of sixteen-bit bus 238 |
| 180(R-1) + 64 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 180(R-1) + 69 | LATCH FIRST WORD pulsed | Frame disassembly unit 236 latches four bits from four-bit bus 234 onto first preselected set of four lines of sixteen-bit bus 238 |
| 180(R-1) + 70 | RECEIVER FILTER CLOCK pulsed | Receiver filter unit 252 latches sixteen bits from sixteen-bit bus 251 |

TABLE V-continued

RECEPTION OF THE SECOND (R = 2) and THIRD (R = 3) SUBFRAMES

| Pulse of RECEIVER BIT CLOCK After IN SYNC | Signal Action | Circuit Action |
|---|---|---|
| 180(R-1) + 74 | LATCH SECOND WORD pulsed | Frame disassembly unit 236 latches four bits from four-bit bus 234 onto second preselected set of four lines of sixteen-bit bus 238 |
| 180(R-1) + 79 | LATCH THIRD WORD pulsed | Frame disassembly unit 236 latches four bits from four-bit bus 234 onto third preselected set of four lines of sixteen-bit bus 238 |
| 180(R-1) + 84 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 180(R-1) + 89 | LATCH FIRST WORD pulsed | Frame disassembly unit 236 latches four bits from four-bit bus 234 onto first preselected set of four lines of sixteen-bit bus 238 |
| 180(R-1) + 93 | RECEIVER FILTER CLOCK pulsed | Receiver filter unit 252 latches sixteen bits from sixteen-bit bus 251 |
| 180(R-1) + 94 | LATCH SECOND WORD pulsed | Frame disassembly unit 236 latches four bits from four-bit bus 234 onto second preselected set of four lines of sixteen-bit bus 238 |
| 180(R-1) + 99 | LATCH THIRD WORD pulsed | Frame disassembly unit 236 latches four bits from four-bit bus 234 onto third preselected set of four lines of sixteen-bit bus 238 |
| 180(R-1) + 104 | LATCH FOURTH WORD pulsed | Frame disassembly unit 236 latches four bits from four-bit bus 234 onto four preselected set of four lines of sixteen-bit bus 238; receiver sixteen-bit latch 239 latches sixteen bits from sixteen-bit bus 238 onto sixteen-bit bus 251 |
| 180(R-1) + 109 | LATCH FIRST WORD pulsed | Frame disassembly unit 236 latches four bits from four-bit bus 234 onto first preselected set of four lines of sixteen-bit bus 238 |
| 180(R-1) + 114 | LATCH SECOND WORD pulsed | Frame disassembly unit 236 latches four bits from four-bit bus 234 onto second preselected set of four lines of sixteen-bit bus 238 |
| 180(R-1) + 115 | RECEIVER FILTER CLOCK pulsed | Receiver filter unit 252 latches sixteen bits from sixteen-bit bus 251 |
| 180(R-1) + 119 | LATCH THIRD WORD pulsed | Frame disassembly unit 236 latches four bits from four-bit bus 234 onto third preselected set of four lines of sixteen-bit bus 238 |
| 180(R-1) + 124 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 180(R-1) + 129 | LATCH FIRST WORD pulsed | Frame disassembly unit 236 latches four bits from four- |

TABLE V-continued

RECEPTION OF THE SECOND (R = 2) and THIRD (R = 3) SUBFRAMES

| Pulse of RECEIVER BIT CLOCK After IN SYNC | Signal Action | Circuit Action |
|---|---|---|
| | | bit bus 234 onto first preselected set of four lines of sixteen-bit bus 238 |
| 180(R-1) + 34 | LATCH SECOND WORD pulsed | Frame disassembly unit 236 latches four bits from four-bit bus 234 onto second preselected set of four lines of sixteen-bit bus 238 |
| 180(R-1) + 138 | RECEIVER FILTER CLOCK pulsed | Receiver filter unit 252 latches sixteen bits from sixteen-bit bus 251 |
| 180(R-1) + 139 | LATCH THIRD WORD pulsed | Frame disassembly unit 236 latches four bits from four-bit bus 234 onto third preselected set of four lines of sixteen-bit bus 238 |
| 180(R-1) + 144 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 180 (R-1) + 149 | LATCH FIRST WORD pulsed | Frame disassembly unit 236 latches four bits from four-bit bus 234 onto first preselected set of four lines of sixteen-bit bus 238 |
| 180(R-1) + 154 | LATCH SECOND WORD pulsed | Frame disassembly unit 236 latches four bits from four-bit bus 234 onto second preselected set of four lines of sixteen-bit bus 238 |
| 180(R-1) + 159 | LATCH THIRD WORD pulsed | Frame disassembly unit 236 latches four bits from four-bit bus 234 onto third preselected set of four lines of sixteen-bit bus 238 |
| 180(R-1) + 160 | RECEIVER FILTER CLOCK pulsed | Receiver filter unit 252 latches sixteen bits from sixteen-bit bus 251 |
| 180(R-1) + 164 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 180(R-1) + 165 | MODEM DATA SPACE asserted and remains asserted through pulse 180(R-1) + 184 | |
| 180(R-1) + 169 | LATCH FIRST WORD pulsed | Frame disassembly unit 236 latches four bits from four-bit bus 234 onto four lines of sixteen-bit parallel-to-serial shift register (not shown) internal to frame assembly unit 236 |
| 180(R-1) + 174 | LATCH SECOND WORD pulsed | Frame disassembly unit 236 latches four bits from four-bit bus 234 onto four lines of sixteen-bit parallel-to-serial shift register (not shown) internal to frame assembly unit 236 |
| 180(R-1) + 179 | LATCH THIRD WORD pulsed | Frame disassembly unit 236 latches four bits from four-bit bus 234 onto four lines of sixteen-bit parallel-to-serial shift register (not |

TABLE V-continued

RECEPTION OF THE SECOND (R = 2) and THIRD (R = 3) SUBFRAMES

| Pulse of RECEIVER BIT CLOCK After IN SYNC | Signal Action | Circuit Action |
|---|---|---|
| | | shown) internal to frame assembly unit 236 |
| 180(R-1) + 183 | RECEIVER FILTER CLOCK pulsed | Receiver filter unit 252 latches sixteen bits from sixteen-bit bus 251 |
| 180(R-1) + 184 | LATCH FOURTH WORD pulsed | Frame disassembly unit 236 latches four bits from four-bit bus 234 onto four lines of sixteen-bit parallel-to-serial shift register (not shown) internal to frame assembly unit 236 |

TABLE VI

RECEPTION OF THE FOURTH SUBFRAME

| Pulse of RECEIVER BIT CLOCK After IN SYNC | Signal Action | Circuit Action |
|---|---|---|
| 540 + 5 | TERMINAL DATA SPACE asserted and remains asserted through pulse 180(U-1) + 164 | |
| 540 + 9 | LATCH FIRST WORD pulsed | Frame disassembly unit 236 latches four bits from four-bit bus 234 onto first preselected set of four lines of sixteen-bit bus 238 |
| 540 + 14 | LATCH SECOND WORD pulsed | Frame disassembly unit 236 latches four bits from four-bit bus 234 onto second preselected sets of four lines of sixteen-bit bus 238 |
| 540 + 19 | LATCH THIRD WORD pulsed | Frame disassembly unit 236 latches four bits from four-bit bus 234 onto third preselected set of four lines of sixteen-bit bus 238 |
| 540 + 24 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 540 + 25 | RECEIVER FILTER CLOCK Pulsed | Receiver filter unit 252 latches sixteen bits from sixteen-bit bus 251 |
| 540 + 29 | LATCH FIRST WORD pulsed | Frame disassembly unit 236 latches four bits from four-bit bus 234 onto first preselected set of four lines of sixteen-bit bus 238 |
| 540 + 34 | LATCH SECOND WORD pulsed | Frame disassembly unit 236 latches four bits from four-bit bus 234 onto second preselected set of four lines of sixteen-bit bus 238 |
| 540 + 39 | LATCH THIRD WORD pulsed | Frame disassembly unit 236 latches four bits from four-bit bus 234 onto third preselected set of four lines of sixteen-bit bus 238 |
| 540 + 44 | LATCH FOURTH WORD pulsed | Frame disassembly unit 236 latches four bits from four-bit bus 234 onto fourth preselected set of four lines of sixteen-bit bus 238; receiver sixteen-bit |

TABLE VI-continued
RECEPTION OF THE FOURTH SUBFRAME

| Pulse of RECEIVER BIT CLOCK After IN SYNC | Signal Action | Circuit Action |
|---|---|---|
| | | latch 239 latches sixteen bits from sixteen-bit bus 238 onto sixteen-bit bus 251 |
| 540 + 48 | RECEIVER FILTER CLOCK pulsed | Receiver filter unit 252 latches sixteen bits from sixteen-bit bus 251 |
| 540 + 49 | LATCH FIRST WORD pulsed | Frame disassembly unit 236 latches four bits from four-bit bus 234 onto first preselected set of four lines of sixteen-bit bus 238 |
| 540 + 54 | LATCH SECOND WORD pulsed | Frame disassembly unit 236 latches four bits from four-bit bus 234 onto second preselected set of four lines of sixteen-bit bus 238 |
| 540 + 59 + 159 | LATCH THIRD WORD pulsed | Frame disassembly unit 236 latches four bits from four-bit bus 234 onto third preselected set of four lines of sixteen-bit bus 238 |
| 540 + 64 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 540 + 69 | LATCH FIRST WORD pulsed | Frame disassembly unit 236 latches four bits from four-bit bus 234 onto first preselected set of four lines of sixteen-bit bus 238 |
| 540 + 70 | RECEIVER FILTER CLOCK pulsed | Receiver filter unit 252 latches sixteen bits from sixteen-bit bus 251 |
| 540 + 74 | LATCH SECOND WORD pulsed | Frame disassembly unit 236 latches four bits from four-bit bus 234 onto second preselected set of four lines of sixteen-bit bus 238 |
| 540 + 79 + 119 | LATCH THIRD WORD pulsed | Frame disassembly unit 236 latches four bits from four-bit bus 234 onto third preselected set of four lines of sixteen-bit bus 238 |
| 540 + 84 + 124 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 540 + 89 | LATCH FIRST WORD pulsed | Frame disassembly unit 236 latches four bits from four-bit bus 234 onto first preselected set of four lines of sixteen-bit bus 238 |
| 540 + 93 | RECEIVER FILTER CLOCK pulsed | Receiver filter unit 252 latches sixteen bits from sixteen-bit bus 251 |
| 540 + 94 | LATCH SECOND WORD pulsed | Frame disassembly unit 236 latches four bits from four-bit bus 234 onto second preselected set of four lines of sixteen-bit bus 238 |
| 540 + 99 | LATCH THIRD WORD pulsed | Frame disassembly unit 236 latches four bits from four-bit bus 234 onto third preselected set of four lines of sixteen-bit bus 238 |
| 540 + 104 | LATCH FOURTH WORD | Frame disassembly unit 236 |

TABLE VI-continued
RECEPTION OF THE FOURTH SUBFRAME

| Pulse of RECEIVER BIT CLOCK After IN SYNC | Signal Action | Circuit Action |
|---|---|---|
| | pulsed | latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 540 + 109 | LATCH FIRST WORD pulsed | Frame disassembly unit 236 latches four bits from four-bit bus 234 onto first preselected set of four lines of sixteen-bit bus 238 |
| 540 + 114 | LATCH SECOND WORD pulsed | Frame disassembly unit 236 latches four bits from four-bit bus 234 onto second preselected set of four lines of sixteen-bit bus 238 |
| 540 + 115 | RECEIVER FILTER CLOCK pulsed | Receiver filter unit 252 latches sixteen bits from sixteen-bit bus 251 |
| 540 + 119 | LATCH THIRD WORD pulsed | Frame disassembly unit 236 latches four bits from four-bit bus 234 onto third preselected set of four lines of sixteen-bit bus 238 |
| 540 + 124 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 540 + 129 | LATCH FIRST WORD pulsed | Frame disassembly unit 236 latches four bits from four-bit bus 234 onto first preselected set of four lines of sixteen-bit bus 238 |
| 540 + 134 | LATCH SECOND WORD pulsed | Frame disassembly unit 236 latches four bits from four-bit bus 234 onto second preselected sets of four lines of sixteen-bit bus 238 |
| 540 + 138 | RECEIVER FILTER CLOCK Pulsed | Receiver filter unit 252 latches sixteen bits from sixteen-bit bus 251 |
| 540 + 139 | LATCH THIRD WORD pulsed | Frame disassembly unit 236 latches four bits from four-bit bus 234 onto third preselected set of four lines of sixteen-bit bus 238 |
| 540 + 144 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 540 + 149 | LATCH FIRST WORD pulsed | Frame disassembly unit 236 latches four bits from four-bit bus 234 onto first preselected set of four lines of sixteen-bit bus 238 |
| 540 + 154 | LATCH SECOND WORD pulsed | Frame disassembly unit 236 latches four bits from four-bit bus 234 onto second preselected set of four lines of sixteen-bit bus 238 |
| 540 + 159 | LATCH THIRD WORD pulsed | Frame disassembly unit 236 latches four bits from four-bit bus 234 onto third preselected set of four |

TABLE VI-continued
RECEPTION OF THE FOURTH SUBFRAME

| Pulse of RECEIVER BIT CLOCK After IN SYNC | Signal Action | Circuit Action |
|---|---|---|
| | | lines of sixteen-bit bus 238 |
| 540 + 160 | RECEIVER FILTER CLOCK pulsed | Receiver filter unit 252 latches sixteen bits from sixteen-bit bus 251 |
| 540 + 164 | LATCH FOURTH WORD pulsed | Frame disassembly unit 236 latches four bits from four-bit bus 234 onto fourth preselected set of four lines of sixteen-bit bus 238; receiver sixteen-bit latch 239 latches sixteen bits from sixteen-bit bus 238 onto sixteen-bit bus 251 |
| 540 + 165 | FCS DATA SPACE is asserted and remains asserted through pulse 540 + 169 | |
| 540 + 169 | LATCH FIRST WORD pulsed | Frame disassembly unit 236 places four bits from four-bit bus 234 onto FCS bus 248 and also places four bits of calculated receiver frame check sequence onto bus 250; main counter/sequencer unit pulses signal END OF FRAME; if FCS comparator unit 258 also pulses signal FCS OK, AND-gate 514 pulses signal GOOD FRAME |
| 540 + 170 | SYNC CHARACTER DATA DATA SPACE is asserted and remains asserted through pulse 540 + 179 (Beginning of reception of next frame.) | |
| 540 + 180 | FIRST FOUR DATA SPACE asserted and remains asserted through pulse 540 + 184 | |
| 540 + 183 | RECEIVER FILTER CLOCK pulsed | Receiver filter unit 252 latches sixteen bits from sixteen-bit bus 251 |
| 540 + 184 | LATCH FOURTH WORD pulsed | Frame disassembly unit 236 latches four bits from four-bit bus 234 onto four-bit bus 240 |

In a number of signals and operations are not shown. The signal RCVR COMPLEMENT is omitted from Tables IV, V, VI, as are many pulses of RECEIVER BIT CLOCK. Moreover, FIGS. 10, 11, and 12 are based on proper bit reception and thus do not show the results of any error conditions in the demultiplexing unit 16. Signals such as SYNC CHARS SEEN and IN SYNC, which actually indicate proper bit reception, are also not shown.

Furthermore, Tables IV, V, VI do not show the movement of received filtered high-speed data sample bits through receiver filter unit 252 to the high-speed data output lines 18. That movement, and the filtering operation which accompanies it, are described below in connection with FIG. 8.

Tables IV, V, VI are largely self-explanatory in view of the foregoing description of the operation of the demultiplexing unit 16 and in view of the foregoing description of Tables I, II, III. It will be apparent from Tables IV, V, VI that, in the illustrated embodiment, the main counter/sequencer unit 208 asserts the signal RECEIVER FILTER CLOCK once after the first 22 pulses of RECEIVER BIT CLOCK, then once after the next 23 pulses of RECEIVER BIT CLOCK, and so forth repetitively. RECEIVER FILTER CLOCK is thus asserted, on the average, once every 22.5 pulses of RECEIVER BIT CLOCK.

The remaining units and signals in the demultiplexing unit 16 affect the flow of bits from the disassembled frame to the high-speed data output lines 18 and the other output lines 17.

The Bits Flowing to the High-Speed Data Output Lines 18. Normally, the output of the receiver filter unit 252 into each line of 16-bit high-speed data output bus 18 is a succession of bits originally generated as samples from one of the sixteen high-speed data input lines 2 leading to the multiplexing unit 4. The concatenation of those received sample bits on each high-speed data output line 18 reconstructs the signal on the corresponding high-speed data input line 2, thus accomplishing the goal of transmitting the signal from each high-speed data input line 2 leading to the multiplexing unit 4 to a corresponding high-speed data output line 18 leading from the demultiplexing unit 16.

In the actual operation of the concentrator the sample bits, corresponding to the bits of the filtered data sample vectors, which are the output signal of receiver filter unit 252 are continuously placed on the sixteen high-speed data output lines 18 whether or not the frame check sequence placed on 4-bit FCS bus 248 matches the calculated receiver frame check sequence placed on 4-bit bus 250 and whether or not the other error detection mechanisms, discussed below, which are made available by the coding system of the invention, indicate that errors have occurred in a frame. Although it is always possible for particular and improbable placements of two or more errors in the received frame to cause erroneous data to be put out over one or more of the high-speed data output lines 1B, the coding system of the invention provides multiple safeguards which reduce the possibility that an error in the frame will affect the output on the high-speed data output lines 18. Those safeguards reduce the probability of putting out erroneous high-speed data to a level sufficiently low to make it possible for the transmission system to dispense with applying the traditional error-correction mechanisms of retransmission or applying a block error-correction code. This in turn greatly reduces the number of required data storage devices while also permitting the high-speed data to flow through without the delays associated with the traditional error correction mechanisms.

First, an error in any single transmitted code bit in a code word affects at most four sample bits placed on one set of four lines of bus 238. Unless a logically similar error which affects the sample bits placed on that same set of four lines of bus 238 occurs within the following two succeeding sets of sample bits placed on that same set of four lines of 16-bit bus 238, the factors described below will correct those errors. Because any errors in fiber optic transmission systems typically are isolated (a typical error rate is believed to be one in $10^9$ bits under normal worst case conditions), there is a high likelihood that such errors affecting the sample bits placed on any set of four lines of bus 238 will be inconsequential Second, the filtering in receiver filter unit 252 eliminates some of the errors in the received sample bit stream on each of the sixteen lines of 16-bit bus 251. The heavy sampling of the data in the high-speed data input lines 2 indicates that the sample bits from each high-speed data input line 2 should change at most once every approximately seven sampleS. Accordingly, a bit on any line of 16-bit bus 251 which is different from the preceding sample bit and the succeeding sample bit on that line is certain to be invalid (or else one or both of the surrounding bits is invalid). Such invalid bits can arise in the sample bit stream on any one of the lines in 16-bit bus 251 when, among other causes, either (a) the decoding unit 224 receives an invalid code word, or (b) one valid code word is incorrectly received as another valid code word, causing the decoding unit 224 to place on 4-bit channel 226 a 4-bit word which corresponds to the incorrect but valid code word. As long as such errors are relatively isolated occurrences in the sample bit stream arriving at the decoding unit 224 (with no more than one error affecting any three sample values for a given high-speed data channel, for example), the receiver filter unit 252 will smooth the erroneous sample bits resulting from such errors before those erroneous sample bits are placed on the data output lines 18.

Third, also because the data on each high-speed data input line 2 has been heavily sampled, the 4-bit latches (not shown) in frame disassembly unit 236 can be expected to put out a different set of four bits onto each set of four lines in 16-bit bus 238 only approximately once every seven latching operations. Accordingly, when the signal VALID WORD is deasserted, indicating that the particular combination of five bits received by decoding unit 224 over 5-bit bus is not a valid code word, and, as described above, the 4-bit latch (not shown) in frame disassembly unit 236 does not latch but rather continues to assert the previous 4-bit word corresponding to the last valid code word for which the signal VALID WORD was asserted for that 4-bit latch, there is approximately a 6/7 chance that that previous 4-bit word continues to be correct Fourth, while the effect of receiving an incorrect code word may extend to the filtered sample bit in as many as each line in a set of four lines of 16-bit bus 238 and on 16-bit bus 251, it may not actually place an incorrect data sample bit on all four of those lines. Even if one 5-bit code word is incorrectly received as another valid 5-bit code word, the smoothing algorithm implemented in the receiver filter unit 252 will correct any erroneous isolated sample bits placed on a set of four lines of 16-bit bus 251, except possibly for incorrect sample bits which are near a data level transition in the stream of bit samples from high-speed data input lines 2.

Fifth, even if a single set of four incorrect sample bits (i.e., not followed by another raw sample set having incorrect raw sample bits on any of those same four lines) actually does propagate through the receiver filter unit 252 to a set of four of the data output lines 18, the effect of such an isolated incorrect set of four raw sample bits (if the isolated set of incorrect raw sample bits appears within two sample bits either side of a level transition in the stream of samples) is to advance or retard the time at which a level transition is perceived on one or more of the high-speed data output lines 18 (that is, to prolong the apparent length of a preceding first-valued level and to delay the commencement of the following other-valued level) on as many as four of the high-speed data output lines 18. The units to which those high-speed data output lines 18 are connected may well be able to tolerate a limited amount of such "jitter" in the time of level transitions while continuing to recognize the level transition properly and to recognize properly the time at which that level transition has occurred.

Sixth, in addition to the foregoing mechanisms, the error detecting unit 276 indicates the occurrence of errors requiring the intervention of a human user or other correction mechanisms beyond those set forth herein.

As with any data communications system, there can always be residual errors. Those should be dealt with by traditional methods. (This error correction mechanism may be as simple as a human user of a remote terminal perceiving that data displayed on a display device such as a video display terminal contains an error and using a keyboard connected to the terminal to correct the error.)

The Other Bits In The Frame. The information contained in the first set of four bits of other information and the first, second, and third sets of 16 bits of other information is intended to be relatively low speed data such as (in the illustrated embodiment) link control and status information and modem control data. Because of this lower speed, there is a low probability that such information has changed from the data received in the last previous frame in which the received and frame check sequences matched and during which the signal VALID WORD was not deasserted. This information has a substantial effect on the operation of units (not shown) connected to the demultiplexing unit 16. Therefore, releasing erroneous link control, status, and modem control information could adversely affect the operation of the receiving computer units attached to lines 18 and 508. Accordingly, the receiver depicted in FIGS. 6a and 6b inhibits release of that information if there has been an error in the frame.

The first level of protection against putting out erroneous bits other than high-speed data sample bits is provided by comparing the frame check sequence received from the multiplexing unit 4 with the receiver frame check sequence calculated by the frame disassembly unit 236. If the frame check sequence bits received from the multiplexing unit 4 and placed on 4-bit bus 248 match the receiver frame check sequence bits calculated in frame disassembly unit 236, and placed on 4-bit bus 250, and if the signal VALID WORD has been asserted throughout the frame, FCS comparator 262 asserts the signal FCS OK over line 274, which leads to one input to AND-gate 514. Line 424, which carries the signal END OF FRAME, leads to the other input to AND-gate 514. If both FCS OK and END OF FRAME are asserted, AND-gate 514 asserts the signal GOOD FRAME over line 512.

If the frame check sequence placed in FCS bus 248 does not match the calculated receiver frame check sequence placed on 4-bit bus 250—in which case the signal GOOD FRAME is not asserted—it is probable that there has been an error either in the reception of some of the bits in the frame or in the reception of the frame check sequence itself. If the signal VALID WORD has been deasserted at any time during the frame, there has been an error in the received bit stream in 5-bit channel 222. Such an error may be in the bits in the locations labelled Status, Other 1, Other 2, or Other 3 as shown in FIG. 2.

A second level of protection against putting out erroneous bits other than high-speed data sample bits is provided by using the END OF FRAME signal. As shown in FIGS. 6A and 6b, the assertion of the signal FCS OK indicates that the two frame check sequences match and that VALID WORD was not deasserted during the frame. By AND-ing the signal FCS 0K with the signal END OF FRAME in AND-gate 514, the assertion of the signal GOOD FRAME is further conditioned on the continued alignment of main counter/sequencer unit 208 with the stream of incoming data bits.

In the illustrative embodiment the level of protection against putting out erroneous bits (other than high-speed data sample bits) is different for the different sets of bits.

The First Set Of Sixteen Bits Of Other Information. As discussed above, the frame disassembly unit places the first set of sixteen bits of other information on 16-bit bus 242. In the embodiment depicted in FIG. 6A and 6b, the receiver has no protection against putting out erroneous bits over the 16-bit bus 242. However, it will be apparent to those skilled in the art that such protection can be provided by using one or more of the methods, discussed below. For example, in one embodiment two of these sixteen bits have protection against erroneous output and are used by other units (not shown).

The Modem Control Information. In the illustrated embodiment, depicted in FIGS. 6A and 6b, frame disassembly unit 236 uses a somewhat different way of putting out the modem control information in the second and third sets of sixteen bits of other information contained in each frame. In one specific embodiment frame disassembly unit 236 additionally contains four four-bit parallel-to-serial shift registers (not shown) onto which the four bits Present on four-bit bus 234 are latched by four four-bit latches (also not shown) When the signal MODEM DATA SPACE is asserted, (a) the bits from bus 234 are latched into the first four-bit parallel-to-serial shift register (not shown) when the signal LATCH FIRST WORD is asserted, (b) the bits from bus 234 are latched into the second four-bit parallel-to-serial shift register (not shown) when the signal LATCH SECOND WORD is asserted, (c) the bits from bus 234 are latched into the third four-bit parallel-to-serial shift register (not shown) when the signal LATCH THIRD WORD is asserted, and (d) the bits from bus 234 are latched into the fourth four-bit parallel-to-serial shift register (not shown) when the signal LATCH FOURTH WORD is asserted.

From the four four-bit shift registers (not shown) in frame disassembly unit 236 the bits in the second and third sets of sixteen bits of other information shift out serially over line 502 as the signal SR OUT to a ninety-six bit serial-to-parallel shift register 504. The signal SR OUT CLOCK, applied to the shift register 504 by the main counter/sequencer unit 208 over line 411, controls the shifting of these bits from the frame disassembly unit 236. During each of the three frames in a superframe thirty-two bits of modem control information, contained in the second and third sets of sixteen bits of other information in each frame, flow out over line 502.

When the ninety-six bit serial-to-parallel shift register 504 receives the signal SR OUTPUT ENABLE over line 506, that shift register releases the ninety-six bits it contains to ninety-six line modem control bus 508, which leads to modem units (not shown) which receive high-speed data from the high-speed data output lines 18. A modem data control unit 510, described in greater detail below in connection with FIG. 14, controls the assertions of the signal SR OUTPUT ENABLE over line 506.

The Define Superframe Bit and the Three Bits of Link Control and Status Information. The Define Superframe bit is released into logic in the demultiplexing unit 16 only when the GOOD FRAME signal is asserted. In FIGS. 6A and 6b, line 538 feeds the bit received in the location corresponding to the Define Superframe bit in the first set of four bits of other information from the output of the four-bit latch 254 to the triple-frame counting unit 536. The triple-frame counting unit 536 also receives the signals FCS OK over line 274 and GOOD FRAME over line 512. The triple-frame counting unit 536 asserts the signal THIRD FRAME over line 534 only at the end of the third frame in each superframe after it has received three Define Superframe bits in the correct order (that is, in the order 1,0,0) to indicate that a full superframe has been received, for each frame of which the signals GOOD FRAME and FCS OK have been asserted.

The three bits of link control and status information receive the highest degree of protection against the release of possibly erroneous bits. The frame assembly unit 236 latches these bits onto the three remaining lines of 4-bit bus 240 (the Define Superframe bit occupies the other line of 4-bit bus 240), which leads to 4-bit latch 254. As discussed above, the 4-bit latch 254 latches only when the signal GOOD FRAME is asserted. Thus, the link control and status information bits received in any frame pass over latch 254 only if the GOOD FRAME signal is asserted for that frame.

Latch 254 places the Do Loopback bit on line 518, the Low Power bit on line 520, and the Rem Sync bit on line 522. Each of these lines leads to another latch 524, which also latches only when the GOOD frame signal is asserted Thus, the three bits on lines 518, 520, and 522 pass from the output of latch 254 over latch 524 only on the next frame for which the GOOD FRAME signal is asserted after the frame when those bits were received.

Latch 524 latches the bit received in the frame location corresponding to the Rem Sync bit onto line 522, which leads to the error detecting unit 276 Thus, the signal GOOD FRAME must be twice asserted to move a bit received in the frame location corresponding to the Rem Sync bit from four-bit bus 240 to the error detecting unit 276

The other two link control and status bits in the first set of four bits of other information receive additional protection against the output of possibly erroneous bits. These bits become the signals DO LOOPBACK and LOW POWER, which are placed on lines 1024 and 1036, respectively, which lead from the demultiplexing unit 16 to other units (not shown). The signals DO LOOPBACK and LOW POWER, when asserted, significantly affect the operation of a communications system using the concentrator of the invention. Accordingly, those signals (a) are asserted high only when the bits received in locations in the frame corresponding to the Remote Loopback bit and the Low Power bit have been received high in one frame for which the signal GOOD FRAME is asserted and also in the next frame for which the signal GOOD FRAME is also asserted, or (b) are deasserted low only when the bits received in locations in the frame corresponding to the Remote Loopback bit and the Low Power bit have been received low in one frame for which the signal GOOD FRAME is asserted and also in the next frame for which the signal GOOD FRAME is also asserted.

This additional protection against the output of possibly erroneous REMOTE LOOPBACK and LOW POWER signals can be accomplished by use of the circuitry shown in FIGS. 6A and 6b, in which the output lines 518 and 520 from four-bit latch 254, onto which the Remote Loopback and Low Power bits are latched, each lead not only to (a) inputs to latch 524 but also (b) to an input to exclusive-NOR gates 526 and 528, respectively. Corresponding output lines 530 and 532 of latch 524 also lead (a) to the other input to exclusive-NOR gates 526 and 528, respectively, and (b) to an input to latches 534 and 538, respectively. The outputs of the exclusive-NOR gates 526 and 528 lead to one input to AND-gates 540 and 542, respectively. Line 512, which carries the signal GOOD FRAME, leads to the other input to AND-gates 40 and 542. A high output from AND-gate 540 over line 544 actuates latch 548, placing the Remote Loopback bit on line 552 as the signal DO LOOPBACK. A high signal from the AND-gate 542 over line 546 actuates latch 550, placing the Low Power bit on line 554 as the signal LOW POWER.

As a result, the Remote Loopback bit and the Low Power bit are put out from the demultiplexing unit 16 only when each of those bits matches in a first frame for which GOOD FRAME is asserted and in the next frame for which GOOD FRAME is asserted.

The Error Detecting Unit and the Error Signalling Unit. The mechanisms described above may not screen all reception errors from the high-speed data output lines 18 leading from the demultiplexing unit 16, or from the operation of the units (not shown) connected to those output lines, or from the various low-speed data and control lines 17. Moreover, errors affecting many frames in succession would block the release of the low sPeed data and control information. Accordingly, an error detecting unit 276 asserts a signal ERROR CONDITION over a line 278 to an error signalling unit 280 when conditions exist indicating an error. The error signalling unit 280 indicates that an error condition exists by asserting a signal ERROR CONDITION over line 278 to an error signal unit 280. If the error condition is transient, the error signalling unit 280 will provide only a transient signal. But if an error condition persists, the error signalling unit 280 will provide a nontransient error signal.

FIG. 7 is a schematic diagram of the error detecting unit 276, line 278, and the error signalling unit 280 of one specific embodiment. As indicated in FIGS. 6A and 6b, the signals REM SYNC, IN SYNC, VALID WORD, FCS OK, END OF FRAME, and RESET are coupled to the error detecting unit 276 over lines 522, 426, 226, 274, 424, and 209, respectively. Lines 522, 426, 226, and 274 each lead to an inverter 602, which inverts the signal on lines 522, 426, 226, and 274 and places the inverted signal on lines 604, 606, 608, and 610, respectively. Line 610 and line 424 each lead to one input to AND-gate 612, which places its output on line 614.

Lines 604, 606, 608, and 614 each lead to an input to OR-gate 616, the output of which leads over line 618 to the set input of a flip-flop 620. When the signal in line 618 is high, flip-flop 620 is set to place a high signal on its output line 622, which leads to the enable input of divide-by-8777 counter 624. When the signal on line 622 is high, divide-by-8777 counter commences counting the pulses applied to its clock input. Line 424, which carries the END OF FRAME signal, leads to the clock input of divide-by-8777 counter 624.

As indicated by the logic shown in FIG. 7, divide-by-8777 counter 624 is enabled whenever any one or more of the following conditions are present: (1) REM SYNC is low, which indicates either that the Rem sync bit was received in error or that the receiver which is on the same chip as the multiplexing unit 4 is not in synchronization with the transmitter which is on the same chip as the demultiplexing unit 16; (2) IN SYNC is low, which indicates that the main counter/sequencer unit 208 has not yet satisfied the conditions, described above, for asserting the IN SYNC signal; (3) VALID WORD is low, which indicates that a 5-bit code word which is not a valid code word has been placed on 5-bit channel 222; or (4) FCS OK is low when the END OF FRAME signal is high, which indicates either that the main counter/sequencer unit 208 is out of synchronization with the bits indicating the end of the frame or that the received and the calculated frame check sequences do not match. If any one or more of these conditions occurs, divide-by-8777 counter begins to count the number of assertions of the END OF FRAME signal. The "one" output of divide-by-8777 counter 624 is connected to line 278 and supplies the signal ERROR CONDITION when the "one" output is high.

In one specific embodiment, in which RECEIVER BIT CLOCK operates at approximately 6.33 MHz and in which each assertion of the END OF FRAME pulse is separated from the preceding assertion by 720 pulses of RECEIVER BIT CLOCK, the signal ERROR CONDITION will go high approximately one second after the divide-by-8777 counter is enabled. When the signal ERROR CONDITION is high, a light emitting diode 626 is energized to emit light which can be perceived by a human user as an indication that there has been an error condition.

Line 278 also leads to one input to OR-gate 628, the output of which leads over line 630 to the reset input of flip-flop 620. The other input to OR-gate 628 is line 209, which carries the signal RESET. When the signal on line 630 is high, flip-flop 620 places a low signal on its output line 278. As indicated by this logic, flip-flop 620 is reset, causing its output over line 622 to go low, whenever either (1) ERROR CONDITION is high or (2) RESET is high. This causes ERROR CONDITION to be asserted only once for every approximately one second during which an error condition exists (that is, 8777 assertions of the signal END OF FRAME after an error condition is signalled). This in turn causes the light-emitting diode 626 to flash only once for every approximately one second during which an error condition exists. If a second error condition occurs more than one second after a preceding first error condition, the light-emitting diode 626 will flash again for the second error condition. Thus, if any error condition exists during a time exceeding one second, light-emitting diode 626 will flash approximately once for every approximately one second during which an error condition persists.

A high assertion of the signal RESET over line 209 will also cause the signal on line 622 to go low, thereby disenabling divide-by-8777 counter 624 from counting up further while the RESET signal is high.

The Receiver Filter Unit 252. FIG. 8 is a schematic diagram of an illustrative receiver filter unit 252, which filters the stream of received filtered samples of high-speed data by implementing a smoothing algorithm based on the knowledge that the high-speed data signals in each high-speed data input line 2 have been heavily sampled and also filtered in the sampling and filtering unit 20 before transmission.

In response to the assertion of the signal RECEIVER FILTER CLOCK, received from the main counter/sequencer unit 208 over line 422, 16-bit latch 302 latches the bit on each line of 16-bit bus 238 to a corresponding one of the sixteen lines 304. Each line 304 leads to an input of each of two other units. First, each line 304 leads to an input to another 16-bit- latch 306 which also latches whenever the signal RECEIVER FILTER CLOCK, also received from the main counter/sequencer unit 208 over line 422, is asserted. Second, each line 304 also leads to one input to one of the sixteen majority algorithm units 308. Each output line 310 of 16-bit latch 306 also leads to another input to the corresponding majority algorithm unit 308.

The output of each majority algorithm unit 308 feeds over a line 312 to an input to another 16-bit latch 314. The 16-bit latch 314, like the 16-bit latches 302 and 306, latches whenever the signal RECEIVER FILTER CLOCK, also received from the main counter/sequencer unit 208 over line 422, is asserted. Each output line 316 of 16-bit latch 314 leads to one input to each of two other units. First, each output line 316 leads back to another input to a majority algorithm unit 308. Second, each output line 316 leads to the input to a buffer 318, which permits the signal on that line 316 to flow to one of the high-speed data output lines 18 but prevents any signal on that high-speed data output line 18 from flowing to that line 316.

In the illustrated embodiment each majority algorithm unit 308 carries out the same algorithm as a majority algorithm unit 116 in the sampling and filtering unit 20 in the multiplexing unit 4. That is, each majority algorithm unit 308 places on its output line 312 a signal which has the same value as the signal on the majority of its three input lines 304, 310, and 316. For example, if the signal on its input line 304 is a one bit, the signal on its input line 310 is a zero bit, and the signal on its input line 316 is a one bit, then that majority algorithm unit 308 places a one bit on its output line 312. Each majority algorithm unit 308 asserts its output immediately in response to its inputs.

Figure 9:
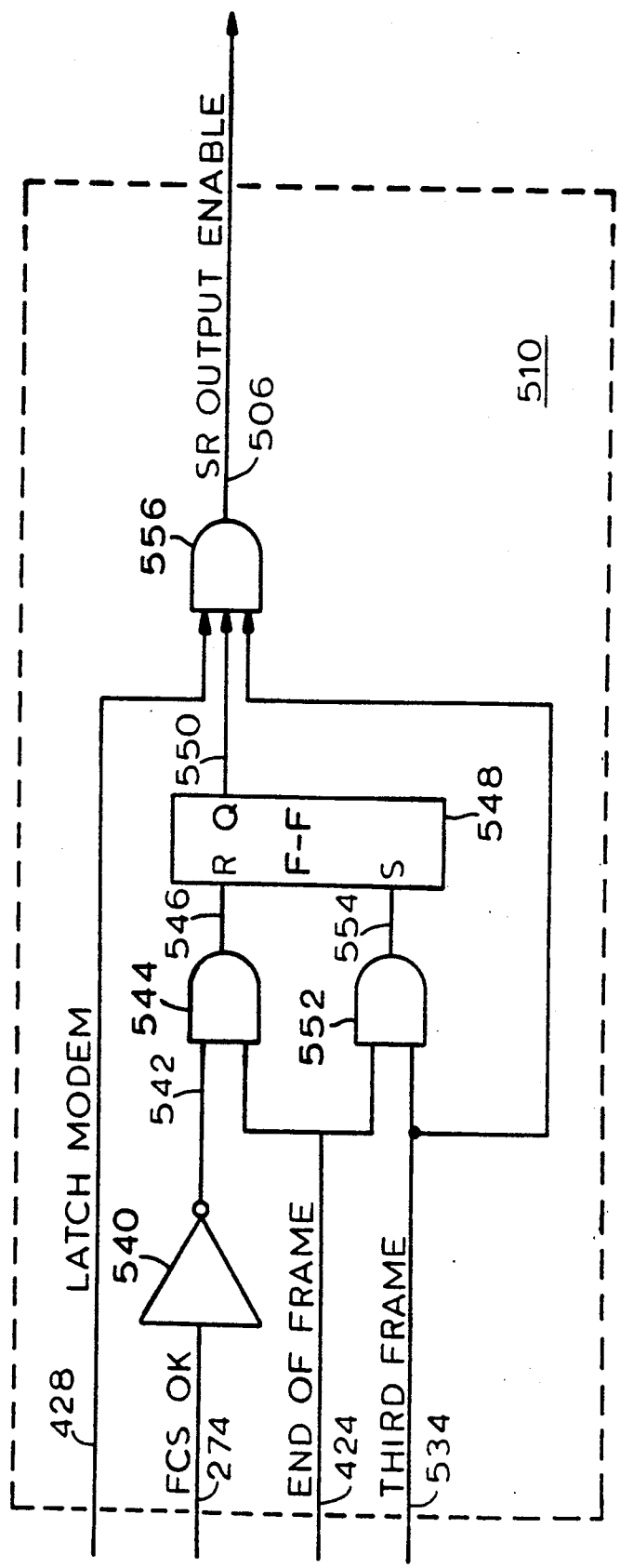
FIG. 9 is a schematic diagram of an illustrative modem data control unit in the demultiplexing depicted in FIG. 9.

The Modem Data Control Unit 510. FIG. 9 depicts the modem data control unit 510 in greater detail. Line 274, which carries the signal FCS OK from FCS comparator unit 262, leads to inverter 540, the output of which leads over line 542 to one input to AND-gate 544. Line 424, which carries the signal END OF FRAME from the main counter/sequencer unit 208, leads to the other input to AND-gate 544. If FCS OK is not asserted at the time when the END OF FRAME signal is asserted, AND-gate 544 asserts a high signal over line 546 to the reset input of flip-flop 548. When the signal in line 546 is high, flip-flop 548 places a low signal on its output line 550. Line 424 also leads to one input to AND-gate 552; line 534, which carries the signal THIRD FRAME from a triple-frame counting unit 536, leads to the other input to AND-gate 552 When the signals END OF FRAME and THIRD FRAME are simultaneously high, AND-gate 552 asserts a high signal over line 554 to the set input of flip-flop 548. When a high signal is asserted at its set input, flip-flop 548 places a high signal on its output line 550.

Line 550 leads to one input to AND-gate 556; line 428, which carries the LATCH MODEM signal from the main counter/sequencer unit 208, leads to another input to AND-gate 556; and line 534, which carries the THIRD FRAME signal, leads to a third input to AND-gate 556. When the signals on lines 428, 550, and 534 are all high, AND-gate 556 asserts a high signal—the signal SR OUTPUT ENABLE -over its output line 506.

From FIG. 9 it can be seen that the conditions for asserting the signal SR OUTPUT ENABLE high are that, simultaneously, (1) THIRD FRAME is asserted; (2) END OF FRAME is asserted; and (3) FCS OK is asserted—which causes a flip-flop 548 to assert a high signal over line 550—and then, simultaneously, (1) LATCH MODEM is asserted, and (2) the signal on line 550 is asserted high when the THIRD FRAME signal is asserted high. A further condition on asserting SR OUTPUT ENABLE is provided by the signal GOOD FRAME, which causes latch 254 to latch. The signal GOOD FRAME must be asserted for each of the three frames in a superframe for the bit received in the location corresponding to the Define Superframe bit to be latched from four-bit bus 240 onto line 538 and thus into triple-frame frame counting unit 536. Unless triple-frame counting unit 6 receives the frame definition bit of all three frames in a superframe, it will not assert the signal THIRD FRAME over line 534 to the modem data control unit 510. Thus, the signal SR OUTPUT ENABLE can be asserted for any superframe only if all three frames in the superframe are received such that FCS OK is asserted for each frame.

The protection mechanisms correct all instances of isolated, single-code-bit errors and many cases of multiple errors within various aggregates of code words It will be apparent to those skilled in the art that the forms of protection provided in the demultiplexing unit 16 in the illustrated embodiment against passing on bits which may have been received in error are not exclusive The coding system of the invention provides flexibility to implement other ways of providing the same type of protection, and other types of protection may be provided.

The foregoing description has been limited to specific embodiments of the invention. It will be apparent, however, that variations and modifications may be made to the invention, with the attainment of some or all of the advantages of the invention, and that the invention can be made in other ways. Therefore, it is the object of the appended claims to cover all such variations and modifications as come within the true spirit and scope of the invention.

What is claimed as new and desired to be secured by Letters Patent of the United States is:

1. A digital-data transmission apparatus for receiving at least one system input signal representing a sequence of data bits that occur at most at an expected maximum data rate and for generating in response thereto a transmitter output signal for transmission over an output line, the apparatus comprising:
   a transmitter input circuit, connected to receive the system input signal, for generating a transmitter-input-circuit signal representing a sequence of transmitter-input-circuit bits determined by the sequence of data bits that the system input signal represents; and
   a transmitter output circuit, connected to receive the transmitter-input-circuit signal, for generating as the transmitter output signal a signal representing contents determined by the transmitter-input-circuit bits, the transmitter output circuit comprising:
      transmitter frame-assembly means for organizing the transmitter-input-circuit bits into intermediate data words, each of which comprises a predetermined number of the transmitter-input-circuit bits;
      a transmitter complement unit for complementing alternate intermediate data words and generating a transmitter-complemented and uncomplemented intermediate data words;
      a coding unit responsive to the transmitter-complement-unit output for producing a coding-unit output signal representing transmitter code words that result from encoding the transmitter-complement-unit output in accordance with a code in which the imbalances of the majority of the unbalanced code words are opposite those of the code words that represent the complements of the data words that those unbalanced code words represent; and
      a transmitter for transmitting as the transmitter output signal a signal representing the transmitter code words that the coding unit produces.

2. A digital-data transmission apparatus as defined in claim 1 wherein each code word comprises 2M+1 bits, where M is an integer, and no more than M+1 bits of any code word have the same value.

3. A digital-data transmission apparatus as defined in claim 2 wherein M=2.

4. A digital-data transmission apparatus as defined in claim 3 wherein the code word for each intermediate data word is as follows:

| Code Word | Data Word |
| --- | --- |
| 01010 | 0000 |
| 10001 | 0001 |
| 10010 | 0010 |
| 11000 | 0011 |
| 01100 | 0100 |
| 10101 | 0101 |

5. A digital-data transmission apparatus as defined in claim 4 wherein the transmitter comprises means for transmitting as the transmitter output signal an optical signal representing the transmitter code words that the coding unit produces.

6. A digital-data transmission apparatus as defined in claim 1 wherein the transmitter comprises means for transmitting as the transmitter output signal an optical signal representing the transmitter code words that the coding unit produces.

7. A digital-data transmission apparatus as defined in claim 6 wherein the transmitter input circuit:
   includes a sampling circuit for taking samples of the system input sampling circuit for taking samples of the system input signal at a sampling rate that exceeds the expected maximum data rate and for generating a sample signal representing a sequence of sample bits determined by corresponding successive samples;
   includes a transmitter filter responsive to the sample signal for generating a transmitter-filter output that comprises, for each given sample bit, an associated transmitter-filter output bit whose value is that of the majority of the given sample bit, the sample bit that immediately succeeds the given sample bit, and the transmitter-filter output bit associated with the sample bit that immediately precedes the given sample bit; and
   includes means for generating as the transmitter-input-circuit signal a signal whose contents are determined by the transmitter-filter output.

8. A digital-data transmission apparatus as defined in claim 1 wherein the transmitter input circuit:
   includes a sampling circuit for taking samples of the system input signal at a sampling rate that exceeds the expected maximum data rate and for generating a sample signal representing a sequence of sample bits determined by corresponding successive samples;
   includes a transmitter filter responsive to the sample signal for generating a transmitter-filter output that comprises, for each given sample bit, an associated transmitter-filter output bit whose value is that of the majority of the given sample bit, the sample bit that immediately succeeds the given sample bit, and the transmitter-filter output bit associated with the sample bit that immediately precedes the given sample bit; and
   includes means for generating as the transmitter-input-circuit signal a signal whose contents are determined by the transmitter-filter output.

9. A digital-data transmission apparatus for receiving at least one system input signal representing a sequence of data bits that occur at most at an expected maximum data rate and for generating in response thereto an optical transmitter output signal for transmission over a fiber-optic cable comprising:

a transmitter input circuit, connected to receive the system input signal and including:

a sampling circuit for taking samples of the system input signal at a sampling rate that exceeds the expected maximum data rate and for generating a sample signal representing a sequence of sample bits determined by corresponding successive samples;

a transmitter filter responsive to the sample signal for generating a transmitter-filter output that comprises, for each given sample bit, an associated transmitter-filter output bit whose value is that of the majority of the given sample bit, the sample bit that immediately succeeds the given sample bit, and the transmitter-filter output bit associated with the sample bit that immediately precedes the given sample bit; and means for generating a transmitter-input-circuit signal whose contents are determined by the transmitter-filter output; and a transmitter output circuit, connected to receive the transmitter-input-circuit signal, for generating as the transmitter output signal a signal representing contents determined by the transmitter-input-circuit bits, the transmitter output circuit comprising:

transmitter frame-assembly means for organizing the transmitter-input-circuit bits into intermediate data words, each of which comprises a predetermined number of the transmitter-input-circuit bits;

a transmitter complement unit for complementing alternate intermediate data words and generating a transmitter-complement-unit output comprising the alternate complemented and uncomplemented intermediate data words;

a coding unit responsive to the transmitter-complement-unit output for producing a coding-unit output signal representing transmitter code words that result from encoding the transmitter-complement-unit output in accordance with the following code:

| Code Word | Data Word |
| --- | --- |
| 01010 | 0000 |
| 10001 | 0001 |
| 10010 | 0010 |
| 11000 | 0011 |
| 01100 | 0100 |
| 10101 | 0101 |
| 00110 | 0110 |
| 01001 | 0111 |
| 01101 | 1000 |
| 10011 | 1001 | a transmitter adapted for coupling to a fiber-optic cable for transmitting over the fiber-optic cable, as the transmitter-output signal, an optical signal representing the transmitter code words that the coding unit produces.

10. A digital-data transmission apparatus for receiving at least one system input signal representing a sequence of data bits that occur at most at an expected maximum data rate and for generating in response thereto a transmitter output signal for transmission over an output line, the apparatus comprising:

a transmitter input circuit connected to receive the system input signal and including:

a sampling circuit for taking samples of the system input signal at a sampling rate that exceeds the expected maximum data rate and for generating a sample signal representing a sequence of sample bits determined by corresponding successive samples;

a transmitter filter responsive to the sample signal for generating a transmitter-filter output that comprises, for each given sample bit, an associated transmitter-filter output bit whose value is that of the majority of the given sample bit, the sample bit that immediately succeeds the given sample bit, and the transmitter-filter output bit associated with the sample bit that immediately precedes the given sample bit; and means for generating a transmitter-input-circuit signal whose contents are determined by the transmitter-filter output; and a transmitter output circuit, connected to receive the transmitter-input-circuit signal, for generating as the transmitter output signal a signal representing contents determined by the contents of the transmitter-input-circuit signal.

11. A digital-data transmission apparatus as defined in claim 10 wherein the transmitter comprises means for transmitting as the transmitter output signal an optical signal representing the transmitter code words that the coding unit produces.

12. A digital-data reception apparatus for receiving a receiver input signal representing a sequence of receiver-input-signal bits and for generating a system output signal representative of the corrected contents of the receiver input signal, the reception apparatus comprising:

a receiver input circuit comprising:

receiver frame-assembly means for organizing the receiver-input-signal bits into receiver code words, each of which comprises a predetermined number of the receiver-input-signal bits;

a decoding unit responsive to the receiver frame-assembly means for producing a decoding-unit output signal representing receiver data words that result from decoding the receiver code words in accordance with a code in which the imbalances of the majority of the unbalanced code words are opposite those of the code words that represent the complements of the data words that those unbalanced codes represent;

a receiver complement unit responsive to the decoding-unit output signal for complementing alternate receiver data words so as to generate a complement-unit output comprising a complement-unit output word associated with each receiver data word, every other complement-unit output word being the complement of its associated receiver data word, the remaining complement unit output words being identical to their associated receiver data words; and means for generating a receiver-input-circuit signal that represents contents determined by the complement-unit output; and a receiver output circuit, connected to receive the receiver-input-circuit signal, for generating therefrom as the system output signal a signal determined by the contents of the receiver-input-circuit signal.

13. A digital-data reception apparatus as defined in claim 12 wherein each code word comprises 2M+1 bits, where M is an integer, and no more than M+1 bits of any code word have the same value.

14. A digital-data reception apparatus as defined in claim 13 wherein M=2.

15. A digital-data reception apparatus as defined in claim 14 wherein the code word for each receiver data word is as follows:

| Code Word | Data Word |
|---|---|
| 01010 | 0000 |
| 10001 | 0001 |
| 10010 | 0010 |
| 11000 | 0011 |
| 01100 | 0100 |
| 10101 | 0101 |
| 00110 | 0110 |
| 01001 | 0111 |
| 01101 | 1000 |
| 10011 | 1001 |
| 01011 | 1010 |
| 11001 | 1011 |
| 00111 | 1100 |
| 10110 | 1101 |
| 01110 | 1110 |

16. A digital-data reception apparatus as defined in claim 12 wherein the digital-data reception apparatus is an apparatus for receiving an optical signal as the receiver input signal.

17. A digital-data reception apparatus as defined in claim 16 wherein the receiver output circuit comprises:
a receiver filter responsive to the receiver-input-circuit signal for generating a receiver-filter output that comprises, for each given receiver-input-circuit data bit, an associated receiver-filter output data bit whose value is that of the majority of
the given receiver-input-circuit data bit, the receiver-input-circuit data bit that immediately succeeds the given receiver-input-circuit data bit, and the receiver-filter output data bit associated with the receiver-input-circuit data bit that immediately precedes the given receiver-input-circuit data bit; and
means for generating as the system output signal a signal representing contents determined by the receiver-filter output.

18. A digital-data reception apparatus as defined in claim 17 wherein:
the code is one in which not all sequences of bits of the predetermined number are valid code words;
the decoding unit includes means for generating, in response to each receiver code word, a validity signal that indicates whether that receiver code word is a valid code word; and
the receiver input circuit includes means responsive to the complement-unit output and the validity signal to generate as the receiver-input-circuit signal a signal that includes: for each receiver code word that the validity signal indicates is a valid code word, receiver-input-circuit data bits determined by the complement-unit output word associated with the receiver data word decoded from that receiver code word and for each receiver code word that the validity signal indicates is not a valid code word, receiver-input-circuit data bits determined by the complement-unit output word associated with the receiver data word decoded from the last receiver code word that the validity signal indicated was a valid code word.

19. A digital-data reception apparatus as defined in claim 12 wherein the receiver output circuit comprise:
a receiver filter responsive to the receiver-input-circuit signal for generating a receiver-filter output that comprises, for each given receiver-input-circuit data bit, an associated receiver-filter output data bit whose value is that of the majority of the given receiver-input-circuit data bit, the receiver-input-circuit data bit that immediately succeeds the given receiver-input-circuit data bit, and the receiver-filter output data bit associated with the receiver-input-circuit data bit that immediately precedes the given receiver-input-circuit data bit; and
means for generating as the system output signal a signal representing contents determined by the 20. A digital-data reception apparatus as defined in claim 19 wherein:
the code is one in which not all sequences of bits of the predetermined number are valid code words;
the decoding unit includes means for generating, in response to each receiver code word, a validity signal that indicates whether that receiver code word is a valid code word; and
the receiver input circuit include means responsive to the complement-unit output and the validity signal to generate as the receiver-input-circuit signal a signal that includes: for each receiver code word that the validity signal indicates is a valid code word, receiver-input-circuit data bits determined by the complement-unit output word associated with the receiver data word decoded from that receiver code word and for each receiver code word that the validity signal indicates is not a valid code word, receiver-input-circuit data bits determined by the complement-unit output word associated with the receiver data word decoded from the last receiver code word that the validity signal indicated was a valid code word.

21. A digital-data reception apparatus as defined in claim 12 wherein:
the code is one in which not all sequences of bits of the predetermined number are valid code words;
the decoding unit includes means for generating, in response to each receiver code word, a validity signal that indicates whether that receiver code word is a valid code word; and
the receiver input circuit includes means responsive to the complement-unit output and the validity signal to generate as the receiver-input-circuit signal a signal that includes: for each receiver code word that the validity signal indicates is a valid code word, receiver-input-circuit data bits determined by the complement-unit output word associated with the receiver data word decoded from that receiver code word and, for each receiver code word that the validity signal indicates is not a valid code word, receiver-input-circuit data bits determined by the complement-unit output word associated with the receiver data word decoded from the last receiver code word that the validity signal indicated was a valid code word.

22. A digital-data reception apparatus for receiving an optical receiver input signal representing a sequence of receiver-input-signal bits and for generating a system output signal representative of the corrected contents of the receiver input signal, the reception apparatus comprising:

a receiver input circuit comprising:

receiver frame-assembly means for organizing the receiver-input-signal bits into receiver code words, each of which comprises a predetermined number of the receiver-input-signal bits;

a decoding unit responsive to the receiver frame-assembly means for producing a decoding-unit output signal representing receiver data words that result from decoding the receiver code words in accordance with the code employed by the coding unit and for generating, in response to each receiver code word, a validity signal that indicates whether that receiver code word is a valid code word;

a receiver complement unit responsive to the decoding-unit output signal for complementing alternate receiver data words so as to generate a complement-unit output comprising a complement-unit output word associated with each receiver data word, every other complement-unit output word being the complement of its associated data word, the remaining complement-unit output words being identical to their associated data words; and means responsive to the complement-unit output and the validity signal to generate a receiver-input-circuit signal that includes: for each receiver code word that the validity signal indicates is a valid code word, receiver-input-circuit data bits determined by the complement-unit output word associated with the receiver data word decoded from that receiver code word and for each receiver code word that the validity signal indicates is not a valid code word, receiver-input-circuit data bits determined by the complement-unit output word associated with the receiver data word decoded from the last receiver code word that the validity signal indicated was a valid code word; and a receiver output circuit, connected to receive the receiver-input-circuit signal and comprising a receiver filter responsive to the receiver-input-circuit signal for generating a receiver-filter output that comprises, for each given receiver-input-circuit data bit, an associated receiver-filter output data bit whose value is that of the majority of the given receiver-input-circuit data bit, the receiver-input-circuit data bit that immediately succeeds the given receiver-input-circuit data bit, and the receiver-filter output data bit associated with the receiver-input-circuit data bit that immediately precedes the given receiver-input-circuit data bit, for generating as the system output signal a signal representing contents determined by the receiver-filter output.

23. A digital-data reception apparatus for receiving a receiver input signal and generating a system output signal representative of the corrected contents of the receiver input signal, the reception apparatus comprising:

a receiver input circuit, adapted to receive the receiver input signal, for generating a receiver-input-circuit signal that represents a sequence of receiver-input-circuit data bits determined by the contents of the receiver input signal; and a receiver output circuit, connected to receive the receiver-input-circuit signal and comprising a receiver filter responsive to the receiver-input-circuit signal for generating a receiver-filter output that comprises, for each given receiver-input-circuit data bit, an associated receiver-filter output data bit whose value is that of the majority of the given receiver-input-circuit data bit, the receiver-input-circuit data bit that immediate succeeds the given receiver-input-circuit data bit, and the receiver-filter output data bit associated with the receiver-input-circuit data bit that immediately precedes the given receiver-input-circuit data bit, for generating as the output signal a bit that immediately precedes as the output signal a signal representing contents determined by the receiver-filter output.

24. A digital-data reception apparatus as defined in claim 23 wherein the receiver input circuit comprises:

receiver frame-assembly means for organizing the receiver-input-signal bits into receiver code words, each of which comprises a predetermined number of the receiver-input-signal bits;

a decoding unit responsive to the receiver frame-assembly means for producing a decoder-unit output signal representing receiver data words that result from decoding the receiver code words in accordance with a code in which not all sequences of bits of the predetermined number are valid code words and for generating, in response to each receiver code word, a validity signal that indicates whether that receiver code word is a valid code word; and means responsive to the decoder-unit output signal and the validity signal to generate as the receiver-input-circuit signal a signal that includes: for each receiver code word that the validity signal indicates is a valid code word, contents determined by the receiver data word decoded therefrom and for each receiver code word that the validity signal indicates is not a valid code word, contents determined by the receiver data word decoded from the last receiver code word that the validity signal indicated was a valid code word.

25. A digital-data reception apparatus as defined in claim 24 wherein the digital-data reception apparatus is an apparatus for receiving an optical signal as the receiver input signal.

26. A digital-data reception apparatus as defined in claim 23 wherein the digital-data reception apparatus is an apparatus for receiving an optical signal as the receiver input signal.

27. A digital-data reception apparatus for receiving a receiver input signal representing a sequence of receiver-input-signal bits and for generating a system output signal representative of the corrected contents of the receiver input signal, the reception apparatus comprising:

a receiver input circuit comprising:

receiver frame-assembly means for organizing the receiver-input-signal bits into receiver code words, each of which comprises a predetermined number of the receiver-input-signal bits;

a decoding unit responsive to the receiver frame-assembly means for producing a decoder-unit output signal representing receiver data words that result for decoding the receiver code words in accordance with a code in which not all sequences of bits of the predetermined number are valid code words and for generating, in response to each receiver code word, a validity signal that indicates whether that receiver code word is a valid code word; and means responsive to the decoder-unit output signal and the validity signal to generate a receiver-input-circuit signal that includes: for each receiver code word that the validity signal indicates is a valid code word, contents determined by the receiver data word decoded therefrom and for each receiver code word that the validity signal indicates is not a valid code word, contents determined by the receiver data word decoded from the last receiver code word that the validity signal indicated was a valid code word; and a receiver output circuit, connected to receive the receiver-input-circuit signal, for generating therefrom as the system output signal a signal determined by the contents of the receiver-input-circuit signal.

28. A digital-data reception apparatus as defined in claim 27 wherein the digital-data reception apparatus is an apparatus for receiving an optical signal as the receiver input signal.

29. A digital-data communication system for receiving at a first location at least one system input signal representing a sequence of data bits that occur at most at an expected maximum data rate, for transmitting the information content thereof to a second location, and for producing at the second location a system output signal representative of the contents the system input signal, of the system comprising:

a transmission medium;

a digital-data transmission apparatus, coupled to the transmission medium at the first location, for receiving the system input signal, for generating in response thereto a transmitter output signal, and for transmitting the transmitter output signal over the transmission medium, the digital-data transmission apparatus comprising:

a transmitter input circuit, connected to receive the system input signal, for generating a transmitter-input-circuit signal representing a sequence of transmitter-input-circuit bits determined by the sequence of data bits that the system input signal represents; and a transmitter output circuit, connected to receive the transmitter-input-circuit signal, for generating as the transmitter output signal a signal representing contents determined by the transmitter-input-circuit bits, the transmitter output circuit comprising:

transmitter frame-assembly means for organizing the transmitter-input-circuit bits into intermediate data words, each of which comprises a predetermined number of the transmitter-input-circuit bits;

a transmitter complement unit for complementing alternate intermediate data words and generating a transmitter-complement-unit output comprising the alternate complemented and uncomplemented intermediate data words;

a coding unit responsive to the transmitter-complement-unit output for producing a coding-unit output signal representing transmitter code words that result from encoding the transmitter-complement-unit output in accordance with a code in which the unbalances of the majority of the unbalanced code words are opposite those of the code words that represent the complements of the data words that those unbalanced code words represent; and a transmitter for transmitting as the transmitter output signal a signal representing the transmitter code words that the coding unit produces; and a digital-data reception apparatus coupled to the transmission medium at the second location, for receiving, as a receiver input signal representing a sequence of receiver-input-signal bits, the signal transmitted by the transmitter over the transmission medium and for generating a system output signal representative of the corrected contents of the receiver input signal, the reception apparatus comprising:

a receiver input circuit comprising:

receiver frame-assembly means for organizing the receiver-input-signal bits into receiver code words, each of which comprises a predetermined number of the receiver-input-signal bits;

a decoding unit responsive to the receiver frame-assembly means for producing a decoding-unit output signal representing receiver data words that result from decoding the receiver code words in accordance with a code in which the code employed by the coding unit;

a receiver complement unit, responsive to the decoding-unit output signal for complementing alternate receiver data words so as to generate a complement-unit output comprising a complement-unit output word associated with each receiver data word, every other complement-unit output word being the complement of its associated receiver data word, the remaining complement unit output words being identical to their associated receiver data words; and means for generating a receiver-input-circuit signal that represents contents determined by the complement-unit output; and and means for generating a receiver-input-circuit signal that represents contents determined by the complement-unit output; and a receiver output circuit, connected to receive the receiver-input-circuit signal, for generating therefrom as the receiver output signal a signal determined by the contents of the receiver-input-circuit signal.

30. A digital-data communication system as defined in claim 29 wherein each code word comprises $2M+1$ bits, where M is an integer, and no more than $M+1$ bits of any code word have the same value.

31. A digital-data communication system as defined in claim 30 wherein $M=2$.

32. A digital-data communication system as defined in claim 31 wherein the code word for each data word is as follows:

| Code Word | Data Word |
| --- | --- |
| 01010 | 0000 |
| 10001 | 0001 |
| 10010 | 0010 |
| 11000 | 0011 |

-continued

| Code Word | Data Word |
|-----------|-----------|
| 01100 | 0100 |
| 10101 | 0101 |
| 00110 | 0110 |
| 01001 | 0111 |
| 01101 | 1000 |
| 10011 | 1001 |
| 01011 | 1010 |
| 11001 | 1011 |
| 00111 | 1100 |
| 10110 | 1101 |
| 01110 | 1110 |
| 11010 | 1111 |

33. A digital-data communication system as defined in claim 29 wherein the transmission medium comprises a fiber-optic cable.

34. A digital-data communication system as defined in claim 33 wherein the transmitter input circuit includes:
   a sampling circuit for taking samples of the system input signal at a sampling rate that exceeds the expected maximum data rate and for generating a sample signal representing a sequence of sample bits determined by corresponding successive samples;
   a transmitter filter responsive to the sample signal for generating a transmitter-filter output that comprises, for each given sample bit, an associated transmitter-filter output bit whose value is that of the majority of the given sample bit, the sample bit that immediately succeeds the given sample bit, and the transmitter-filter output bit associated with the sample bit that immediately precedes the given sample bit; and
   means for generating as the transmitter-input-circuit signal a signal whose contents are determined by the transmitter-filter output.

35. A digital-data communication system as defined in claim 34 wherein the receiver output circuit comprises:
   a receiver filter responsive to the receiver-input-circuit signal for generating a receiver-filter output that comprises, for each given receiver-input-circuit data bit, an associated receiver-filter output data bit whose value is that of the majority of the given receiver-input-circuit data bit, the receiver-input-circuit data bit that immediately succeeds the given receiver-input-circuit data bit, and the receiver-filter output data bit associated with the receiver-input-circuit data bit that immediately precedes the given receiver-input-circuit data bit; and
   means for generating as the system output signal a signal representing contents determined by the receiver-filter output.

36. A digital-data communication system as defined in claim 35 wherein:
   the code is one in which not all sequences of bits of the predetermined number are valid code words;
   the decoding unit includes means for generating, in response to each receiver code word, a validity signal that indicates whether that receiver code word is a valid code word; and
   the receiver input circuit includes means responsive to the complement-unit output and the validity signal to generate as the receiver-input-circuit signal a signal that includes: for each receiver code word that the validity signal indicates is a valid code word, receiver-input-circuit data bits determined by the complement-unit output word associated with the receiver data word decoded from that receiver code word and for each receiver code word that the validity signal indicates is not a valid code word, receiver-input-circuit data bits determined by the complement-unit output word associated with the receiver data word decoded from the last receiver code word that the validity signal indicated was a valid code word.

37. A digital-data communication system as defined in claim 34 wherein:
   the code is one in which not all sequences of bits of the predetermined number are valid code words;
   the decoding unit includes means for generating, in response to each receiver code word, a validity signal that indicates whether that receiver code word is a valid code word; and
   the receiver input circuit includes means responsive to the complement-unit output and the validity signal to generate as the receiver-input-circuit signal a signal that includes: for each receiver code word that the validity signal indicates is a valid code word, receiver-input-circuit data bits determined by the complement-unit output word associated with the receiver data word decoded from that receiver code word and for each receiver code word that the validity signal indicates is not a valid code word, receiver-input-circuit data bits determined by the complement-unit output word associated with the receiver data word decoded from the last receiver code word that the validity signal indicated was a valid code word.

38. A digital-data communication system as defined in claim 33 wherein the receiver output circuit comprises:
   a receiver filter responsive to the receiver-input-circuit signal for generating a receiver-input-filter output that comprises, for each given receiver-input-circuit data bit, an associated receiver-filter output data bit whose value is that of the majority of the given receiver-input-circuit data bit, the receiver-input-circuit data bit that immediately succeeds the given receiver-input-circuit data bit, and the receiver-filter output data bit associated with the receiver-input-circuit data bit that immediately precedes the given receiver-input-circuit data bit; and
   means for generating as the system output signal a signal representing contents determined by the receiver-filter output.

39. A digital-data communication system as defined in claim 29 wherein the transmitter input circuit includes:
   a sampling circuit for taking samples of the system input signal at a sampling rate that exceeds the expected maximum data rate and for generating a sample signal representing a sequence of sample bits determined by corresponding successive samples;
   a transmitter filter responsive to the sample signal for generating a transmitter-filter output that comprises, for each given sample bit, an associated transmitter-filter output bit whose value is that of the majority of the given sample bit, the sample bit that immediately succeeds the given sample bit, and the transmitter-filter output bit associated with the sample bit that immediately precedes the given sample bit; and means for generating as the transmitter-input-circuit signal a signal whose contents are determined by the transmitter-filter output.

40. A digital-data communication system as defined in claim 39 wherein the receiver output circuit comprise:

a receiver filter responsive to the receiver-input-circuit signal for generating a receiver-filter output that comprises, for each given receiver-input-circuit data bit, an associated receiver-filter output data bit whose value is that of the majority of the given receiver-input-circuit data bit, the receiver-input-circuit data bit that immediately succeeds the given receiver-input-circuit data bit, and the receiver-filter output data bit associated with the receiver-input-circuit data bit that immediately precedes the given receiver-input-circuit data bit; and means for generating as the system output signal a signal representing contents determined by the receiver-filter output.

41. A digital-data communication system as defined in claim 40 wherein:

the code is one in which not all sequences of bits of the predetermined number are valid code words;

the decoding unit includes mean for generating, in response to each receiver code word, a validity signal that indicates whether that receiver code word is a valid code word; and the receiver input circuit includes means responsive to the complement-unit output and the validity signal to generate as the receiver-input-circuit signal a signal that includes: for each receiver code word that the validity signal indicates is a valid code word, receiver-input-circuit data bits determined by the complement-unit output word associated with the receiver data word decoded from that receiver code word and for each receiver code word that the validity signal indicates is not a valid code word, receiver-input-circuit data bits determined by the complement-unit output word associated with the receiver data word decoded from the last receiver code word that the validity signal indicated was a valid code word.

42. A digital-data communication system as defined in claim 39 wherein:

the code is one in which not all sequences of bits of the predetermined number are valid code words;

the decoding unit includes means for generating, in response to each receiver code word, a validity signal that indicates whether that receiver code word is a valid code word; and the receiver input circuit includes means responsive to the complement-unit output and the validity signal to generate as the receiver-input-circuit signal a signal that includes: for each receiver code word that the validity signal indicates is a valid code word, receiver-input-circuit data bits determined by the complement-unit output word associated with the receiver data word decoded from that receiver code word and for each receiver code word that the validity signal indicates is not a valid code word, receiver-input-circuit data bits determined by the complement-unit output word associated with the receiver data word decoded from the last receiver code word that the validity signal indicated was a valid code word.

43. A digital-data communication system as defined in claim 32 wherein the receiver output circuit comprises:

a receiver filter responsive to the receiver-input-circuit signal for generating a receiver-filter output that comprises, for each given receiver-input-circuit data bit, an associated receiver-filter output data bit whose value is that of the majority of the given receiver-input-circuit data bit, the receiver-input-circuit data bit that immediately succeeds the given receiver-input-circuit data bit, and the receiver-filter output data bit associated with the receiver-input-circuit data bit that immediately precedes the given receiver-input-circuit data bit; and means for generating as the system output signal a signal representing contents determined by the receiver-filter output.

44. A digital-data communication system as defined in claim 43 wherein:

the code is one in which not all sequences of bits of the predetermined number are valid code words;

the decoding unit includes means for generating, in response to each receiver code word, a validity signal that indicates whether that receiver code word is a valid code word; and the receiver input circuit includes means responsive to the complement-unit output and the validity signal to generate as the receiver-input-circuit signal a signal that includes: for each receiver code word that the validity signal indicates is a valid code word, receiver-input-circuit data bits determined by the complement-unit output word associated with the receiver data word decoded from that receiver code word and, for each receiver code word that the validity signal indicates is not a valid code word, receiver-input-circuit data bits determined by the complement-unit output word associated with the receiver data word decoded from the last receiver code word that the validity signal indicated was a valid code word.

45. A digital-data communication system as defined in claim 29 wherein:

the code is one in which not all sequences of bits of the predetermined number are valid code words;

the decoding unit includes means for generating, in response to each receiver code word, a validity signal that indicates whether that receiver code word is a valid code word; and the receiver input circuit includes means responsive to the complement-unit output and the validity signal to generate as the receiver-input-circuit signal a signal that includes: for each receiver code word that the validity signal indicates is a valid code word, receiver-input-circuit data bits determined by the complement-unit output word associated with the receiver data word decoded from that receiver code word and, for each receiver code word that the validity signal indicates is not a valid code word, receiver-input-circuit data bits determined by the complement-unit output word associated with the receiver data word decoded from the last receiver code word that the validity signal indicated as a valid code word.

46. A digital-data communication system for receiving at a first location at least one system input signal representing a sequence of data bits that occur at most at an expected maximum data rate, for transmitting the information content thereof to a second location, and for producing at the second location a system output signal representative of the contents of the system input signal, of the system comprising:

a transmission medium;

a digital-data transmission apparatus, coupled to the signal medium at the first location to receive the system input signal, for generating in response thereto a transmitter output signal and for transmitting the transmitter output signal over the signal medium, the digital-data transmission apparatus comprising:

a transmitter input circuit, connected to receiver the system input signal and including:

a sampling circuit for taking samples of the system input signal at a sampling rate that exceeds the expected maximum data rate and for generating a sample signal representing a sequence of sample bits determined by corresponding successive samples;

a transmitter filter responsive to the sample signal for generating a transmitter-filter output that comprises, for each given sample bit, an associated transmitter-filter output bit whose value is that of the majority of the given sample bit, the sample bit that immediately succeeds the given sample bit, and (3) the transmitter-filter output bit associated with the sample bit that immediately precedes the given sample bit; and means for generating a transmitter-input-circuit signal whose contents are determined by the transmitter-filter output; and a transmitter output circuit, connected to receiver the transmitter-input-circuit signal, for generating as the transmitter output signal a signal representing contents determined by the contents of the transmitter-input-circuit signal; and a digital-data reception apparatus coupled to the signal medium at the second location, for receiving, as a receiver input signal representing a sequence of receiver-input-signal bits, the signal transmitted by the transmitter over the signal medium and for generating a system output signal representative of the corrected contents of the receiver input signal, the reception apparatus comprising:

a receiver input circuit, connected to receive the receiver input signal, for generating a receiver-input-circuit signal that represents a sequence of receiver-input-circuit data bits determined by the contents of the receiver input signal; and a receiver output circuit, connected to receive the receiver-input-circuit signal, for generating therefrom as the system output signal a signal determined by the contents of the receiver-input-circuit signal.

47. A digital-data communication system as defined in claim 46 wherein the receiver output circuit comprises:

a receiver filter responsive to the receiver-input-circuit signal for generating a receiver-filter output that comprises, for each given receiver-input-circuit data bit, an associated receiver-filter output data bit whose value is that of the majority of the given receiver-input-circuit data bit, the receiver-input-circuit data bit that immediately succeeds the given receiver-input-circuit data bit, and the receiver-filter output data bit associated with the receiver-input-circuit data bit that immediately precedes the given receiver-input-circuit data bit; and means for generating as the system output signal a signal representing contents determined by the receiver-filter output.

48. A digital-data communication system as defined in claim 47 wherein the receiver input circuit comprises:

receiver frame-assembly means for organizing the receiver-input-signal bits into receiver code words, each of which comprises a predetermined number of the receiver-input-signal bits;

a decoding unit responsive to the receiver frame-assembly means for producing a decoder-unit output signal representing receiver data words that result from decoding the receiver code words in accordance with a code in which not all sequences of bits of the predetermined number are valid code words and for generating, in response to each receiver code word, a validity signal that indicates whether that receiver code word is a valid code word; and means responsive to the decoder-unit output signal and the validity signal to generate as the receiver-input-circuit signal a signal that includes: for each receiver code word that the validity signal indicates is a valid code word, contents determined by the receiver data word decoded therefrom and, for each receiver code word that the validity signal indicates is not a valid code word, contents determined by the receiver data word decoded from the last receiver code word that the validity signal indicated was a valid code word.

49. A digital-data communication system as defined in claim 48 wherein the transmission medium comprises a fiber-optic cable.

50. A digital-data communication system as defined in claim 47 wherein the transmission medium comprises a fiber-optic cable.

51. A digital-data communication system as defined in claim 46 wherein the receiver input circuit comprises:

receiver frame-assembly means for organizing the receiver-input-signal bits into receiver code words, each of which comprises a predetermined number of the receiver-input-signal bits;

a decoding unit responsive to the receiver frame-assembly means for producing a decoder-unit output signal representing receiver data words that result from decoding the receiver code words in accordance with a code in which not all sequences of bits of the predetermined number are valid code words and for generating, in response to each receiver code word, a validity signal that indicates whether that receiver code word is a valid code word; and means responsive to the decoder-unit output signal and the validity signal to generate as the receiver-input-circuit signal a signal that includes: for each receiver code word that the validity signal indicates is a valid code word, contents determined by the receiver data word decoded therefrom and, for each receiver code word that the validity signal indicates is not a valid code word, contents determined by the receiver data word decoded from the last receiver code word that the validity signal indicated was a valid code word.

52. A digital-data communication system as defined in claim 51 wherein the transmission medium comprises a fiber-optic cable.

53. A digital-data communication system for receiving at a first location at least one system input signal representing a sequence of data bits that occur at most at an expected maximum data rate, for transmitting the information content thereof to a second location, and for producing at the second location a system output signal representative of the contents the system input signal, of the system comprising:

a transmission medium;

a digital-data transmission apparatus, coupled to the transmission medium at the first location, for receiving the system input signal, for generating in response thereto a transmitter output signal, and for transmitting the transmitter output signal over the transmission medium, the digital-data transmission apparatus comprising:

a transmitter input circuit, connected to receive the system input signal, for generating a transmitter-input-circuit signal representing a sequence of transmitter-input-circuit bits determined by the sequence of data bits that the system input signal represents; and a transmitter output circuit, connected to receiver the transmitter-input-circuit signal, for generating as the transmitter output signal a signal representing contents determined by the contents of the transmitter-input-circuit signal; and a digital-data reception apparatus, coupled to the transmission medium at the second location, for receiving, as a receiver input signal representing a sequence of receiver-input-signal bits, the signal transmitted by the transmitter over the transmission medium and for generating a system output signal representative of the corrected contents of the receiver input signal, the reception apparatus comprising:

a receiver input circuit, connected to receive the receiver input signal, for generating a receiver-input-circuit signal that represents a sequence of receiver-input-circuit data bits determined by the contents of the receiver input signal; and a receiver output circuit, connected to receive the receiver-input-circuit signal and comprising a receiver filter responsive to the receiver-input-circuit signal for generating a receiver-filter output that comprises, for each given receiver-input-circuit data bit, an associated receiver-filter output data bit whose value is that of the majority of the given receiver-input-circuit data bit, the receiver-input-circuit data bit that immediately succeeds the given receiver-input-circuit data bit, and the receiver-filter output data bit associated with the receiver-input-circuit data bit that immediately precedes the given receiver-input-circuit data bit, for generating as the system output signal a signal representing contents determined by the receiver-filter output.

54. A digital-data communication system as defined in claim 53 wherein the receiver input circuit comprises:

receiver frame-assembly means for organizing the receiver-input-signal bits into receiver code words, each of which comprises a predetermined number of the receiver-input-signal bits;

a decoding unit responsive to the receiver frame-assembly means for producing a decoder-unit output signal representing receiver data words that result from decoding the receiver code words in accordance with a code in which not all sequences of bits of the predetermined number are valid code words and for generating, in response to each receiver code word, a validity signal that indicates whether that receiver code word is a valid code word; and means responsive to the decoder-unit output signal and the validity signal to generate as the receiver-input-circuit signal a signal that includes: for each receiver code word that the validity signal indicates is a valid code word, contents determined by the receiver data word decoded therefrom and for each receiver code word that the validity signal indicates is not a valid code word, contents determined by the receiver data word decoded from the last receiver code word that the validity signal indicated was a valid code word.

55. A digital-data communication system as defined in claim 54 wherein the transmission medium comprises a fiber-optic cable.

56. A digital-data communication system as defined in claim 53 wherein the transmission medium comprises a fiber-optic cable.

57. A digital-data communication system for receiving at a first location at least one system input signal representing a sequence of data bits that occur at most at an expected maximum data rate, for transmitting the information content thereof to a second location, and for producing at the second location a system output signal representative of the contents the system input signal, of the system comprising:

a transmission medium;

a digital-data transmission apparatus, coupled to the transmission medium at the first location for receiving the system input signal, for generating in response thereto a transmitter output signal and for transmitting the transmitter output signal over the transmission medium, the digital-data transmission apparatus comprising:

a transmitter input circuit, connected to receive the system input signal, for generating a transmitter-input-circuit signal representing a sequence of transmitter-input-circuit bits determined by the sequence of data bits that the system input signal represents; and a transmitter output circuit, connected to receive the transmitter-input-circuit signal, for generating as the transmitter output signal a signal representing contents determined by the contents of the transmitter-input-circuit signal; and a digital-data reception apparatus, coupled to the transmission medium at the second location, for receiving, as a receiver input signal representing a sequence of receiver-input-signal bits, the signal transmitted by the transmitter over the transmission medium and for generating a system output signal representative of the corrected contents of the receiver input signal, the reception apparatus comprising:

a receiver input circuit comprising:

receiver frame-assembly means for organizing the receiver-input-signal bits into receiver code words, each of which comprises a predetermined number of the receiver-input-signal bits;

a decoding unit responsive to the receiver frame-assembly means for producing a decoder-unit output signal representing receiver data words that result from decoding the receiver code words in accordance with a code in which not all sequences of bits of the predetermined number are valid code words and for generating, in response to each receiver code word, a validity signal that indicates whether that receiver code word is a valid code word; and means responsive to the decoder-unit output signal and the validity signal to generate a receiver-input-circuit signal that includes: for each receiver code word that the validity signal indicates is a valid code word, contents determined by the receiver data word decoded therefrom and for each receiver code word that the validity signal indicates is not a valid code word, contents determined by the receiver data word decoded from the last receiver code word that the validity signal indicated was a valid code word; and a receiver output circuit, connected to receive the receiver-input-circuit signal, for generating therefrom as the system output signal a signal determined by the contents of the receiver-input-circuit signal.

58. A digital-data communication system as defined in claim 57 wherein the transmission medium comprises a fiber-optic cable.

59. A digital-data communication system for receiving at a first location at least one system input signal representing a sequence of data bits that occur at most at an expected maximum data rate, for transmitting the information content thereof to a second location, and for producing at the second location a system output signal representative of the contents the system input signal, of the system comprising:

a fiber-optic cable;

a digital-data transmission apparatus, coupled to the fiber-optic cable at a first location, for receiving the system input signal, for generating in response thereto an optical transmitter output signal, and for transmitting the optical transmitter output signal over the fiber-optic cable, the digital-data transmission apparatus comprising:

a transmitter input circuit, connected to receive the system input signal and including:

a sampling circuit for taking samples of the system input signal at a sampling rate that exceeds the expected maximum data rate and for generating a sample signal representing a sequence of sample bits determined by corresponding successive samples; and a transmitter filter responsive to the sample signal for generating a transmitter-filter output that comprises, for each given sample bit, an associated transmitter-filter output bit whose value is that of the majority of the given sample bit, the sample bit that immediately succeeds the given sample bit, and (3) the transmitter-filter output bit associated with the sample bit that immediately precedes the given sample bit; and means for generating a transmitter-input-circuit signal representing a sequence of transmitter-input circuit bits determined by the transmitter-filter output; and a transmitter output circuit, connected to receive the transmitter-input-circuit signal, for generating as the transmitter output signal a signal representing contents determined by the transmitter-input-circuit bits, the transmitter output circuit comprising:

transmitter frame-assembly means for organizing the transmitter-input-circuit bits into intermediate data words, each of which comprises a predetermined number of the transmitter-input-circuit bits;

a transmitter complement unit for complementing alternate intermediate data words and generating a transmitter-complement-unit output comprising the alternate complemented and uncomplemented intermediate data words;

a coding unit responsive to the transmitter-complement-unit output for producing a coding-unit output signal representing transmitter code words that result from encoding the transmitter-complement-unit output in accordance with the following code:

| Code Word | Data Word |
|---|---|
| 01010 | 0000 |
| 10001 | 0001 |
| 10010 | 0010 |
| 11000 | 0011 |
| 01100 | 0100 |
| 10101 | 0101 |
| 00110 | 0110 |
| 01001 | 0111 |
| 01101 | 1000 |
| 10011 | 1001 |
| 01011 | 1010 |
| 11001 | 1011 |
| 00111 | 1100 |
| 10110 | 1101 |
| 01110 | 1110 |
| 11010 | 1111; and | a transmitter optically coupled to the fiber-optic cable for transmitting over the fiber-optic cable, as the transmitter-output signal, an optical signal representing the transmitter code words that the coding unit produces; and a digital-data reception apparatus, coupled to the fiber-optic cable at the second location, for receiving, as a receiver input signal representing a sequence of receiver-input-signal bits, the signal transmitted by the transmitter over the fiber-optic cable and for generating a system output signal representative of the corrected contents of the receiver input signal, the reception apparatus comprising:

a receiver input circuit comprising:

receiver frame-assembly means for organizing the receiver-input-signal bits into receiver code words, each of which comprises a predetermined number of the receiver-input-signal bits;

a decoding unit responsive to the receiver frame-assembly means for producing a decoding-unit output signal representing receiver data words that result from decoding the receiver code words in accordance with the code employed by the coding unit and for generating, in response to each receiver code word, a validity signal that indicates whether that receiver code word is a valid code word;

a receiver complement unit responsive to the decoding-unit output signal for complementing alternate receiver data words so as to generate a complement-unit output comprising a complement-unit output word associated with each receiver data word, every other complement-unit output word being the complement of its associated data word, the remaining complement-unit output words being identical to their associated data words; and means responsive to the complement-unit output and the validity signal to generate a receiver-input-circuit signal that includes: for each receiver code word that the validity signal indicates is a valid code word, receiver-input-circuit data bits determined by the complement-unit output word associated with the receiver data word decoded from that receiver code word and, for each receiver code word that the validity signal indicates is not a valid code word, receiver-input-circuit data bits determined by the complement-unit output word associated with the receiver data word decoded from the last receiver code word that the validity signal indicated was a valid code word; and a receiver output circuit, connected to receive the receiver-input-circuit signal and comprising a receiver filter responsive to the receiver-input-circuit signal for generating a receiver-filter output that comprises, for each given receiver-input-circuit data bit, an associated receiver-filter output data bit whose value is that of the majority of the given receiver-input-circuit data bit, the receiver-input-circuit data bit that immediately succeeds the given receiver-input-circuit data bit, and the receiver-filter output data bit associated with the receiver-input-circuit data bit that immediately precedes the given receiver-input-circuit data bit, for generating as the system output signal a signal representing contents determined by the receiver-filter output.

* * * * *